US008664590B2

(12) United States Patent
Ding et al.

(10) Patent No.: US 8,664,590 B2
(45) Date of Patent: Mar. 4, 2014

(54) METHOD OF PROCESSING IMAGE CHARGE/CURRENT SIGNALS

(71) Applicant: Shimadzu Corporation, Kyoto (JP)

(72) Inventors: Li Ding, Manchester (GB); Ranjan Badheka, Manchester (GB)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/838,357

(22) Filed: Mar. 15, 2013

(65) Prior Publication Data

US 2013/0270433 A1 Oct. 17, 2013

(30) Foreign Application Priority Data

Mar. 19, 2012 (GB) .................................. 1204817.9

(51) Int. Cl.
*H01J 49/26* (2006.01)
*B01D 59/44* (2006.01)

(52) U.S. Cl.
USPC ........... 250/282; 250/281; 250/292; 250/290; 702/23; 702/28

(58) Field of Classification Search
USPC ............... 250/282, 281, 292, 290; 702/23, 28
See application file for complete search history.

(56) References Cited

U.S. PATENT DOCUMENTS 6,624,411 B2 * 9/2003 Umemura ..................... 250/292
7,772,550 B2 * 8/2010 Schaefer et al. .............. 250/290
7,888,633 B2 * 2/2011 Franzen et al. ............... 250/282
2011/0240845 A1 10/2011 Ding
2011/0251801 A1 10/2011 Misharin et al.

FOREIGN PATENT DOCUMENTS

GB 2 446 929 A 8/2008
WO 02/103747 A1 12/2002
WO 2011/086430 A1 7/2011
WO 2012/116765 A1 9/2012

OTHER PUBLICATIONS

Sun, Qi, et al.; Multi-ion Quantitative Mass Spectrometry by Orthogonal Projection Method with Periodic Signal of Electrostatic Ion Beam Trap; Journal of Mass Spectrometry; 2011 vol. 46 pp. 417-424.

Greenwood, J.B., et al.; A Comb-Sampling Method for Enhanced Mass Analysis in Linear Electrostatic Ion Traps; Review of Scientific Instruments; 2011 vol. 82 pp. 043-103.

* cited by examiner

*Primary Examiner* — Nikita Wells
(74) *Attorney, Agent, or Firm* — Sughrue Mion, PLLC

(57) ABSTRACT

A method of processing a plurality of image charge/current signals representative of trapped ions undergoing oscillatory motion, e.g. for use in an ion trap mass spectrometer. The method includes producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

29 Claims, 34 Drawing Sheets

Elimination using 1 ion matrix for peaks except 1st harmonic
Peaks for 500Da and 500.5Da Elimination using 1 ion matrix for peaks except 1st harmonic
Peaks for 181Da and 180Da Elimination using 1 ion matrix for peaks except 1st harmonic
Peaks for 181Da and 180Da

METHOD OF PROCESSING IMAGE CHARGE/CURRENT SIGNALS

BACKGROUND

This invention relates to methods of processing a plurality of image charge/current signals representative of trapped ions undergoing oscillatory motion, e.g. for use in an ion trap mass spectrometer. The invention also relates to associated methods and apparatuses.

In general, an ion trap mass spectrometer works by trapping ions such that the trapped ions undergo oscillatory motion, e.g. backwards and forwards along a linear path or in looped orbits.

An ion trap mass spectrometer may produce a magnetic field, an electrodynamic field or an electrostatic field, or combination of such fields to trap ions. If ions are trapped using an electrostatic field, the ion trap mass spectrometer is commonly referred to as an "electrostatic" ion trap mass spectrometer.

In general, the frequency of oscillation of trapped ions in an ion trap mass spectrometer is dependent on mass/charge ratio of the ions, since ions with large mass/charge ratios generally take longer to perform an oscillation compared with ions with small mass/charge ratios. Using an image charge/current detector, it is possible to obtain, non-destructively, an image charge/current signal representative of trapped ions undergoing oscillatory motion in the time domain. This image charge/current signal can be converted to the frequency domain e.g. using a Fourier transform ("FT"). Since the frequency of oscillation of trapped ions is dependent on mass/charge ratio, an image charge/current signal in the frequency domain can be viewed as mass spectrum data providing information regarding the mass/charge ratio distribution of the ions that have been trapped.

Fourier transform ion cyclotron resonance ("FTICR") is a known mass spectrometry technique which employs a superconductor magnetic field for ion trapping and implements these principles.

A known example of an electrostatic ion trap mass spectrometer is the "Orbitrap", developed by Alexander Makarov. In an Orbitrap, ions trapped by an electrostatic field cycle around a central electrode in spiral trajectories.

Another known example of an ion trap mass spectrometer is the electrostatic ion beam trap ("EIBT") disclosed in WO02/103747 (A1), by Zajfman et al. In an EIBT, ions generally oscillate backwards and forwards along a linear path, so such an ion trap is also referred to as a "Linear Electrostatic Ion Trap".

WO2011/086430, by Verenchikov, discloses an apparatus and operation method for an electrostatic trap mass spectrometer which involves measuring the frequency of multiple isochronous ionic oscillations. For improving throughput and space charge capacity, the trap is substantially extended in one Z-direction forming a reproduced two-dimensional field. Multiple geometries are provided for trap Z-extension. The throughput of the analysis is improved by multiplexing electrostatic traps. This document also suggests that frequency analysis can be done either by Wavelet-fit analysis of the image current signal or by using a time-of-flight detector for sampling a small portion of ions per oscillation.

GB1103361.0, currently unpublished, describes another electrostatic trap mass spectrometer.

US2011/0240845 (also see CN101752179), by Li Ding (one of the present inventors), discloses a mass spectrometric analyser and an analysis method based on the detection of ion image current. The method in one embodiment includes using electrostatic reflectors or electrostatic deflectors to enable pulsed ions to move periodically for multiple times in the analyser, forming time focusing in a portion of the ion flight region thereof, and forming an confined ion beam in space; enabling the ion beam to pass through multiple tubular image current detectors arranged in series along an axial direction of the ion beam periodically, using a low-noise electronic amplification device to detect image currents picked up by the multiple tubular detectors differentially, and using a data conversion method, such as a least square regression, to acquire a mass spectrum.

The inventors have observed that an image charge/current signal obtained using an ion trap mass spectrometer is often not perfectly harmonic. In other words, an image charge/current signal obtained using an ion trap mass spectrometer often has a waveform of sharp pulses in the time domain, which can result in the image charge/current signal having a plurality of harmonic components in the frequency domain.

When an image charge/current signal representative of trapped ions having different mass/charge ratios undergoing oscillatory motion is converted to the frequency domain, e.g. using a Fourier transform, the inventors have observed that, if a plurality of harmonic components are present, each harmonic component is expressed as a set of peaks, with each peak in the set being caused by trapped ions having a different mass/charge ratio (i.e. a different ion species). If the trapped ions have a narrow range of mass/charge ratios, then each harmonic component will be expressed as a set of closely spaced peaks which can easily be identified. However, if the trapped ions have a wide range of mass/charge ratios, then each harmonic component will be expressed as a set of widely spaced peaks which may overlap with each other. Overlapping harmonic peaks can make it difficult to obtain useful information regarding the mass/charge ratio distribution of trapped ions without limiting the range of mass/charge ratios of ions used to obtain the image charge/current signal. These difficulties are described in more detail below, with reference to FIGS. 1*a-c*.

Attempts have been made to address these difficulties that can be caused by a plurality of harmonic components being contained in an image charge/current signal obtained using an ion trap mass spectrometer. However, such attempts tend to involve computationally intensive methods.

For example, "Multi-ion quantitative mass spectrometry by orthogonal projection method with periodic signal of electrostatic ion beam trap", Qi Sun, Changxin Gu and Li Ding (one of the inventors), J. Mass. Spectrum. 2011, 46, 417-424, discloses analysing image charge/current signals using an "orthogonal projection method" to provide a more readable spectrum. However, the method proposed by this paper is computationally intensive.

As another example, "A comb-sampling method for enhanced mass analysis in linear electrostatic ion traps", J. B. Greenwood et al, Review of Scientific Instruments, 82, 043103 (2011) discloses a "comb-sampling" algorithm for extracting spectral information from signal acquired by pickup-electrodes from the image-charge of ion bunches oscillating in a linear electrostatic trap. Again, the method proposed by this paper is computationally intensive.

The present invention has been devised in light of these considerations.

SUMMARY OF THE INVENTION

At its most general, a first aspect of the invention provides a method of processing a plurality of image charge/current signals, the method including producing a linear combination of a plurality of image charge/current signals using a plurality of predetermined coefficients.

As will be seen from the discussion below, by appropriately selecting the predetermined coefficients, it is possible to suppress at least one unwanted harmonic component of the image charge/current signals within the linear combination of the plurality of image charge/current signals.

Accordingly, the first aspect of the invention may provide a method of processing a plurality of image charge/current signals as set out in claim 1.

Because at least one harmonic component of the image charge/current signals is suppressed (more preferably substantially eliminated, see below) within the linear combination of the plurality of image charge/current signals, the linear combination can be used to obtain useful information regarding the mass/charge distribution of trapped ions for a wide range of mass/charge ratios without necessarily suffering from the difficulties caused by overlapping harmonic components (having different orders) and in a manner that need not be computationally intensive.

Optionally, the terms "targeted" or "unwanted" may be used to identify the or each harmonic component that is to be suppressed in the linear combination. Also optionally, the terms "untargeted" or "wanted" may be used to identify a harmonic component that is not included in the at least one harmonic component to be suppressed (i.e. to identify a harmonic component that is not to be suppressed), e.g. to identify a harmonic component that has been selected for use in obtaining information regarding the mass/charge ratio distribution of trapped ions. However, these terms are optional and are intended to be used simply as labels. These terms should not be construed as requiring the method to include a cognitive decision to be made regarding, for example, whether or not a harmonic component is actually wanted/targeted by a human being.

Herein, producing a linear combination of the plurality of image charge/current signals using a plurality of coefficients preferably includes multiplying each of the plurality of image charge/current signals by a respective coefficient (which may be complex, see below). As explained in more detail below, the image charge/current signals could be in either the time domain or the frequency domain for this multiplication. Preferably, the image charge/current signals are in the time domain for this multiplication, as this generally requires fewer Fourier transforms (see below).

In general, image charge/current signals are initially obtained in the time domain, i.e. with the image charge/current signals being functions of time. It is possible to convert an image charge/current signal from the time domain into the frequency domain using e.g. a Fourier transform ("FT"), preferably a discrete Fourier transform such as a "fast Fourier transform" ("FFT") since the Fast Fourier transform is less computationally intensive so it is generally quicker.

An image charge/current signal in the frequency domain can be viewed as mass spectrum data providing information regarding the mass/charge ratio distribution of the ions that have been trapped. However, as noted above, if an image charge/current signal in the frequency domain has a plurality of harmonic components caused by trapped ions having a wide range of mass/charge ratios, then it can be difficult to obtain useful information regarding the mass/charge ratio distribution of the trapped ions from the image charge/current signal in the frequency domain, without limiting the range of mass/charge ratios used to obtain the image charge/current signal or using computationally intensive methods.

The method preferably includes providing the linear combination of the plurality of image charge/current signals in the frequency domain, preferably so as to provide information regarding the mass/charge ratio distribution of the trapped ions. Thus, the linear combination of the plurality of image charge/current signals in the frequency domain can be viewed as mass spectrum data providing information regarding the mass/charge ratio distribution of the ions that have been trapped. As noted above, advantageously, because at least one harmonic component of the image charge/current signals is suppressed (more preferably substantially eliminated, see below) within the linear combination of the plurality of image charge/current signals, the linear combination can be used to obtain useful information regarding the mass/charge distribution of trapped ions for a wide range of mass/charge ratios without necessarily suffering from the difficulties caused by overlapping harmonic components (having different orders) and in a manner that need not be computationally intensive.

Providing the linear combination of the plurality of image charge/current signals in the frequency domain may be achieved using a Fourier transform, preferably a discrete Fourier transform such as a "fast Fourier transform".

Here, it should be recognised that, assuming the plurality of image charge/current signals are initially obtained in the time domain (see above), then providing the linear combination of the plurality of image charge/current signals in the frequency domain may be achieved by either:

(a) producing the linear combination of the plurality of image charge/current signals in the time domain, then converting the linear combination of the plurality of image charge/current signals from the time domain into the frequency domain (e.g. using a Fourier transform, preferably a discrete Fourier transform such as a "fast Fourier transform"); or (b) converting each of the plurality of image charge/current signals from the time domain into the frequency domain (e.g. using a Fourier transform, preferably a discrete Fourier transform such as a "fast Fourier transform"), then producing the linear combination of the plurality of image charge/current signals in the frequency domain.

For the avoidance of any doubt, producing the linear combination of the plurality of image charge/current signals in the time domain may be performed in an analogue circuit, e.g. as described in more detail below.

Here, it should be appreciated that methods (a) and (b) are generally equivalent, since a Fourier transform of a linear combination of signals is generally equivalent to a linear combination of signals to which a Fourier transform has been individually applied, see e.g. Equation 2.3 below. However, method (a) is preferred, as this method generally requires fewer Fourier transforms compared with method (b).

Accordingly, assuming the plurality of image charge/current signals are initially obtained in the time domain (see above), then providing the linear combination of the plurality of image charge/current signals in the frequency domain preferably includes producing the linear combination of the plurality of image charge/current signals in the time domain, then converting the linear combination of the plurality of image charge/current signals from the time domain into the frequency domain (e.g. using a Fourier transform, preferably a discrete Fourier transform such as a "fast Fourier transform").

Herein, a (e.g. "targeted" or "unwanted") harmonic component of the image charge/current signals within the linear combination may be viewed as being suppressed if, in the frequency domain, a ratio value calculated as the height of a peak belonging to the (e.g. "targeted" or "unwanted") harmonic component divided by the height of a corresponding peak belonging to another (e.g. "untargeted" or "wanted") harmonic component is smaller for the linear combination produced using the predetermined coefficients compared with the same ratio calculated for a simple sum up of each image charge/current signal. In this context, "corresponding" peaks means peaks caused by trapped ions having the same mass/charge ratio.

Thus, the suppression of the at least one harmonic component can be relative rather than absolute, e.g. with the predetermined coefficients being selected so as to suppress at least one (e.g. "targeted" or "unwanted") harmonic component of the image charge/current signals relative to another (e.g. "untargeted" or "wanted") harmonic component of the image charge/current signals. For the avoidance of any doubt, this could be achieved, for example, by amplifying the other ("untargeted" or "wanted") harmonic component, rather than by suppressing the at least one ("targeted" or "unwanted") harmonic component.

Accordingly, the predetermined coefficients may be selected to suppress (or substantially eliminate) at least one (e.g. "targeted" or "unwanted") harmonic component of the image charge/current signals relative to another (e.g. "untargeted" or "wanted") harmonic component which has been selected for use in obtaining information regarding the mass/charge ratio distribution of trapped ions. The at least one (e.g. "targeted" or "unwanted") harmonic component to be suppressed are preferably near to (more preferably next to) the (e.g. "untargeted" or "wanted") harmonic component selected for use in obtaining information regarding the mass/charge ratio distribution of trapped ions.

Preferably, the predetermined coefficients are selected so as to substantially eliminate at least one harmonic component of the plurality of image charge/current signals within the linear combination of the plurality of image charge/current signals.

Herein, a harmonic component may be viewed as being "substantially eliminated" if, in the frequency domain, a ratio value calculated as the height of a peak belonging to the (e.g. "targeted" or "unwanted") harmonic component divided by the height of a corresponding peak belonging to another (e.g. "untargeted" or "wanted") harmonic component is 5% or less, more preferably 0.5% or less, for the linear combination produced using the predetermined coefficients. In this context, "corresponding" peaks again means peaks caused by trapped ions having the same mass/charge ratio.

Preferably, the predetermined coefficients are selected so as to suppress (more preferably substantially eliminate) $n-1$ of the first n harmonic components, where n is two or more, more preferably three or more, more preferably four or more, more preferably five or more. For example, the predetermined coefficients may be selected so as to suppress (more preferably substantially eliminate, see above) four of the first five harmonic components, e.g. such that first, second, fourth and fifth (e.g. "targeted" or "unwanted") harmonic components are suppressed (more preferably substantially eliminated), e.g. so as to leave behind the third, sixth and higher order (e.g. "untargeted" or "wanted") harmonic components.

More generally, the predetermined coefficients may be selected so as to suppress (more preferably substantially eliminate) m of the harmonic components having an order between n and $n+m$, where n is a positive integer and m is one or more, more preferably two or more, more preferably three or more, more preferably four or more, more preferably five or more. For example, the predetermined coefficients may be selected so as to suppress (more preferably substantially eliminate, see above) four of the fourth to eighth harmonic components, e.g. so as to leave behind the sixth harmonic component. As can be seen from the simulated examples discussed below, the predetermined coefficients will typically (but not necessarily) all be different from each other and/or may be complex (containing real and imaginary components).

The method may include displaying the linear combination of the plurality of image charge/current signals, e.g. in the frequency domain, e.g. on a display such as a screen.

Preferably, the method includes obtaining the plurality of image charge/current signals before processing the plurality of image charge/current signals.

Accordingly, the first aspect of the invention may provide a method of processing a plurality of image charge/current signals including:

obtaining a plurality of image charge/current signals; and processing the plurality of image charge/current signals, e.g. according to a method described herein.

Obtaining a plurality of image charge/current signals may include:

producing ions;

trapping the ions such that the trapped ions undergo oscillatory motion; and obtaining a plurality of image charge/current signals representative of the trapped ions undergoing oscillatory motion.

The ions may be produced using an ion source, e.g. as discussed below in more detail.

The ions may be trapped using a mass analyser, e.g. as discussed below in more detail.

The plurality of image charge/current signals may be obtained using at least one image charge/current detector, e.g. as discussed below in more detail.

Preferably, the plurality of image charge/current signals are obtained using a plurality of image charge/current detectors, with each image charge/current signal being obtained using a respective image charge/current detector, e.g. as discussed below in connection with FIGS. 3-4. The plurality of image charge/current detectors may have different locations, sizes and/or shapes.

However, it is also possible for two or more of the plurality of image charge/current signals to be obtained using the same image charge/current detector.

For example, two or more of the plurality of image charge/current signals could be obtained using the same image charge/current detector, with at least one of the two or more image charge/current signals being obtained by applying at least one processing algorithm to an image charge/current signal produced by the image charge/current detector. More than one of the two or more image charge/current signals could thus be obtained by applying more than one processing algorithm to an image charge/current signal produced by the image charge/current detector. Optionally, one of the two or more image charge/current signals may simply be the image charge/current signal produced by the image charge/current detector (i.e. without a processing algorithm being applied thereto).

The or each processing algorithm may be configured to modify (e.g. an absolute value of) an image charge/current signal (e.g. in the frequency domain) with phase information (e.g. a phase angle) obtained from (e.g. a ratio of an imaginary component and a real component of) the image charge/current signal. The phase information may be obtained using a Fourier transform, for example. The or each processing algorithm may be configured to modify an image charge/current signal by multiplying the absolute value of the image charge/ current signal with a function of phase angle variation of the image charge/current signal, e.g. as discussed below with reference to FIG. 5.

In some embodiments, all of the plurality of image charge/current signals may be obtained using a single image charge/current detector.

Preferably, the plurality of image charge/current signals are obtained directly using at least one image charge/current detector. However, for the avoidance of any doubt, some or all of the plurality of image charge/current signals may be obtained indirectly using at least one image charge/current detector.

Directly obtaining an image charge/current signal using an image charge/current detector may simply involve, for example, obtaining an image charge/current signal produced by the image charge/current detector.

Indirectly obtaining an image charge/current signal using an image charge/current detector may involve, for example, differentiating or integrating (e.g. with respect to time) one or more image charge/current signals produced by the at least one image charge/current detector, e.g. differentiating a plurality of image charge signals produced by a plurality of image charge detectors to obtain a plurality of image current signals or integrating a plurality of image current signals produced by image current detectors to obtain a plurality of image charge signals. As another example, indirectly obtaining an image charge/current signal using an image charge/current detector may involve using a processing algorithm e.g. as described above.

Herein, the term "image charge/current signal" is preferably interpreted to cover any order derivative or integral (e.g. a second order derivative) of an image charge/current signal, or a combination of the above (e.g. $C(t)+A*dC(t)/dt \ldots$, where $C(t)$ is charge as a function of time), produced by an image charge/current detector.

The first aspect of the invention may also provide a method of selecting predetermined coefficients, e.g. for use in a method of processing a plurality of image charge/current signals, e.g. as described above.

The method of selecting predetermined coefficients may include:

- obtaining a plurality of image charge/current signals;
- setting up equations aimed at suppressing or eliminating at least one harmonic component of the image charge/current signals; and
- selecting the predetermined coefficients by solving the equations.

Obtaining a plurality of image charge/current signals may e.g. be as described above and may e.g. include:

- producing ions;
- trapping the ions such that the trapped ions undergo oscillatory motion; and
- obtaining a plurality of image charge/current signals representative of the trapped ions undergoing oscillatory motion.

Preferably, the method includes providing the plurality of image charge/current signals in the frequency domain before setting up the equations, i.e. such that the linear combination of the plurality of image charge/current signals is produced in the frequency domain. Providing the plurality of image charge/current signals in the frequency domain may be achieved by converting the plurality of image charge/current signals from the time domain to the frequency domain, e.g. using a Fourier transform, preferably a discrete Fourier transform such as a "fast Fourier transform".

Preferably, the equations set up aimed at suppressing or eliminating at least one harmonic component of the image charge/current signals are aimed at suppressing or eliminating at least one harmonic component of the image charge/current signals within a linear combination of the plurality of image charge/current signals.

Preferably, setting up the equations includes producing a linear combination of the plurality of image charge/current signals using a plurality of undetermined coefficients.

Preferably, producing a linear combination of the plurality of image charge/current signals using a plurality of undetermined coefficients is achieved by producing a linear combination of the plurality of image charge/current signals as sampled at a plurality of frequencies using a plurality of undetermined coefficients, with each of the plurality of frequencies corresponding to a respective one of a plurality of harmonic components of the plurality of image charge/current signals. Preferably, each of the plurality of frequencies corresponds to a peak belonging to a respective one of a plurality of harmonic components of the plurality of image charge/current signals (and may therefore be referred to as a "harmonic frequency"). More preferably, each of the plurality of frequencies corresponds to a peak point (i.e. highest point) of a peak (e.g. in a plot of absolute intensity against frequency) belonging to a respective one of a plurality of harmonic components of the plurality of image charge/current signals (since a peak may cover a number of frequency points, see e.g. FIG. 8). In general, if one image charge/current signal is sampled at a particular frequency corresponding to a particular peak point, then it is highly preferable for all of the image charge/current signals to be sampled at this same frequency. The plurality of harmonic components (to which the plurality of frequencies correspond) preferably include the at least one harmonic component to be suppressed/eliminated, as well as at least one (e.g. "untargeted" or "wanted") harmonic component that is not to be suppressed/eliminated (which may be a harmonic component selected for use in obtaining information regarding the mass/charge ratio distribution of trapped ions).

By way of example, producing a linear combination of n image charge/current signals using a plurality of undetermined coefficients (where n is an integer) may be achieved by producing a linear combination of n image charge/current signals sampled at n frequencies using n undetermined coefficients, with each of the n frequencies corresponding to (e.g. a peak point of a peak belonging to) a respective one of the first n harmonic components of the plurality of image charge/current signals, e.g. as described below under the heading "Theory" (with n=5). By way of example, n may be two or more, more preferably three or more, more preferably four or more, more preferably five or more Preferably, the equations set up aimed at suppressing or eliminating at least one harmonic component of the image charge/current signals are linear equations. Such equations may be set up by equating the linear combination produced using the plurality of undetermined coefficients to a predetermined vector, e.g. a vector L as described below, for example.

Preferably, the equations are aimed at eliminating (rather than merely suppressing) at least one harmonic component. Of course, whilst the equations may mathematically be aimed at eliminating at least one harmonic component (in its entirety), performing a method of processing a plurality of image/charge signals using predetermined coefficients selected by solving such equations might not result in perfect elimination of the at least one harmonic component (e.g. due to factors such as data sampling/calculation error, noise etc).

Preferably, setting up equations aimed at suppressing or eliminating at least one harmonic component of the image charge/current signals includes setting up linear equations, wherein at least one linear combination of the plurality of image charge/current signals as sampled at (e.g. a respective) one of a plurality of harmonic frequencies (e.g. corresponding to a "targeted" or "unwanted" harmonic component) using a plurality of undetermined coefficients is set equal to zero (e.g. so as to aim at elimination of the "targeted" or "unwanted" harmonic component) or to a value that is smaller than (e.g. a value that has been set equal to) another linear combination of the plurality of image charge/current signals as sampled at another one of the plurality of harmonic frequencies (e.g. corresponding to an "untargeted" or "wanted" harmonic component) using said undetermined coefficients (e.g. so as to aim at suppression of the "targeted" or "unwanted" harmonic component).

Preferably, the produced ions include ions having a reference mass/charge ratio. More preferably, the produced ions include only (or substantially only) ions having a reference mass/charge ratio. Preferably the reference mass/charge ratio is selected to be in the middle of a mass range that is going to be used (e.g. in a subsequent experiment).

Preferably, the plurality of image charge/current signals include harmonic components caused by ions having the reference mass/charge ratio.

Preferably, producing a linear combination of the plurality of image charge/current signals using a plurality of undetermined coefficients is based on the harmonic components caused by ions having the reference mass/charge ratio. More preferably, producing a linear combination of the plurality of image charge/current signals using a plurality of undetermined coefficients is achieved by producing a linear combination of the plurality of image charge/current signals as sampled at a plurality of frequencies using a plurality of undetermined coefficients, with each of the plurality of frequencies corresponding to (e.g. a peak point of a peak belonging to) a respective one of a plurality of harmonic components caused by ions having the reference mass/charge ratio.

Accordingly, the method of selecting predetermined coefficients may include:

- producing ions, wherein the produced ions include ions having a reference mass/charge ratio;
- trapping the ions such that the trapped ions undergo oscillatory motion;
- obtaining a plurality of image charge/current signals representative of the trapped ions undergoing oscillatory motion, wherein the plurality of image charge/current signals include harmonic components caused by ions having the reference mass/charge ratio;
- providing the plurality of image charge/current signals in the frequency domain;
- setting up linear equations aimed at suppressing or eliminating at least one of the plurality of harmonic components of the image charge/current signals within a linear combination of the plurality of image charge/current signals, wherein setting up the linear equations includes producing a linear combination of the plurality of image charge/current signals as sampled at a plurality of frequencies using a plurality of undetermined coefficients, with each of the plurality of frequencies corresponding to (e.g. a peak point of a peak belonging to) a respective one of a plurality of harmonic components caused by ions having the reference mass/charge ratio; and
- selecting the predetermined coefficients by solving the linear equations.

The method of selecting predetermined coefficients may be combined with any method described herein. Thus, the first aspect of the invention may provide a method including:

- a method of selecting predetermined coefficients as described herein; and
- a method of processing a plurality of image charge/current signals as described herein, wherein the method of processing a plurality of image charge/current signals uses the predetermined coefficients selected according to the method of selecting predetermined coefficients.

Preferably, the method of selecting predetermined coefficients includes providing the plurality of image charge/current signals in the frequency domain using a first discrete Fourier transform; and the method of processing a plurality of image charge/current signals includes providing the linear combination in the frequency domain using a second discrete Fourier transform; wherein the first and second discrete Fourier transforms use the same frequency range and frequency step. It has been found by the inventors that this leads to improved suppression/elimination of unwanted harmonic components.

The second aspect of the invention may provide an apparatus suitable for performing any method as described herein.

For example, the second aspect of the invention may provide a mass spectrometry apparatus configured to perform any method as described herein, e.g. a method of processing a plurality of image charge/current signals and/or a method of selecting predetermined coefficients as described herein.

Preferably, the mass spectrometry apparatus has a processing apparatus configured to cause the mass spectrum apparatus to perform any method as described herein, e.g. a method of processing a plurality of image charge/current signals and/or a method of selecting predetermined coefficients as described herein.

Preferably, the second aspect of the invention provides a mass spectrometry apparatus having a processing apparatus configured to perform a method of processing a plurality of image charge/current signals as described herein.

For example, the second aspect of the invention may provide a mass spectrometry apparatus as set out in claim 22.

An above described processing apparatus may be configured to implement, or have means for implementing, any method step described above.

For example, the processing apparatus may be configured to provide the linear combination of the plurality of image charge/current signals in the frequency domain, e.g. by either:

(a) producing the linear combination of the plurality of image charge/current signals in the time domain, then converting the linear combination of the plurality of image charge/current signals from the time domain into the frequency domain (e.g. using a Fourier transform, preferably a discrete Fourier transform such as a "fast Fourier transform"); or (b) converting each of the plurality of image charge/current signals from the time domain into the frequency domain (e.g. using a Fourier transform, preferably a discrete Fourier transform such as a "fast Fourier transform"), then producing the linear combination of the plurality of image charge/current signals in the frequency domain.

An above described processing apparatus may include a computer. The processing apparatus (e.g. a computer or a signal processor) may be programmed with computer-executable instructions configured to cause the mass spectrum apparatus to perform any method as described herein, e.g. a method of processing a plurality of image charge/current signals and/or a method of selecting predetermined coefficients as described herein.

The mass spectrometry apparatus may have a display. The display may be configured to display the linear combination of the plurality of image charge/current signals, e.g. in the frequency domain. The display may include a screen.

The mass spectrometry apparatus may be configured to implement, or have means for implementing, any method step described herein.

For example, the mass spectrometry apparatus may have a means for obtaining a plurality of image charge/current signals. Thus, the mass spectrometry apparatus may have:

an ion source configured to produce ions;

a mass analyser configured to trap the ions such that the trapped ions undergo oscillatory motion in the mass analyser; and/or at least one image charge/current detector for use in obtaining a plurality of image charge/current signals representative of trapped ions undergoing oscillatory motion in the mass analyser.

If the mass spectrometry apparatus has a means for obtaining a plurality of image charge/current signals, it may be viewed as a mass spectrometer. If it has a mass analyser configured to trap the ions such that the trapped ions undergo oscillatory motion in the mass analyser, the mass spectrometer may be viewed as an ion trap mass spectrometer, and the mass analyser may be viewed as an ion trap.

Preferably, an above described processing apparatus is configured to perform a method of processing a plurality of image charge/current signals on a plurality of signals obtained using the at least one image charge/current detector.

Accordingly, the second aspect of the invention may provide an ion trap mass spectrometer having:

an ion source configured to produce ions;

a mass analyser configured to trap the ions such that the trapped ions undergo oscillatory motion in the mass analyser;

at least one image charge/current detector for use in obtaining a plurality of image charge/current signals representative of trapped ions undergoing oscillatory motion in the mass analyser; and a processing apparatus configured to perform a method of processing a plurality of image charge/current signals obtained using the at least one image charge/current detector.

Here, the method of processing a plurality of image charge/current signals may be any method as described herein, and preferably includes producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

Preferably, the ion source is preferably configured to produce ions, e.g. from a sample material, e.g. as described below in more detail. For example, the ion source may be configured to produce ions in a continuous or pulsed fashion, e.g. in short bunches of 1 μs or less.

The mass spectrometry apparatus may include an ion transmission or ion guide system for transferring ions from the ion source to the mass analyser, e.g. as described below in more detail.

Preferably, the mass analyser is configured to produce (e.g. using electrodes in the mass analyser) an electric and/or a magnetic field to trap ions produced by the ion source such that the trapped ions undergo oscillatory motion in the mass analyser. Preferably, the mass analyser is configured to produce a substantially static electric field (which may be referred to as an "electrostatic" field) and/or a substantially static magnetic field, e.g. a combination of substantially static electric and magnetic fields (which may be referred to as an "electromagnetostatic" field). Additionally or alternatively, the mass analyser may be configured to produce a dynamic electric field (which may be referred to as an "electrodynamic" field) and/or a dynamic magnetic field, e.g. a combination of dynamic electric and magnetic fields (which may be referred to as an "electromagnetic" field).

If the mass analyser is configured to produce an electrostatic field, the mass analyser may be viewed as an electrostatic ion trap. The electrostatic ion trap may be a linear or planar electrostatic ion trap, for example. The electrostatic ion trap (or a mass analyser of any other type) may have a plurality of image charge/current detectors. The electrostatic ion trap (or a mass analyser of any other type) may have multiple field forming electrodes at least some of which are also used as image charge/current detectors.

The electrostatic ion trap may have the form of an Orbitrap configured to use a hyper-logarithmic electric field for ion trapping, for example. A conventional Obitrap is configured to use two halves of "outer" electrodes as image charge "pick-up" electrodes, and to pick up the image charge differentially to produce only one image charge signal. However, it is possible to split the outer electrode into more sections, with each generating a respective one of a plurality of image charge/current signals, and/or for part of an inner electrode to be electrically separated and to be properly coupled to allow it to pick-up image charge signals.

The or each image charge/current detector is preferably configured to produce an image charge/current signal representative of trapped ions undergoing oscillatory motion in the mass analyser. Image charge/current detectors are very well known in the art and typically include at least one "pick-up" electrode, and preferably also include at least one "pick-up" electrode and an amplifier (e.g. a "first stage" charge sensitive amplifier). The inclusion of an amplifier in an image charge/current detector is preferred because the amount of image charge induced by the trapped ion is normally less than the charge of the ions, varying between $10^{-19}$ to $10^{-14}$ Coulomb. Low noise charge amplifiers are commonly used to amplify the signal. Because they feature a capacitive impedance at the input, such amplifiers will generally output a signal in waveform of image charge rather than image current. The transmission parameter of this first stage amplifier and following stage amplifier may, however varies from case to case, the obtained signal waveform may vary from image charge type to image current type or any type from their derivatives.

The mass spectrometry apparatus may have a plurality of image charge/current detectors, with each image charge/current detector being configured to be used to obtain a respective image charge/current signal, e.g. as discussed below in connection with FIGS. 2-4. The plurality of image charge/current detectors may have different locations, sizes and/or shapes.

However, it is also possible for one or more of the image charge/current detectors to be configured to be used to produce two or more of the plurality of image charge/current signals.

For example, an image charge/current detectors could be configured to be used to obtain two or more of the plurality of image charge/current signals, with at least one of the two or more image charge/current signals being obtained by applying at least one processing algorithm to an image charge/current signal produced by the image charge/current detector. More than one of the two or more image charge/current signals could thus be obtained by applying more than one processing algorithm to an image charge/current signal produced by the image charge/current detector. Optionally, one of the two or more image charge/current signals may simply be the image charge/current signal produced by the image charge/current detector (i.e. without a processing algorithm being applied thereto).

The or each processing algorithm may be configured to modify (e.g. an absolute value of) an image charge/current signal (e.g. in the frequency domain) with phase information (e.g. a phase angle) obtained from (e.g. a ratio of an imaginary component and a real component of) the image charge/current signal. The phase information may be obtained using a Fourier transform, for example. The or each processing algorithm may be configured to modify an image charge/current signal by multiplying the absolute value of the image charge/current signal with a function of phase angle variation of the image charge/current signal, e.g. as discussed below with reference to FIG. 5. Accordingly, in some embodiments, the mass spectrometry apparatus may have only one image charge/current detector.

A third aspect of the invention may provide a computer-readable medium (e.g. provided in the form of logic) having computer-executable instructions configured to cause a mass spectrometry apparatus to perform any method as described herein.

For example, the third aspect of the invention may provide a computer-readable medium as set out in claim 29.

The invention also includes any combination of the aspects and preferred features described except where such a combination is clearly impermissible or expressly avoided.

BRIEF DESCRIPTION OF THE DRAWINGS

Examples of our proposals are discussed below, with reference to the accompanying drawings in which.

DETAILED DESCRIPTION OF THE EMBODIMENTS

Herein, mass/charge ratios are expressed in units of Thompson (Th), where

1 Th=1 u/e, where u represents the unified atomic mass unit ($1.661\times10^{-27}$ kg to four significant figures) and e represents the elementary charge (the charge of a proton, $1.602\times10^{-19}$ coulombs to four significant figures).

Figure 1A:
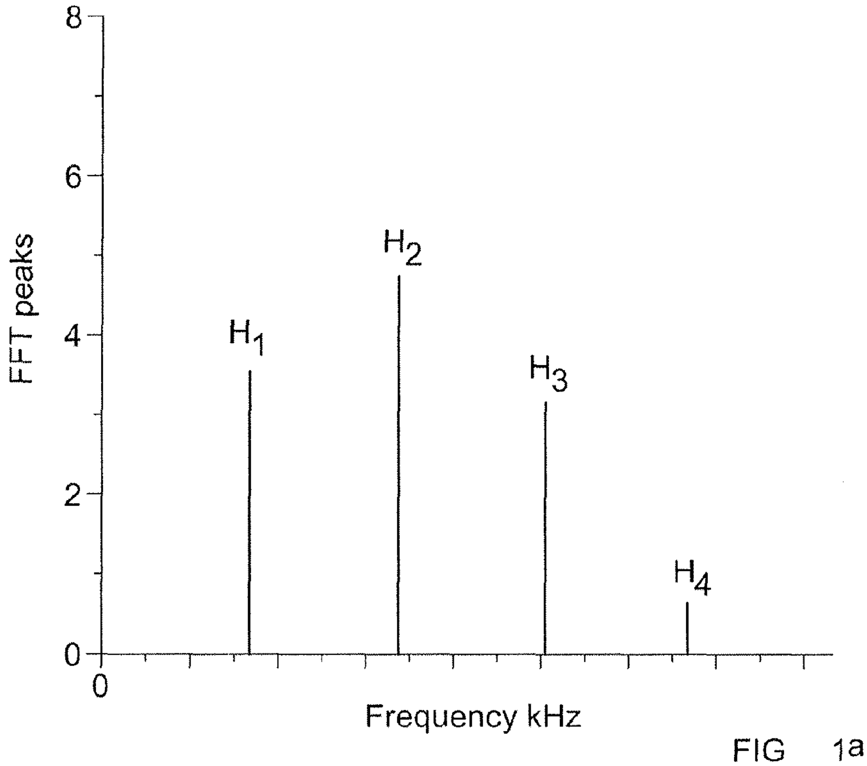
FIGS. 1*a-c* are hypothetical plots for illustrating difficulties that can arise due to multiple harmonic components being contained in image charge/current signals.
Figure 1B:
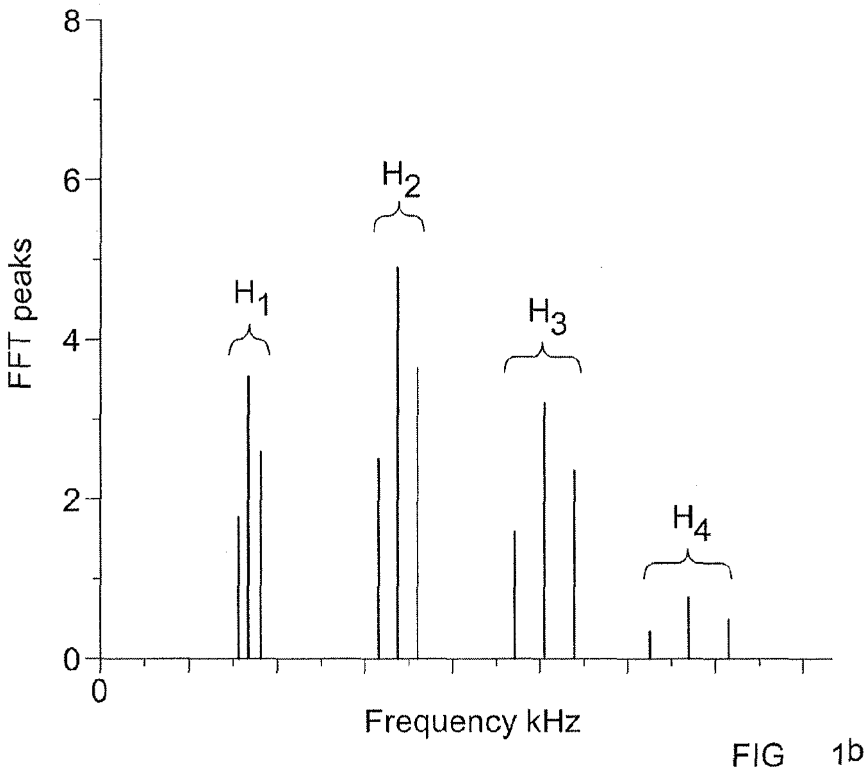
Figure 1C:
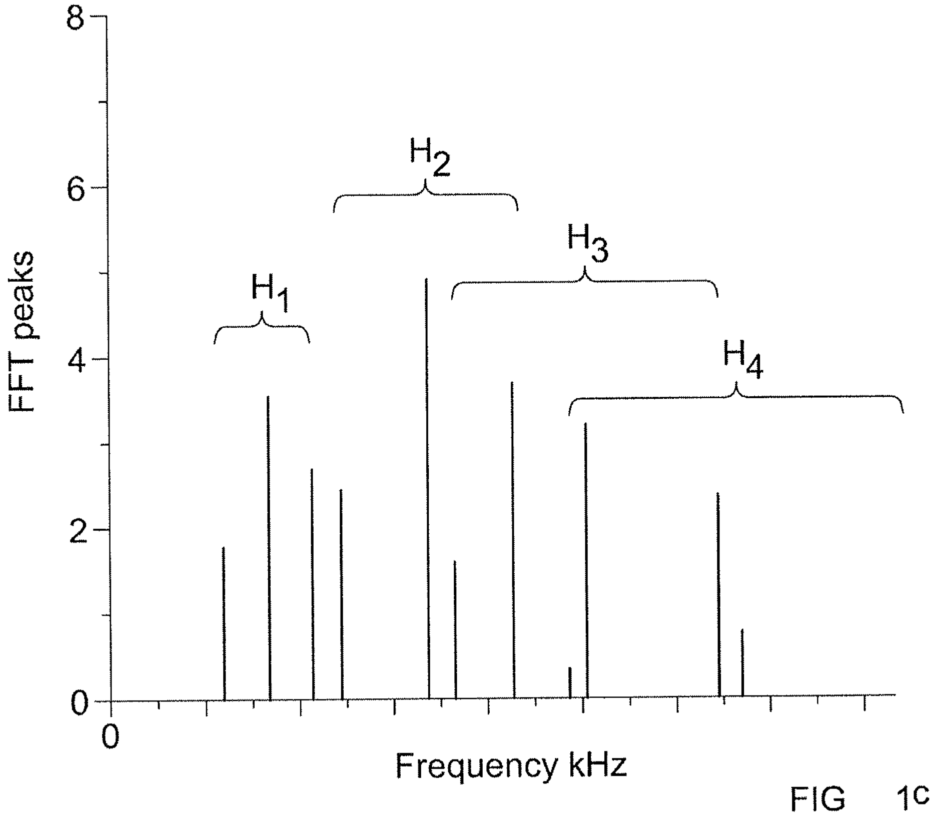

FIGS. 1*a-c* are hypothetical plots for illustrating difficulties that can arise due to multiple harmonic components being contained in image charge/current signals.

For the avoidance of any doubt, it should be appreciated that FIGS. 1*a-c* are hypothetical plots that have not been drawn to scale, and are provided for illustrative purposes.

FIG. 1*a* shows an FFT of an image charge/current signal representative of trapped ions undergoing oscillatory motion, where the trapped ions have only one mass/charge ratio. The FFT has converted the image charge/current signal from the time domain to the frequency domain, such that FFT plot can be viewed as mass spectrum data providing information regarding the mass/charge ratio distribution of the ions having only one mass/charge ratio.

A number of harmonic components of the image charge/current signal can easily be identified in FIG. 1*a*, because the ions have only one mass/charge ratio, meaning that each harmonic component is expressed as a single harmonic peak. The first (or "primary") harmonic component caused by the ions is expressed as a first harmonic peak $H_1$ occurring at a frequency of $f_0$=335 Hz. The second harmonic component caused by the ions is expressed as a second harmonic peak $H_2$ occurring at a frequency of $2f_0$=770 Hz. The third harmonic component caused by the ions is expressed as a third harmonic peak $H_3$ occurring at a frequency of $3f_0$=1105 Hz. The fourth harmonic component caused by the ions is expressed as a fourth harmonic peak $H_4$ occurring at a frequency of $4f_0$=1440 Hz. Fifth and higher order harmonic components caused by the ions would be expressed as fifth and higher order harmonic peaks at higher multiples of the fundamental frequency $f_0$ (the frequency at which the first harmonic peak occurs).

FIG. 1*b* shows an FFT of an image charge/current signal representative of trapped ions undergoing oscillatory motion, where the trapped ions have three closely spaced mass/charge ratios (approximately ±7% relative to a central mass/charge ratio). Again, the FFT has converted the image charge/current signal from the time domain to the frequency domain, such that FFT plot can be viewed as mass spectrum data providing information regarding the mass/charge ratio distribution of the ions having three closely spaced mass/charge ratios.

A number of harmonic components of the image charge/current signal can easily be identified in FIG. 1*b*, because the ions have a narrow range of mass/charge ratios, meaning that each harmonic component is expressed as a set of three closely spaced harmonic peaks.

Because different harmonic components can easily be identified in FIGS. 1*a* and 1*b*, it is easy to obtain information regarding the mass/charge ratio distribution of the ions using FIGS. 1*a* and 1*b*.

FIG. 1*c* shows an FFT of a hypothetical image charge/current signal representative of trapped ions undergoing oscillatory motion, where the trapped ions have three widely spaced mass/charge ratios (approximately ±30% relative to a central mass/charge ratio). Again, the FFT has converted the image charge/current signal from the time domain to the frequency domain, such that FFT plot can be viewed as mass spectrum data providing information regarding the mass/charge ratio distribution of the ions having three widely spaced mass/charge ratios.

Different harmonic components of the image charge/current signal are difficult to identify in FIG. 1*c*, compared with FIGS. 1*a* and 1*b*, because the ions have a wide range of mass/charge ratios, meaning that each harmonic component is expressed as three widely spaced harmonic peaks, some of which overlap with other harmonic peaks.

Because of the overlapping harmonic peaks in FIG. 1*c*, it is difficult to obtain information regarding the mass/charge ratio distribution of the ions using FIG. 1*c*.

Of course, FIG. 1*c* is only a hypothetical plot. In reality, it is normal for an image charge/current signal to be representative of trapped ions undergoing oscillatory motion, where the trapped ions have many more than three mass/charge ratios that are spread over a wider range of mass/charge ratios. In these conditions, it becomes very difficult to obtain useful information regarding the mass/charge ratio distribution of the ions.

One way to address these difficulties is to limit the range of mass/charge ratios of the ions used to obtain the image charge/current signals, e.g. such that the mass/charge ratios of the ions used to obtain the image charge/current signals do not vary by more than 10%. This can help to avoid overlap between the peaks belonging to each harmonic component in the frequency domain (compare FIG. 1*b* with FIG. 1*c*) but is burdensome, as it severely limits the range of mass/charge ratios that can be studied per image charge/current signal obtained.

Another way to address these difficulties, without having to limit the range of mass/charge ratios of the ions, is to use computational methods to acquire useful information regarding the mass/charge ratio of the ions from the image charge/current signals. Computational methods have been developed which are able to utilise the information provided by each harmonic component in an image charge/current signal, see e.g. the "orthogonal projection" method referred to above. However, existing computational methods tend to be computationally intensive, such that they are not necessarily practical for all (e.g. online) applications.

Figure 2:
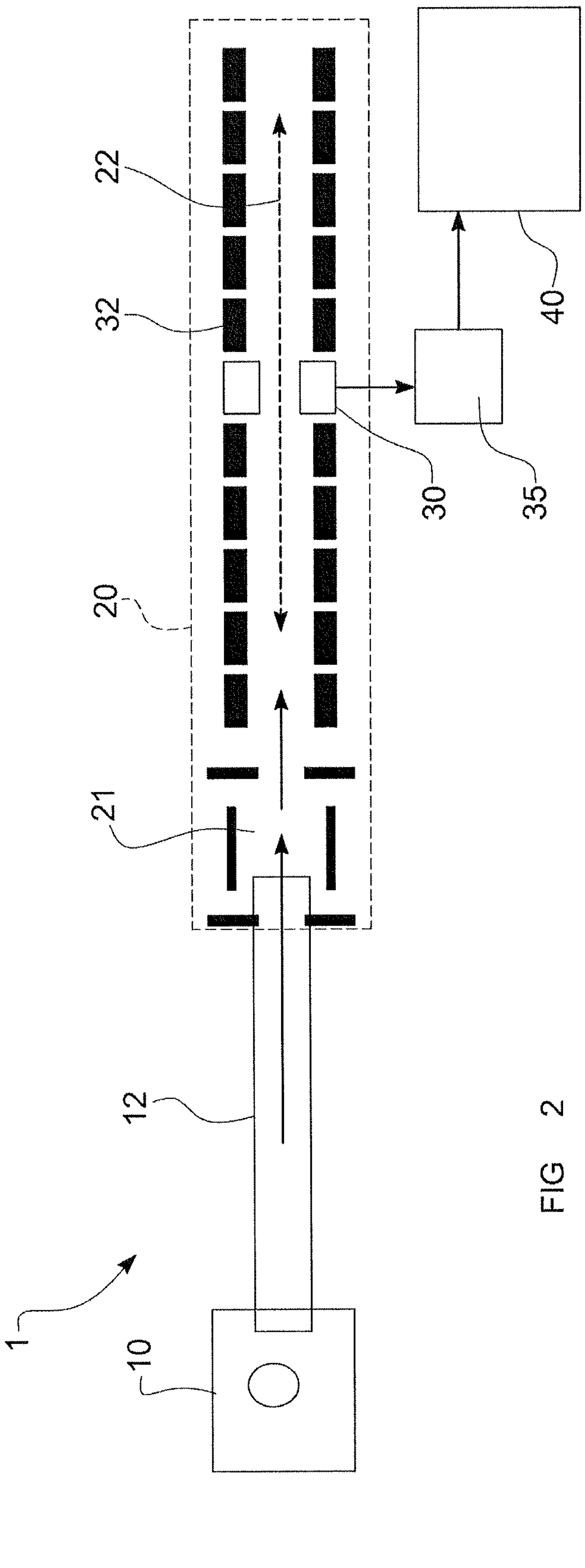
FIG. 2 is a schematic diagram of an ion trap mass spectrometer.

FIG. 2 is a schematic diagram of an ion trap mass spectrometer 1.

The ion trap mass spectrometer 1 preferably has an ion source 10, an ion transmission or ion guide system 12, a mass analyser 20 and a processing apparatus 40. The mass analyser may include or be attached to an ion injector 21 and at least one image charge/current detector 30.

Preferably, the ion source 10 is configured to produce ions, e.g. from a sample material. Preferably, the ions can be produced by the ion source in a continuous or pulsed fashion, e.g. in short bunches of 1 μs or less. For example, the ion source 10 may be a continuous electrospray ion source or a pulsed MALDI ion source. Ions produced in the ion source are preferably transferred from the ion source 10 to the mass analyser 20 through the ion transmission or ion guide system 12 which may e.g. contain an RF focusing lens, collisional cooling and/or an orifice to bridge different degrees of vacuums. Ions may be temporarily stored in or made to travel along the ion injector 21 which is preferably configured to pulse the ions into a mass analysis region of the mass analyser 20. In some embodiments, the ion source 10 may be located inside the mass analyser 20.

The mass analyser 20 is preferably configured to trap ions produced by the ion source 10 such that the trapped ions undergo oscillatory motion in the mass analyser 20, e.g. backwards and forwards along a linear path 22 or in looped orbits. Preferably, the mass analyser 20 is configured to produce (e.g. using electrodes 32 arranged in one or more electrode arrays in the mass analyser 20) an electromagnetostatic field, preferably an electrostatic field, to trap ions produced by the ion source 10, preferably after they have been injected by the ion injector 21, preferably such that the trapped ions undergo oscillatory motion in the mass analyser 20. Preferably, the electrostatic field is configured to allow ions to achieve isochronous oscillation, e.g. such that ions of a given mass to charge ratio oscillate with a constant frequency even if there is a spread in their kinetic energies. It is also preferable to configure the electrostatic field to confine the ion path to a centre axis or a centre plane of the analysis region, so that ion can fly a long period of time without spreading out or getting lost. Such techniques are known in the art.

The or each image charge/current detector 30 is preferably configured to (e.g. by being connected to a "first stage" charge sensitive amplifier 35) produce an image charge/current signal representative of trapped ions undergoing oscillatory motion in the mass analyser 20. Image charge/current detectors are very well known in the art and typically include at least one "pick-up" electrode, which may have the shape of a cylinder or ring and an amplifier (such as the "first stage" charge sensitive amplifier 35).

Preferably, at least one analogue to digital converter (not shown) is used to convert the at least one analogue image charge/current signal (produced by the at least one image charge/current detector as amplified by its charge sensitive amplifier) into at least one digital image charge/current signal. This is advantageous e.g. if the processing apparatus 40 is configured to handle digital signals, e.g. as would usually be the case if the processing apparatus 40 included a computer.

The processing apparatus 40, which may include a computer, is preferably configured to perform a method of processing a plurality of image charge/current signals representative of trapped ions undergoing oscillatory motion in the mass analyser 20 obtained using the at least one image charge/current detector 30, the method including producing a linear combination of the plurality of image charge/current signals using a plurality of predetermined coefficients, the predetermined coefficients having been selected so as to suppress (more preferably substantially eliminate) at least one harmonic component of the image charge/current signals within the linear combination of the plurality of image charge/current signals.

Preferably, the processing apparatus 40 is further configured to provide the linear combination of the plurality of image charge/current signals in the frequency domain, e.g. by producing a linear combination of the plurality of image charge/current signals in the time domain, then converting the linear combination of the plurality of image charge/current signals from the time domain into the frequency domain (e.g. using an FT, preferably a discrete FT such as an FFT).

Alternatively the linear combination in the time domain could be produced before the analogue to digital converter, e.g. in an analogue circuit. For example, the gain of a respective amplifier connected with each image charge/current detector could be set in proportion to a respective predetermined coefficient, preferably with the image charge/current signals being linearly combined in an analogue circuit, such as an operational amplifier. An advantage of this arrangement is that the linear combination can be produced more quickly. In this arrangement, complex predetermined coefficients could be expressed by complex transmission functions of the analogue circuits, which can be set or adjusted manually or digitally with modern electronics devices.

Note that the linear combination of the plurality of image charge/current signals in the frequency domain can be viewed as mass spectrum data providing information regarding the mass/charge ratio distribution of the ions that have been trapped.

Theory and examples relating to selecting the predetermined coefficients so as to suppress (more preferably substantially eliminate) at least one harmonic component of the image charge/current signals within the linear combination of the plurality of image charge/current signals are discussed in detail below.

Figure 3:
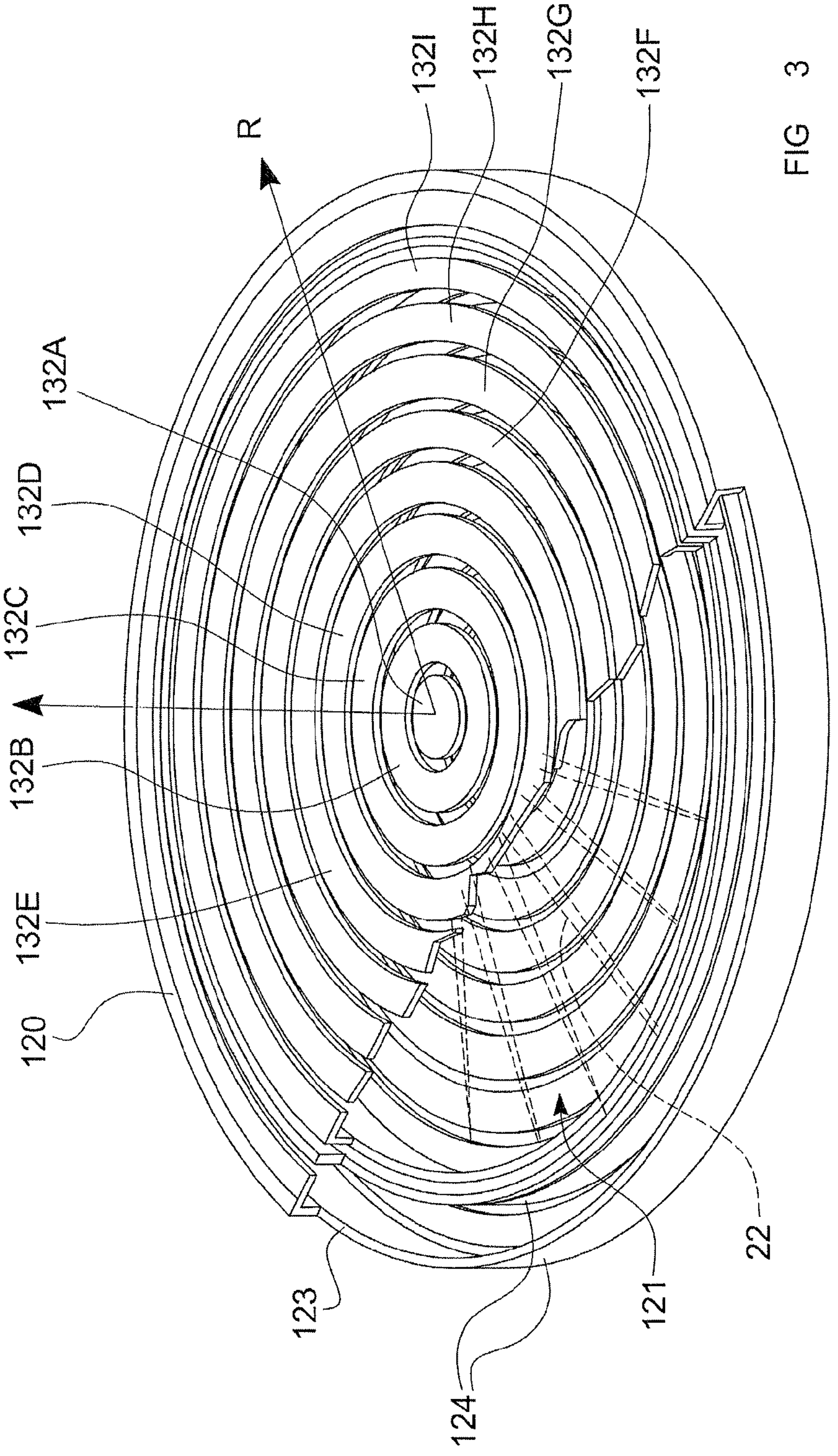
FIG. 3 is an example of an electrostatic ion trap mass analyser for use in the ion trap mass spectrometer of FIG. 2.

FIG. 3 is an example of an electrostatic ion trap mass analyser 120 for use in the ion trap mass spectrometer 1 of FIG. 2.

The mass analyser 120 shown in FIG. 3 is preferably configured to trap ions produced by an ion source using an electrostatic field such that the trapped ions undergo oscillatory motion. In more detail, the mass analyser 120 shown in FIG. 3 is preferably configured as a planar electrostatic ion trap. It preferably comprises a top and bottom arrays of circular or ring electrodes 132A-I to form a trap field in region 121 in between the two arrays. At an outer edge, a "trapping region" is preferably attached with an injector 123 preferably configured with 2 injector electrodes 124. Once the ions are injected into the trapping region 121, they will preferably carry out oscillatory motion diametrically, or with a small precession around the central axis in a trajectory as shown by the label 22. Because the ions fly about the central plane this kind of trap can be referred to as a "planar electrostatic ion trap". A set of trapping voltages are preferably applied to the electrodes 132A to 1321, which may be referred to as "field forming" electrodes, in both the top and bottom arrays, preferably so as to produce an electrostatic field that satisfies preferred isochronous and focusing conditions. At the same time by properly selecting a coupling circuit, some of these circular and ring electrodes can be used as "pick up" electrodes for use as image charge/current detectors. In this example shown, each of five of the electrodes 132A, 132B, 132D, 132F, 132H is configured as a respective image charge/current detector (which preferably also includes a respective charge sensitive amplifier, see below) configured to produce a respective image charge/current signal representative of trapped ions undergoing oscillatory motion in the mass analyser 120. More specifically, the centre electrode 132A and 4 ring electrodes 132B, 132D, 132F, 132H are selected to be the "pick-up" electrodes for image charge/current detection. These "pick-up" electrodes 132A, 132B, 132D, 132F, 132H are preferably connected to respective charge sensitive amplifiers which are preferably mounted in vicinity of the mass analyser 120 and their output signals are sent out for processing.

In the specific example shown in FIG. 3, five "pick-up" electrodes 132A, 132B, 132D, 132F, 132 H of the mass analyser 120 are configured as image charge detectors, each configured to produce an analogue image charge/current signal representative of trapped ions undergoing oscillatory motion in the mass analyser 120. In general, image charge signals obtained using the five "pick-up" electrodes 132A, 132B, 132D, 132F, 132H shown in FIG. 3, whilst being periodic according to an oscillation frequencies of the ions, will not be sinusoidal. Rather, depending on the location, size and shape of the "pick-up" electrodes 132A, 132B, 132D, 132F, 132H, they will tend to form certain distinct waveform patterns.

Figure 4A:
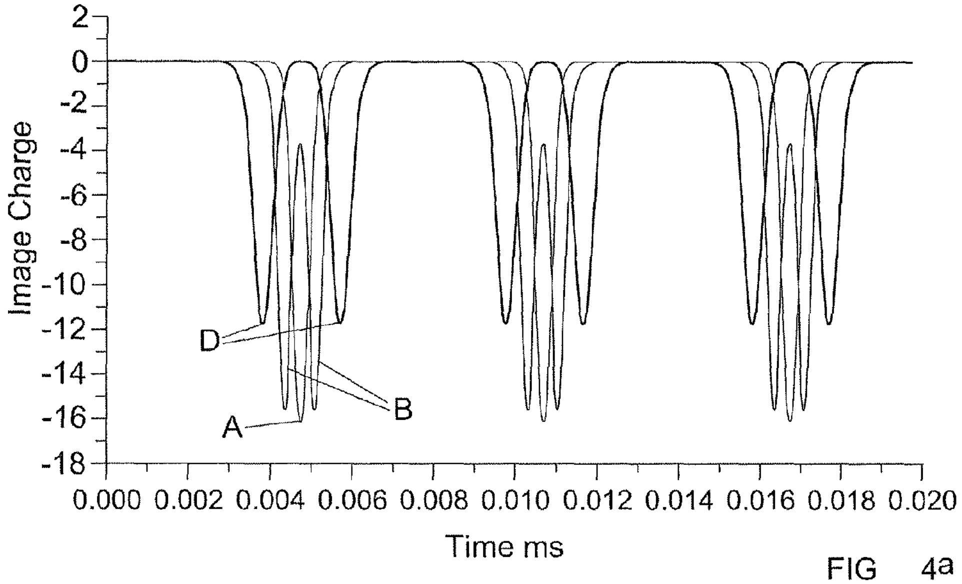
FIG. 4*a* shows image charge signals in the time domain obtained using a first, second and third "pick-up" electrode of the mass analyser of FIG. 3 in a simulation.

FIG. 4*a* shows image charge signals A, B, D in the time domain obtained using a first 132A, second 132B and third 132D "pick-up" electrode of the mass analyser 120 of FIG. 3 in a simulation.

For the simulation, ions having only one mass/charge ratio were simulated as being trapped by the mass analyser 120 of FIG. 3. The image charge signals shown in FIG. 4*a* are therefore representative of trapped ions having only one mass/charge ratio undergoing oscillatory motion in the mass analyser 120 of FIG. 3.

Figure 4B:
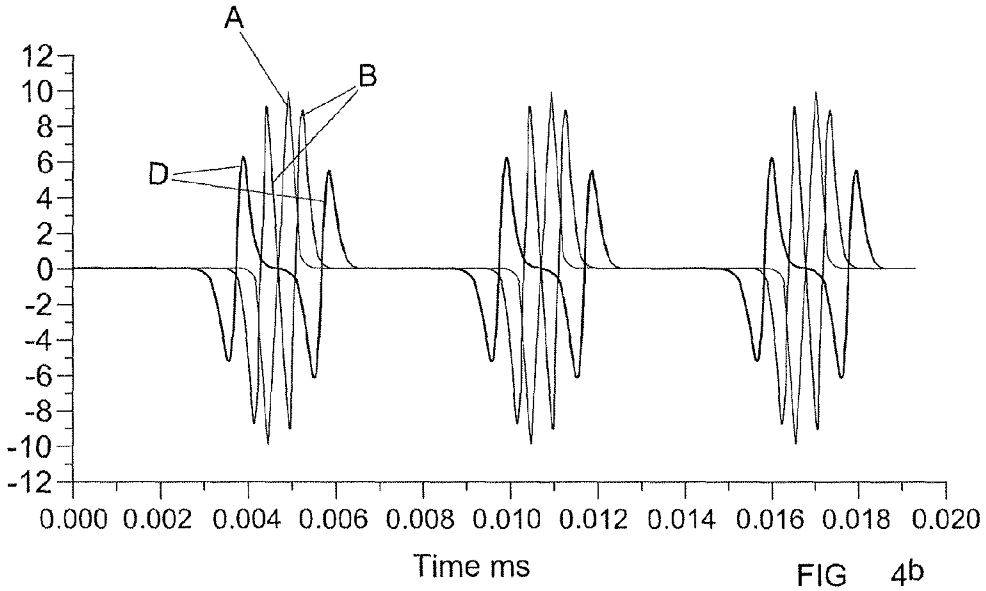
FIG. 4*b* shows the image current signals obtained by differentiating the image charge signals shown in FIG. 4*b*.

FIG. 4*b* shows the image current signals A, B, D obtained by differentiating the image charge signals shown in FIG. 4*b*.

Note that the waveforms of the image charge and image current signals A, B, D obtained using the first, second and third "pick-up" electrodes 132A, 132B, 132D share the same repetition frequency but have different shapes, owing e.g. to factors such as the location, size and shape of these "pick-up" electrodes 132A, 132B, 132D.

FIGS. 8*a-e*, described below in more detail, respectively show image charge signals obtained using the first, second, third, fourth and fifth "pick-up" electrodes 132A, 132B, 132C, 132D, 132E of the mass analyser 120 of FIG. 3, which unlike the signals A, B, D shown in FIG. 4, have been converted from the time domain into the frequency domain using an FFT.

FIGS. 8*a-e* can therefore be viewed as mass spectrum data providing information regarding the mass/charge ratio distribution of ions that have been trapped in the mass spectrometer 120 of FIG. 3.

A number of harmonic components of the image charge signals can easily be identified in FIGS. 8*a-e*, because the ions used in the simulation used to produce FIGS. 8*a-e* had only one mass/charge ratio, meaning that each harmonic component is expressed as a single harmonic peak. The first-fifth harmonic peaks are labelled $H_1$-$H_5$ in FIGS. 8*a-e*.

Note that the harmonic peaks in the image charge signals shown in FIGS. 8*a-e* occur at the same frequency irrespective of which "pick-up" electrode was used to obtain the image charge signal, with the same gaps occurring between these harmonic peaks. However, the heights of the harmonic peaks are different depending on which "pick-up" electrode was used to obtain the image charge signal, these heights being dependent on factors such as the size, shape and location of the "pick-up" electrode.

By producing a linear combination of the signals shown in FIGS. 8*a-e* using carefully selected coefficients, it is possible to suppress (more preferably substantially eliminate) at least one harmonic component of the image charge signals by careful selection of predetermined coefficients to be used in the linear combination. This suppression/substantial elimination is preferably general for ions of different mass/charge ratios, so that the suppression/substantial elimination applies equally to harmonic peaks caused by ions of all mass/charge ratios, not just the mass/charge ratio used for the simulation used to obtain FIGS. 4 and 5.

Theory

Details of the theory underlying the invention will now be discussed, with reference to FIGS. 3, 4 and 8*a-e*. The inventors do not wish to be bound by this theory, which is provided for the purposes of enhancing a reader's understanding of the invention.

The following discussion provides an example method for substantially eliminating four harmonic components out of the first five harmonic components of image charge signals, using five image charge/current signals obtained by:

- producing ions;
- trapping the ions using a mass analyser, such that the trapped ions undergo oscillatory motion in the mass analyser;
- obtaining five image charge/current signals representative of the trapped ions undergoing oscillatory motion in the mass analyser;
- providing the plurality of image charge/current signals in the frequency domain.

For the purposes of this discussion, it is assumed that each of the five image charge/current signals is an image charge/current signal obtained using a respective image charge detector (including a respective "pick-up" electrode and a respective charge sensitive amplifier) of the mass analyser 120 shown in FIG. 3.

1. Generality in the Profile of Harmonic Peaks in a Fourier Transform of Image Charge/Current Signals Caused by Different Masses If it is assumed that there are different masses, m and $a^2$m, that will induce the same amount of image charge, but that the speed of variation is inverse proportion to a. If the image charge signal for the first ion of mass m is $I_1(t)$, then for the second ion of mass $a^2$m, the image charge signal should be:

$$I_2(t)=I_1(t/a) \quad [1.1]$$

This is due to the velocity of the second ion reduces by factor of a, and in turn the time profile expand by factor of a.

It can be proved that if the signal last forever ($-\infty<t<\infty$), and $FT(I_1(t))=F_1(\nu)$, then $$FT(I_2(t))=F_1(a\nu) \quad [1.2]$$

This means that after a Fourier transform, the frequency domain signals of two masses have same profile but the one with larger mass is compressed in the ν axis by a factor of a. The ratios between the harmonic peaks should not be affected by such compression.

2. Selecting Coefficients for Suppressing/Substantially Eliminating Harmonic Components The following discussion describes selecting coefficients for suppressing/substantially eliminating harmonic components in a linear combination of image charge/current signals obtained using five image charge detectors, in the manner described above.

From each image charge detector, we can obtain an image charge/current signal and perform an FFT to provide the image charge/current signal in the frequency domain as $F_j(\nu)$, where j is an index of the detector used to obtain the image charge/current signal.

An index k=1, 2, 3, 4, 5 is used to indicate each of the first five harmonic components of the image charge/current signals in the frequency domain, i.e. such that k=1 indicated the first ("fundamental") harmonic component.

Now, for the jth image charge/current signal in the frequency domain (e.g. obtained using the second image charge detector), the complex value of the kth harmonic peak intensity caused by ions having a reference mass/charge ratio m/z can be recorded as a respective element $C_{jk}$ (m/z) of an "elimination" matrix C:

$$C=\begin{pmatrix} C_{11}(m/z) & C_{21}(m/z) & C_{31}(m/z) & C_{41}(m/z) & C_{51}(m/z) \\ C_{12}(m/z) & C_{22}(m/z) & C_{32}(m/z) & C_{42}(m/z) & C_{52}(m/z) \\ C_{13}(m/z) & C_{23}(m/z) & C_{33}(m/z) & C_{43}(m/z) & C_{53}(m/z) \\ C_{14}(m/z) & C_{24}(m/z) & C_{34}(m/z) & C_{44}(m/z) & C_{54}(m/z) \\ C_{15}(m/z) & C_{25}(m/z) & C_{35}(m/z) & C_{45}(m/z) & C_{55}(m/z) \end{pmatrix}$$

As an example, the element $C_{24}$ (m/Z) in the elimination matrix C indicates, for the second image charge/current signal (e.g. obtained using the second image charge detector) in the frequency domain, the complex value of the fourth harmonic peak caused by ions having the reference mass/charge ratio m/z. This would correspond to the complex value of the peak labelled $H_4$ in FIG. 8*d*, for example.

The process of recording the element $C_{jk}$ can be simplified by obtaining image charge/current signals using ions having only the reference mass/charge ratio m/z, since this means that, in the frequency domain, each harmonic component will expressed as a single harmonic peak caused by ions having the reference mass/charge ratio m/z. However, it should still be possible to record the elements $C_{jk}$ if image charge/current signals are produced using ions having more than one mass/charge ratio, provided that, in the frequency domain, the harmonic peaks caused by ions having the reference mass/charge ratio can be identified.

A function $F_j(\nu)$ may be defined to represent the image charge/current signal obtained using the jth image charge detector in the frequency domain.

Each row in the elimination matrix C can be viewed as the function $F_j(\nu)$ sampled at frequencies corresponding to each of the first five harmonic components.

If it is aimed to eliminate the k th harmonic peak by linear combination, the correspondent row in matrix C should satisfy the relation:

$$C_{1k}x_1+C_{2k}x_2+C_{3k}x_3+C_{4k}x_4+C_{5k}x_5=0$$

A "solution" vector X of five undetermined coefficients may be defined as:

$$X=[x_1,x_2,x_3,x_4,x_5]^T$$

Then, a linear combination L of the five image charge/current signals sampled at corresponding harmonic peak frequencies in the frequency domain using the five undetermined coefficients can be given by L=CX, For the elimination of the second, third, fourth and fifth harmonic components, equation L=CX must be satisfied, where the vector L may be defined as $L=[a,0,0,0,0]^T$, where a is a non-zero element, preferably with a=1. This will leave only the first harmonic component out of the first five harmonic components.

The solution vector X aimed at eliminating all but one of the first five harmonic components can be obtained as:

$$X=C^{-1}L \quad [2.1]$$

This leaves five linear equations aimed at eliminating the second, third, fourth and fifth harmonic components:

$$C_{11}x_1+C_{21}x_2+C_{31}x_3+C_{41}x_4+C_{51}x_5=a$$

$$C_{12}x_1+C_{22}x_2+C_{32}x_3+C_{42}x_4+C_{52}x_5=0$$

$$C_{13}x_1+C_{23}x_2+C_{33}x_3+C_{43}x_4+C_{53}x_5=0$$

$$C_{14}x_1+C_{24}x_2+C_{34}x_3+C_{44}x_4+C_{54}x_5=0$$

$$C_{15}x_1+C_{25}x_2+C_{35}x_3+C_{45}x_4+C_{55}x_5=0$$

With five undetermined coefficients: $x_1, x_2, x_3, x_4, x_5$.

Solving these linear equations is trivial, and allows coefficients $x_1, x_2, x_3, x_4, x_5$ to be selected so as to eliminate the second, third, fourth and fifth harmonic components, leaving behind first, sixth and higher order harmonic components.

In above process, the coefficients are found based on the matrix C which is sampled from the peak value of a number of harmonic frequency points. The coefficients $x_j$ can be then applied to the whole frequency spectrum $F_j(\nu)$ to achieve the peak elimination after the linear combination.

It has already been shown that the profile of the image charge/current signal in the frequency domain is independent of the mass/charge ratio of ions used, such that all elements in the elimination matrix C (which may be the complex value of harmonic peak intensities) will change by only a common factor depending on what mass/charge ratio is chosen as the reference mass/charge ratio for populating the elimination matrix C. That is:

$$C_{jk}(m/z') = G\left(\frac{m/z'}{m/z}\right)C_{jk}(m/z) \quad [2.2]$$

where G((m/z')/(m/z)) is a mass to charge ratio dependent factor function and m/z and m/z' are different reference mass/charge ratios.

It follows that the vector L'=C(m/z')X, which represents the frequency spectrum caused by ions having a different reference mass/charge ratio m/z' (in a linear combination of the five image charge signals), should also have second, third, fourth and fifth elements that are substantially eliminated (=0), leaving behind first, sixth and higher order harmonic components caused by ions having the different reference mass/charge ratio m/z'.

Similarly if $F=[F_1, F_2, F_3, F_4, F_5]$ represents five image charge/current signals in the frequency domain (FFT profiles), with the five image charge/current signals being representative of trapped ions having a mixture of many mass/charge ratios, the linear combination of image charge/current signals in the frequency domain ("frequency spectrum") represented by FX should have second, third, fourth and fifth harmonic components that are substantially eliminated, leaving behind first, sixth and higher order harmonic components caused by ions having the mixture of many mass/charge ratios.

Since FX provides information regarding the mass/charge ratio distribution of the ions that have been trapped, where one of the harmonic components is promoted relative to the other four harmonic components that are all suppressed, FX can be viewed as mass spectrum data providing clearer information regarding the mass/charge ratio distribution of the ions that have been trapped.

FX is therefore the mass spectrum data we seek after for the mixture of many mass/charge ratios.

Here, it is to be noted that:

$$\begin{aligned} FX &= x_1F_1(\upsilon) + x_2F_2(\upsilon) + x_3F_3(\upsilon) + x_4F_4(\upsilon) + x_5F_5(\upsilon) \quad [2.3] \\ &= x_1FFT[F_1(t)] + x_2FFT[F_2(t)] + x_3FFT[F_3(t)] + \\ &\quad x_4FFT[F_4(t)] + x_5FFT[F_5(t)] \\ &= FFT[x_1F_1(t)] + FFT[x_2F_2(t)] + FFT[x_3F_3(t)] + \\ &\quad FFT[x_4F_4(t)] + FFT[x_5F_5(t)] \\ &= FFT[x_1F_1(t) + x_2F_2(t) + x_3F_3(t) + x_4F_4(t) + x_5F_5(t)] \end{aligned}$$

Thus, the linear combination can be produced before or after performing the FFT. Preferably, the linear combination is produced before performing the FFT, i.e. as $x_1F_1(t)+x_2F_2(t)+x_3F_3(t)+x_4F_4(t)+x_5F_5(t)$, since this generally requires fewer FFTs and FFT processes can be time consuming. Note that more than one FFT could be required even if the linear combination is produced before performing the FFT, e.g. if $x_j$ is a complex number and a computer program for performing an FFT on complex numbers is not available.

3. Alternative Approaches

The theoretical discussion above is based on substantially eliminating the second, third, fourth and fifth harmonic components, whilst leaving behind first, sixth and higher order harmonic components.

Of course, if it is wanted to retain another harmonic component instead of the first harmonic component, the non-zero element a in the vector L could be put in any other place.

Equally, the vector L could be defined as $L=[a,b,c,d,e]^T$, where a is greater than b, c, d and e, if it were desirable merely to suppress but not necessarily substantially eliminate the second, third, fourth and fifth harmonic components relative to the first harmonic component. Also, if it is wanted to suppress/eliminate more/fewer than four harmonic components, then more/fewer image charge/current detectors could be used, with the matrix C and vectors X, L being adjusted accordingly.

The theoretical discussion above is also based using a plurality of image charge/current signals obtained using a plurality of image charge detectors, with each image charge/current signal being obtained using a respective image charge detector of a mass analyser 120 shown in FIG. 3 (modified to include five image charge detectors instead of four).

Other arrangements are also possible.

For example, it would be possible to use a plurality of image charge/current signals each being obtained using a respective image current detector. Note here that an image charge signal can be obtained using an image current detector e.g. by integrating an image current signal produced by the image current detector As another example, it would be possible for two or more of the plurality of image charge/current signals to be obtained using the same image charge/current detector.

As a simpler example, all of the plurality of image charge/current signals may be obtained using a single image charge/current detector, but deduced with different parameters. Such an arrangement will now be described with reference to FIGS. 5*a-c*.

Figure 5A:
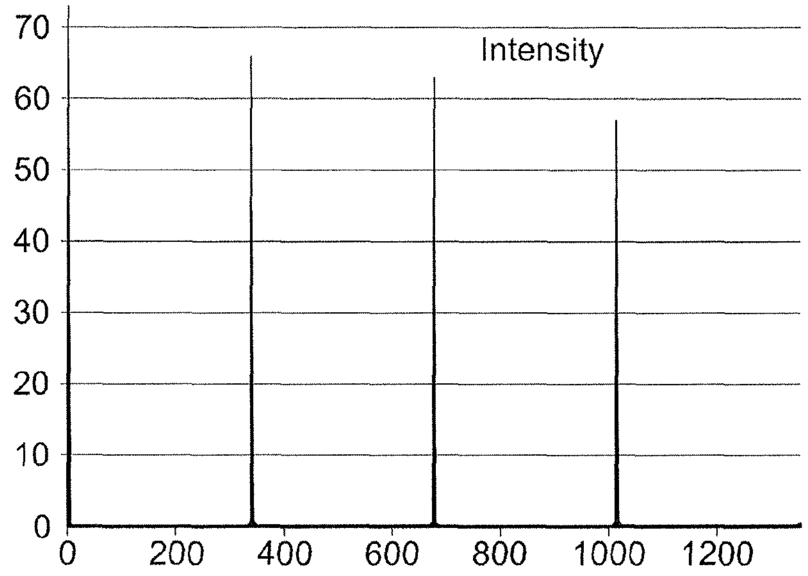
FIGS. 5*a-c* show three image charge signals obtained using only one image charge detector, which have been converted from the time domain into the frequency domain using an FFT and modified using different formulae.
Figure 5B:
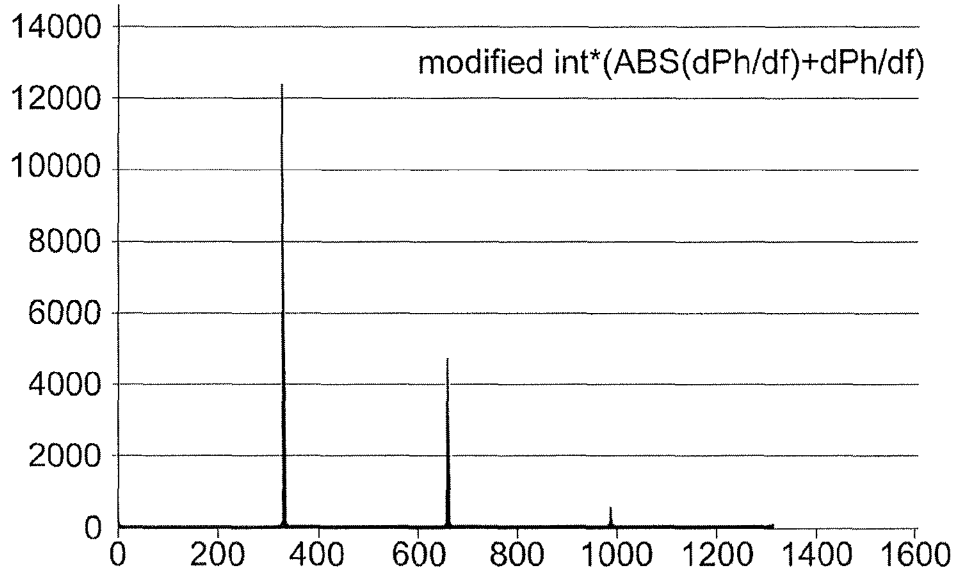
Figure 5C:
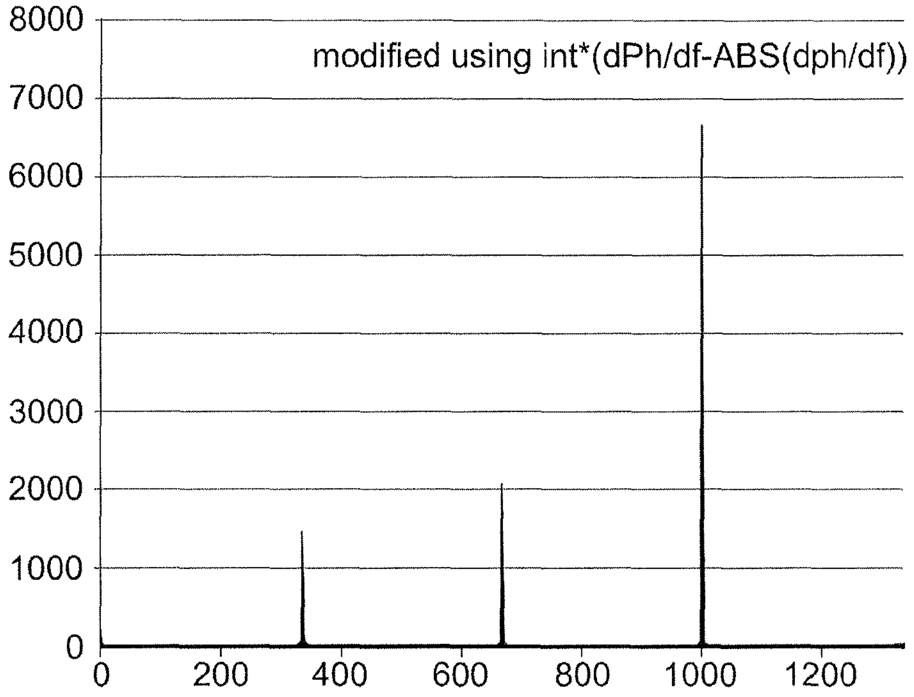
Figure 6A:
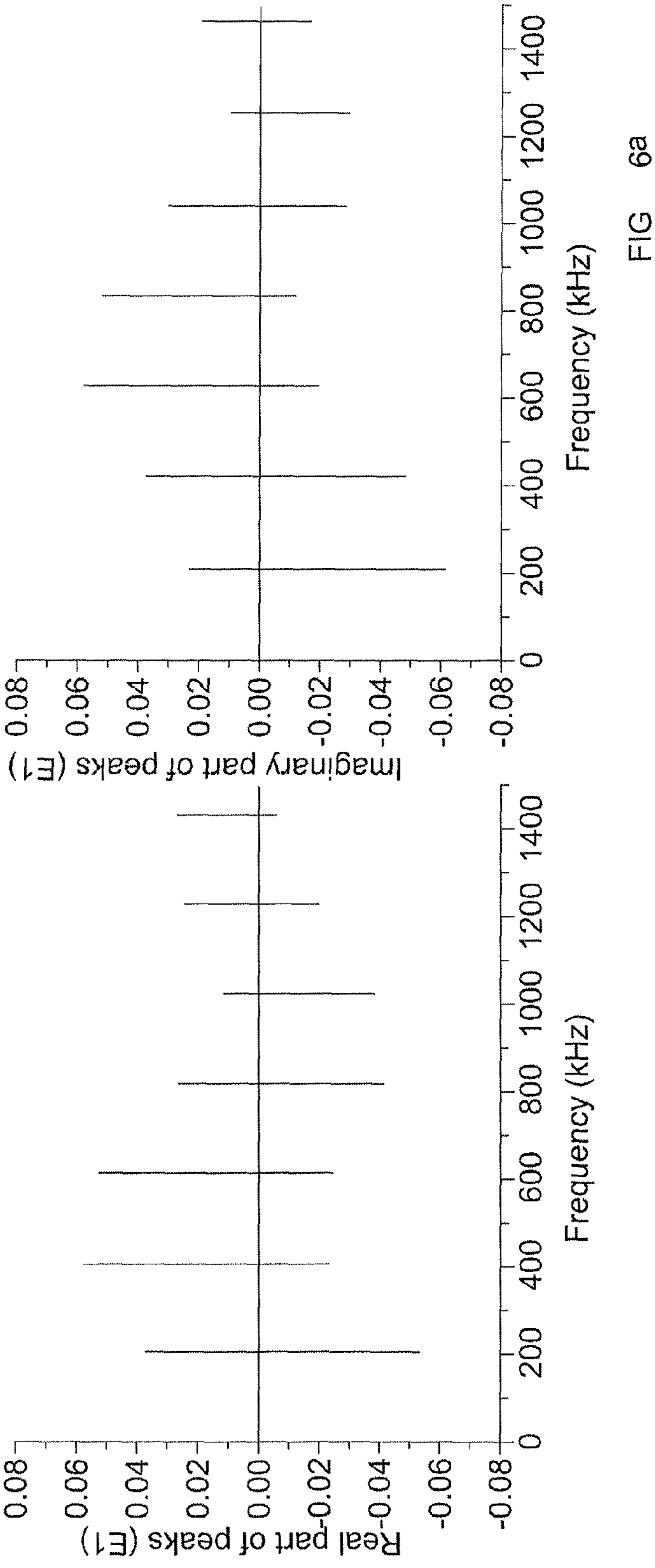
FIGS. 6*a-e* show results of simulations performed in Example 1.
Figure 6B:
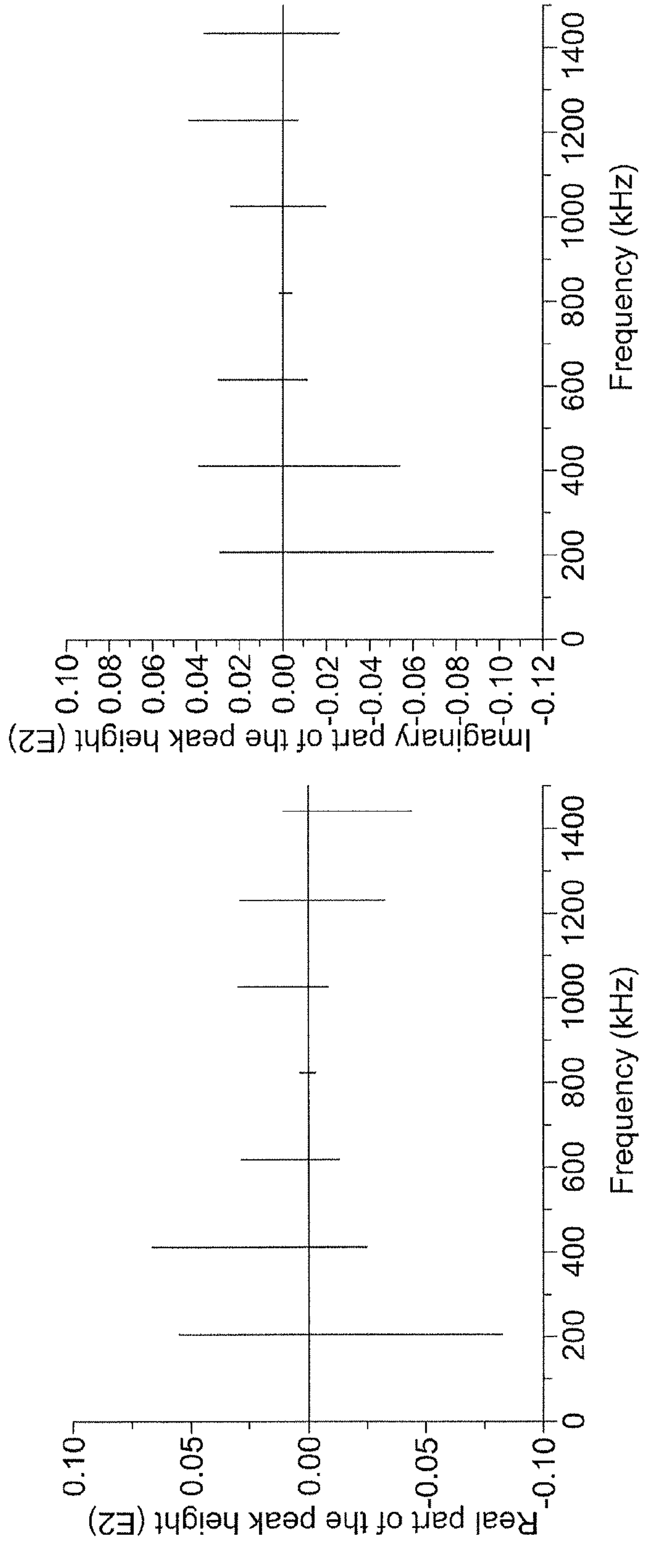
Figure 6C:
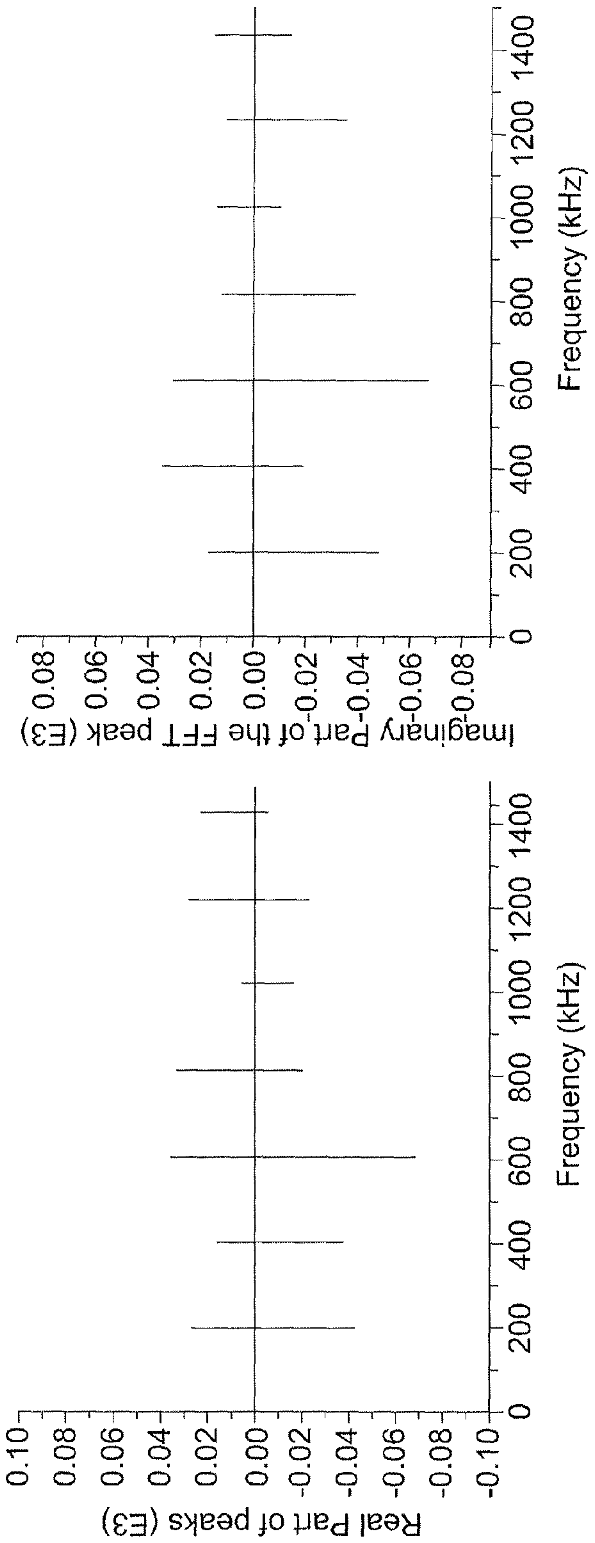
Figure 6D:
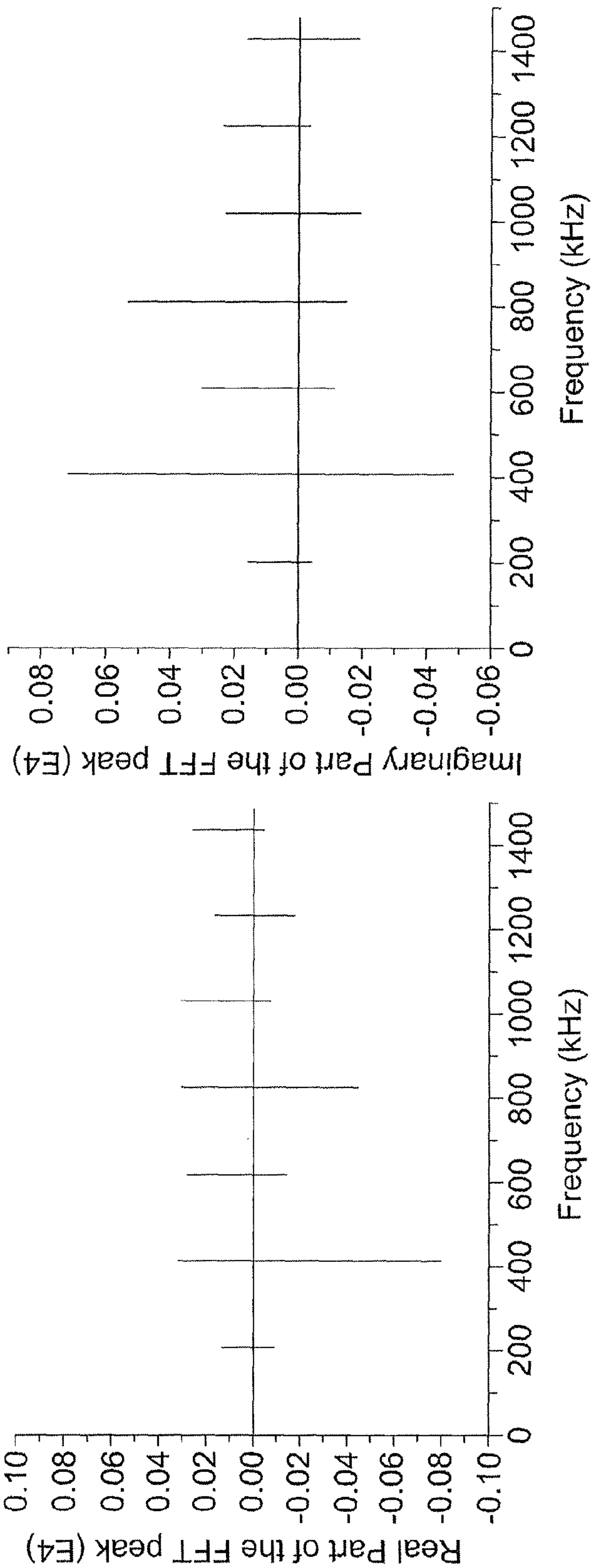
Figure 6E:
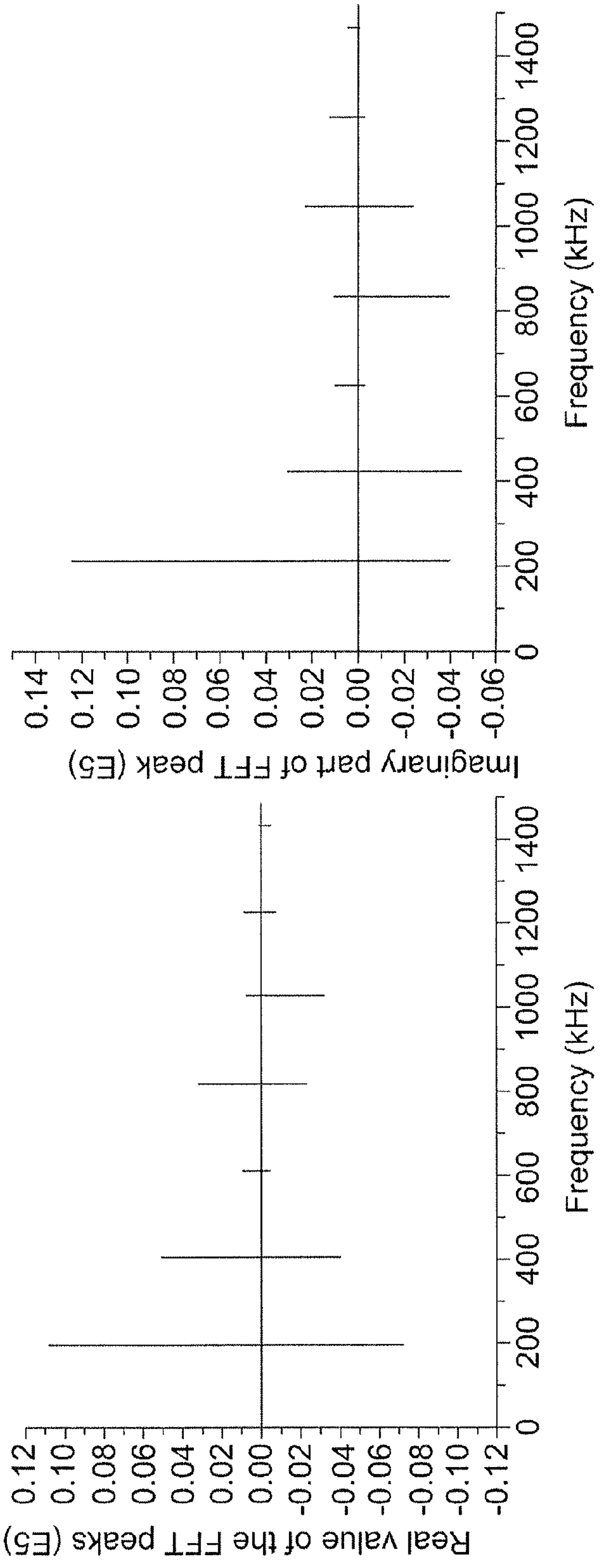

FIGS. 5*a-c* show three image charge signals obtained using only one image charge detector, which have been converted from the time domain into the frequency domain using an FFT and modified using different formulae.

The result of the FFT on an image charge/current signal in the time domain usually gives a complex value such that it is possible to plot two graphs, one for the real component and one for the imaginary component.

However, another way of presenting the result of an FFT is to plot only the absolute intensity ($\sqrt{Re^2+Im^2}$) whilst recording a phase angle derived from (e.g. a ratio of) the real and imaginary intensity. The inventors have found that the phase angle information can be used to decode the frequency spectrum from a particular image charge/current detector and generate more than one image charge/current signals in the frequency domain. The inventors have found that for certain ion injection conditions, the phase angle varies for different harmonic peaks but usually stays approximately the same for different mass to charge ratios (even though their harmonic peaks occur at different frequencies). The inventors have further found that the variation of phase angle therefore provides a distinct feature that can be used to identify which harmonic a peak belongs to.

Thus, a plurality of image charge/current signals may be obtained using only one image charge/current detector.

For example, a first image charge/current signal may be obtained simply by taking the absolute intensity from the FFT data (see FIG. 5*a*).

A second image charge/current signal may be obtained by modulating the absolute intensity by the positive amplitude of the phase derivative, e.g.

$$F_2(v) = F_1(v)\left(\frac{d\phi}{dv} + \left|\frac{d\phi}{dv}\right|\right)$$

This has the result of emphasising the peaks with large phase increase (see FIG. 5*b*).

A third image charge/current signal may be obtained by modulating the absolute intensity by the negative amplitude of the phase derivative, e.g.

$$F_3(v) = F_1(v)\left(-\frac{d\phi}{dv} + \left|\frac{d\phi}{dv}\right|\right)$$

This has the result of emphasising the peaks with large phase decrease (see FIG. 5*c*).

It can be seen that the individual "decoded" frequency spectrums shown in FIGS. 5*b* and FIG. 5*b* are not sufficient to preclude certain unwanted harmonics. However, a linear combination can then be produced to substantially eliminate the unwanted harmonics. A method of obtaining the coefficients for the linear combination for the image charge/current signals obtained in this way could be realised in the same manner as described above, although only real value of matrix elements would be involved in this case.

4. Other Factors

The property of mass independency of FT profile is generally correct as has been shown above.

However, if a discrete FT is performed, such as an FFT operation, then the sampled data has a limited number, such that there may be a problem with the aforementioned property.

For example, if the $k^{th}$ harmonic peak $f(m/z_1)$ for a mass/charge ratio $m/z_1$ is at $n_k$, the harmonic peak for another mass/charge ratio $m/z_2$ will be at $an_k$ which may not be the integer number. This is to say $FFT(I_2(t_n))=F(an_k)$ may not be always valid. If the peak is very sharp, the top of the peak will hardly be hit by the discrete points of the FFT and we may have to use the value of nearest integer point to form the elimination matrix C and obtain the coefficients of the solution vector X. Calculating C and X in this way may contain deviation between different mass/charge ratios.

In practice, if a discrete FT, such as an FFT, is used in selecting the predetermined coefficients (e.g. for eliminating certain harmonic components), then it is better to use more frequency points (smaller frequency steps), preferably so that several points can be sampled for each harmonic peak. On the other hand instead of padding zero in time domain data in order to enlarge the data points, a special window function may be implemented so that the frequency leakage can be reduced. Here, it is highly preferable to use the same frequency step and frequency range in the FFT for selecting predetermined coefficients and for producing a linear combination of (real) image charge/current signals in the frequency domain. Otherwise incomplete elimination will usually occur due to errors in the calculation. With properly selected frequency steps and window function, the final mass spectrum can be made clean from the noise wave around the mass peaks as well as minimum spurious peaks contributed from unwanted harmonics.

As we can see in the following example, using higher order of harmonic component to present a mass spectrum often offers a higher mass resolving power. In some case, we may aim at eliminating the first n−1 harmonic components while keeping the higher components from the nth order, by using linear combination with predetermined coefficients. If the range of mass to charge ratios is not very narrow the harmonic components higher than n will still tend to overlap with the nth order harmonic components, although those harmonic components lower than n has already been substantially eliminated. In such case a further peak deconvolution procedure may be used, such as using least square regression, e.g. as disclosed in US2011/0240845 with base functions in frequency domain, or using comb-sampling extraction in frequency domain to obtain a clean mass spectrum.

It is also possible to aim at eliminating the harmonic components from the n th order to n+m th order, while keep the harmonics component below nth order. For example, we can aim at eliminating the $4^{th}$ to $8^{th}$ harmonic components, by using linear combination with predetermined coefficients. The remaining first, second and third harmonic frequency components may cause peak overlapping if the rang of mass to charge ratio is not very narrow. However, as long as the third harmonic frequency of smallest mass does not exceed the $9^{th}$ order harmonic frequency of the highest mass in the range, the mixed up with only 3 components of peaks can still be resolved easily. For example a spectrum deconvolution routine may start from a lowest mass in the range and scan the frequency point from high to low. The $3^{rd}$ harmonic of at low mass end may be hit as a first non-zero peak value. The complex values of its respective $2^{nd}$ and first harmonics are easily predicted using the known ratio between these peak values. As the third harmonic provides good mass resolving power as well as mass accuracy, the predicted frequency points for the $2^{nd}$ and the $1^{st}$ harmonic peaks can be very accurate (compared an alternative scan up routine). The acquired $2^{nd}$ and $1^{st}$ peak values are deducted from the original complex spectrum. Then, a next non-zero peak value is searched by step down the frequency. Once found, the respective $2^{nd}$ and $1^{st}$ harmonic component values in complex are again calculated using the same rule, and deducted from the complex frequency spectrum obtained after the previous deduction, and so on, until the whole spectrum is processed.

Of cause such a deconvolution algorithm can also be replaced by using above mentioned methods where least square regression or the comb-sampling extraction in frequency domain is involved.

EXAMPLES

The following examples describe simulations performed to demonstrate the principles of the invention.

Example 1

A mass/charge ratio of 400 Th was selected as a reference mass/charge ratio.

A simulation was performed to obtain five image charge signals representative of trapped ions having only the reference mass/charge ratio undergoing oscillatory motion in a mass analyser. In the simulation, each of the five image charge signals were obtained using a respective image charge detector of the mass analyser 120 shown in FIG. 3 over a period of 20 ms.

An FFT with total frequency number $2^{23}$ was performed on all five image charge signals, one by one, to convert the five image charge signals from the time domain to the frequency domain, thereby obtaining five FFT profiles. The five FFT profiles were then displayed.

In FIGS. 6*a-e*, the real intensities (left-hand plots) and imaginary intensities (right-hand plots) of the five FFT profiles obtained using each of the five image charge detectors are plotted against frequency.

The complex values at each peak position up to the fifth harmonic peak (the fifth peak counting from left to right) were then recorded for each FFT profile to form an elimination matrix C, in which each column can be viewed as a vector representing the image charge signal obtained using a respective "pick-up" electrode.

| | | | | |
|---|---|---|---|---|
| −0.0246 − 0.0632i | −0.0384 − 0.0983i | −0.0192 − 0.0491i | 0.0057 + 0.0146i | 0.0485 + 0.1243i |
| 0.0467 − 0.0430i | 0.0537 − 0.0494i | −0.0316 + 0.0291i | −0.0666 + 0.0613i | 0.0418 − 0.0385i |
| 0.0511 + 0.0250i | 0.0286 + 0.0140i | −0.0714 − 0.0349i | 0.0285 + 0.0139i | 0.0103 + 0.0050i |
| −0.0040 + 0.0487i | 0.0004 − 0.0054i | 0.0032 − 0.0386i | −0.0044 + 0.0533i | 0.0033 − 0.0398i |
| −0.0320 − 0.0253i | 0.0246 + 0.0195i | −0.0141 − 0.0112i | 0.0251 + 0.0199i | −0.0255 − 0.0202i |

For substantial elimination of the second, third, fourth and fifth harmonic components (to leave the first, sixth and higher order harmonic components), a vector L was defined as:

$$L=[1,0,0,0,0]^T$$

The solution vector X was then calculated as:

$$X=[x_1,x_2,x_3,x_4,x_5]^T=\begin{bmatrix}-1.6263+4.1715i\\-3.1495+8.0828i\\-3.8622+9.9077i\\-2.9562+7.5850i\\-1.7743+4.5537i\end{bmatrix}$$

The coefficients $x_1$, $x_2$, $x_3$, $x_4$, $x_5$ from the solution vector X can then be used to produce a linear combination of a plurality of image charge/current signals representative of trapped ions having any mixture of mass/charge ratios that have been obtained using the five "pick-up" electrodes.

A mixture of mass/charge ratios ("mix 3") was then chosen as shown in Table 1.

TABLE 1

| Mass/charge ratio (Th) | Number of ions | Frequency of first harmonic (kHz) |
|---|---|---|
| 720 | 15 | 153.07 |
| 500.5 | 12 | 183.49 |
| 500 | 20 | 183.66 |
| 181 | 1 | 305.53 |
| 180 | 10 | 306.14 |
| 150 | 15 | 335.31 |

Another simulation was performed to obtain five image charge signals representative of trapped ions having the chosen mixture of mass/charge ratios undergoing oscillatory motion under the same conditions as the simulation used to obtain the solution vector X (i.e. using the same five image charge detectors to obtain the five image charge signals over a period of 20 ms).

Figure 7A:
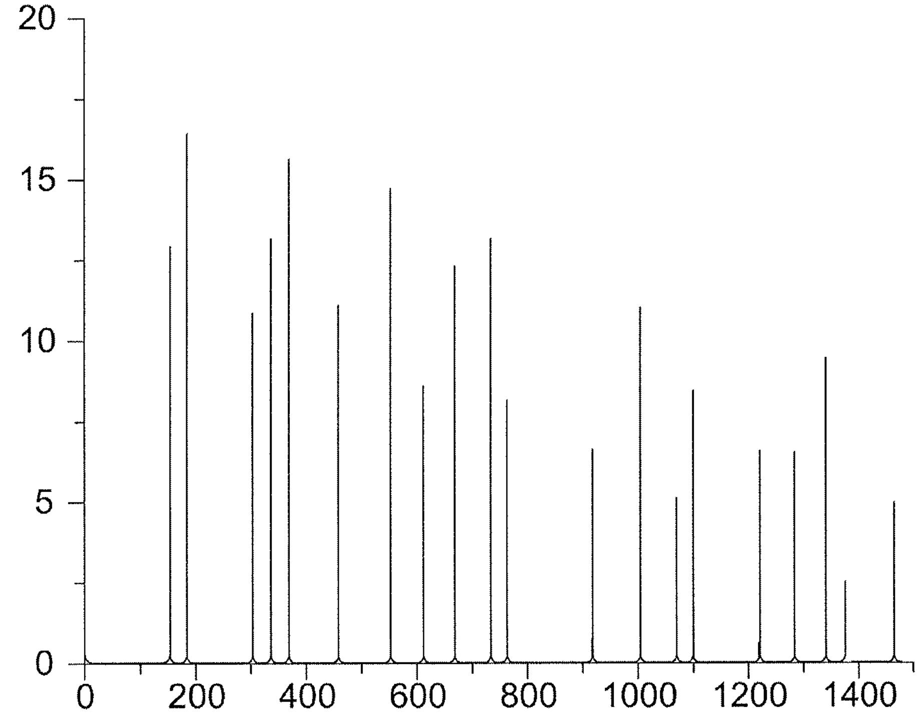
FIGS. 7*a-e* show results of simulations performed in Example 1.

An FFT with total frequency number $2^{23}$ was performed on all five image charge signals, one by one, to convert the five image charge signals from the time domain to the frequency domain, thereby obtaining five FFT profiles. One of the FFT profiles for signal obtaining from $1^{st}$ electrode is displayed in FIG. 7*a*.

Next, a linear combination of the five image charge signals was produced using the coefficients $x_j$ taken from solution vector X.

Figure 7B:
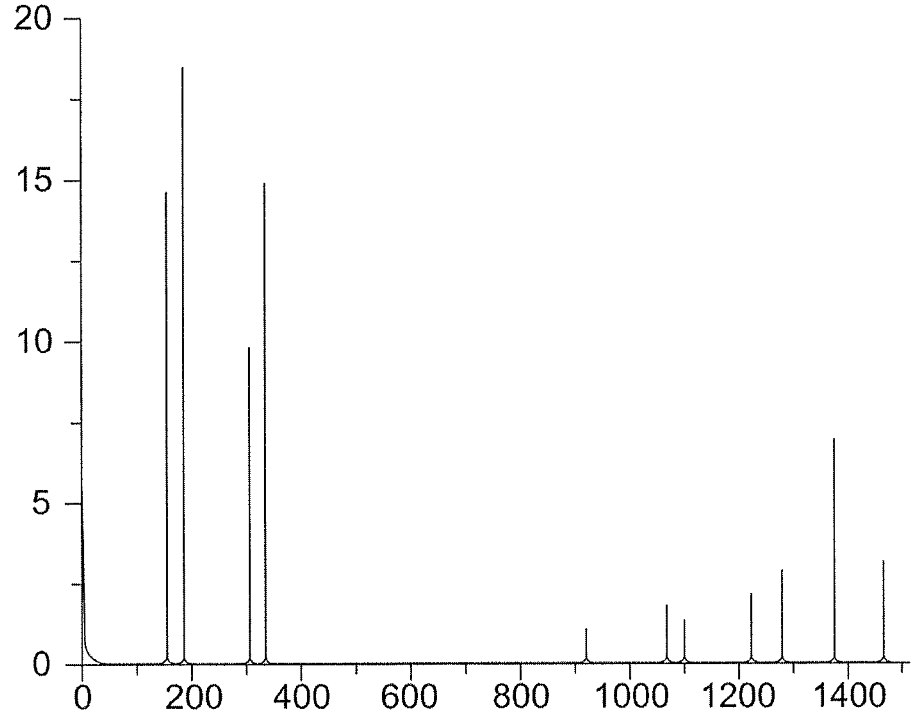

FIG. 7*b* is a linear combination of the five FFT profiles obtained using the five image charge detectors. The linear combination used the coefficients $x_1$, $x_2$, $x_3$, $x_4$, $x_5$ from the solution vector X such that the second, third, fourth and fifth harmonics are substantially eliminated to leave the first, sixth and higher order harmonics components. Here, 4 main peaks can be seen on the left hand side of spectrum, because the mass 500.5 and 500 Th are too close to be distinguished in the graph, and 181 and 180 are also too close to be distinguished so that 6 mass to charge ratios merged into 4 peaks.

Figure 7C:
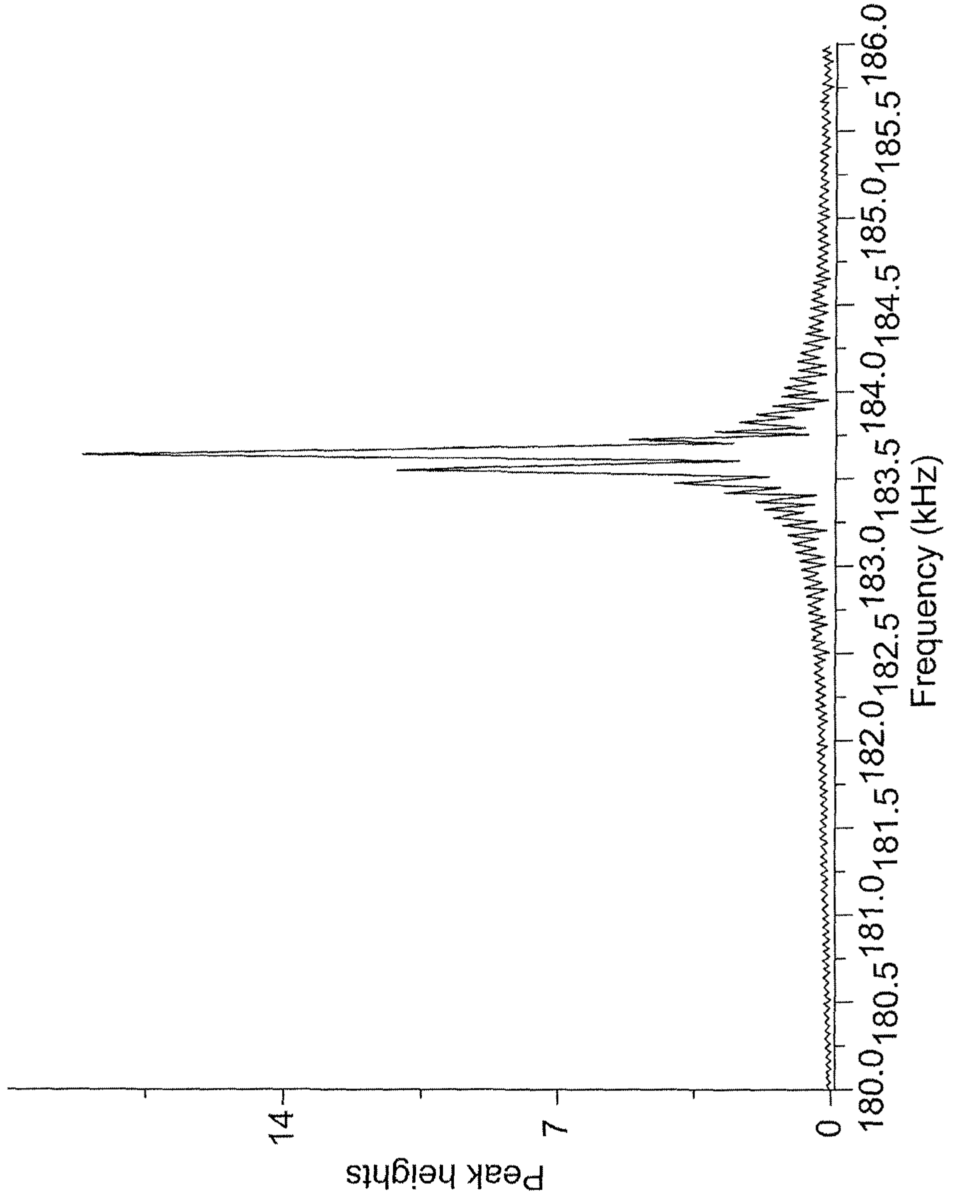

FIG. 7*c* is a zoomed-in view of FIG. 7*b*, showing the first harmonic peaks for the ions having mass/charge ratios of 500 and 500.5 Th.

Figure 7D:
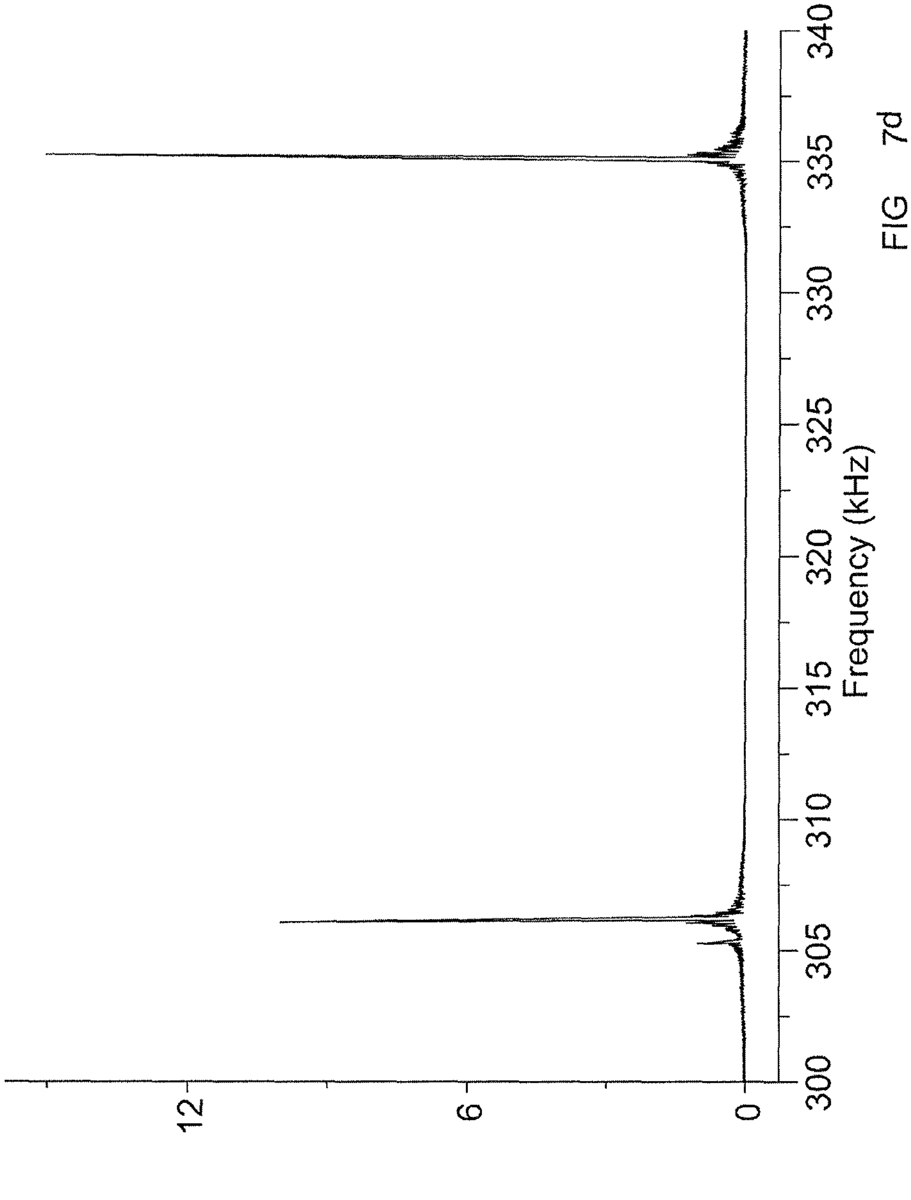

FIG. 7*d* is a zoomed-in view of FIG. 7*b*, showing the first harmonic peaks for the ions having mass/charge ratios of 150, 180 and 181 Th. The height of the peaks are in proportion with the number of ions of each species put into simulation.

Figure 7E:
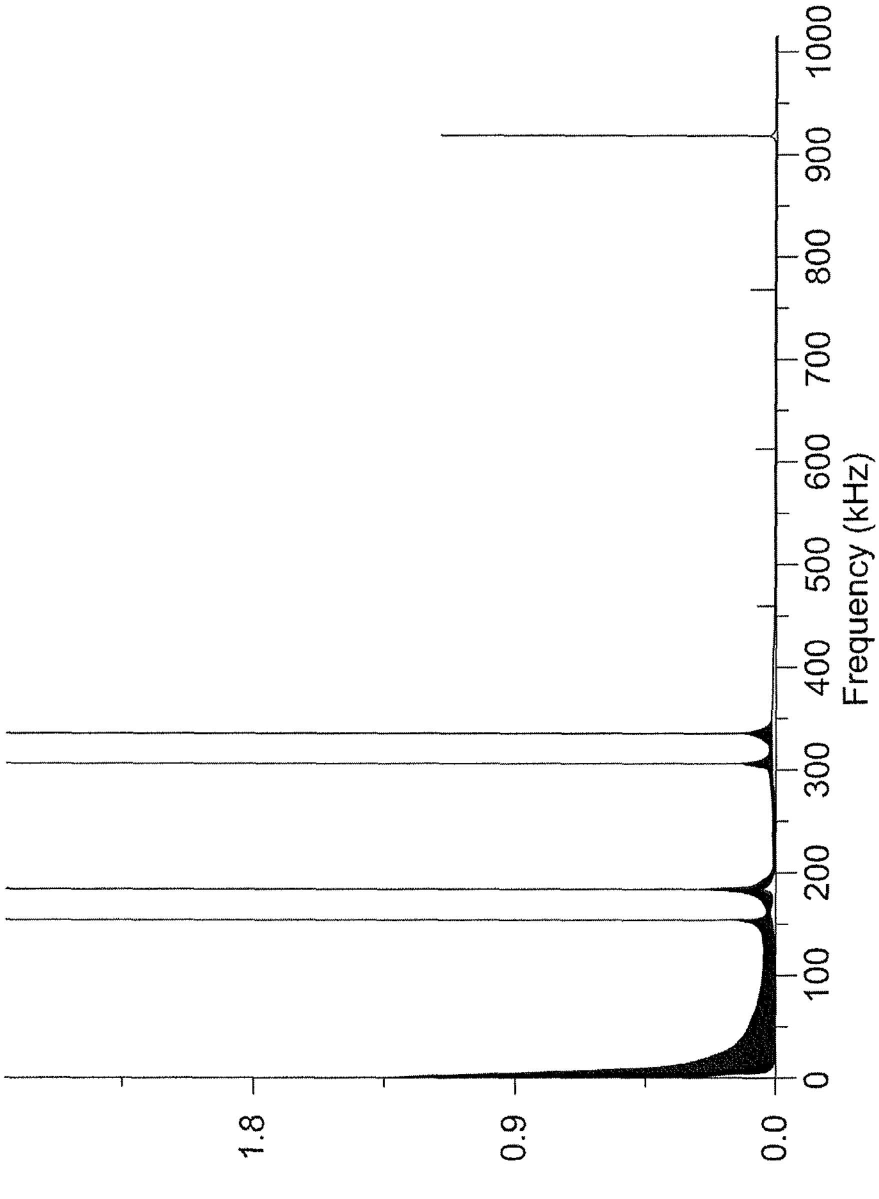
Figure 8A:
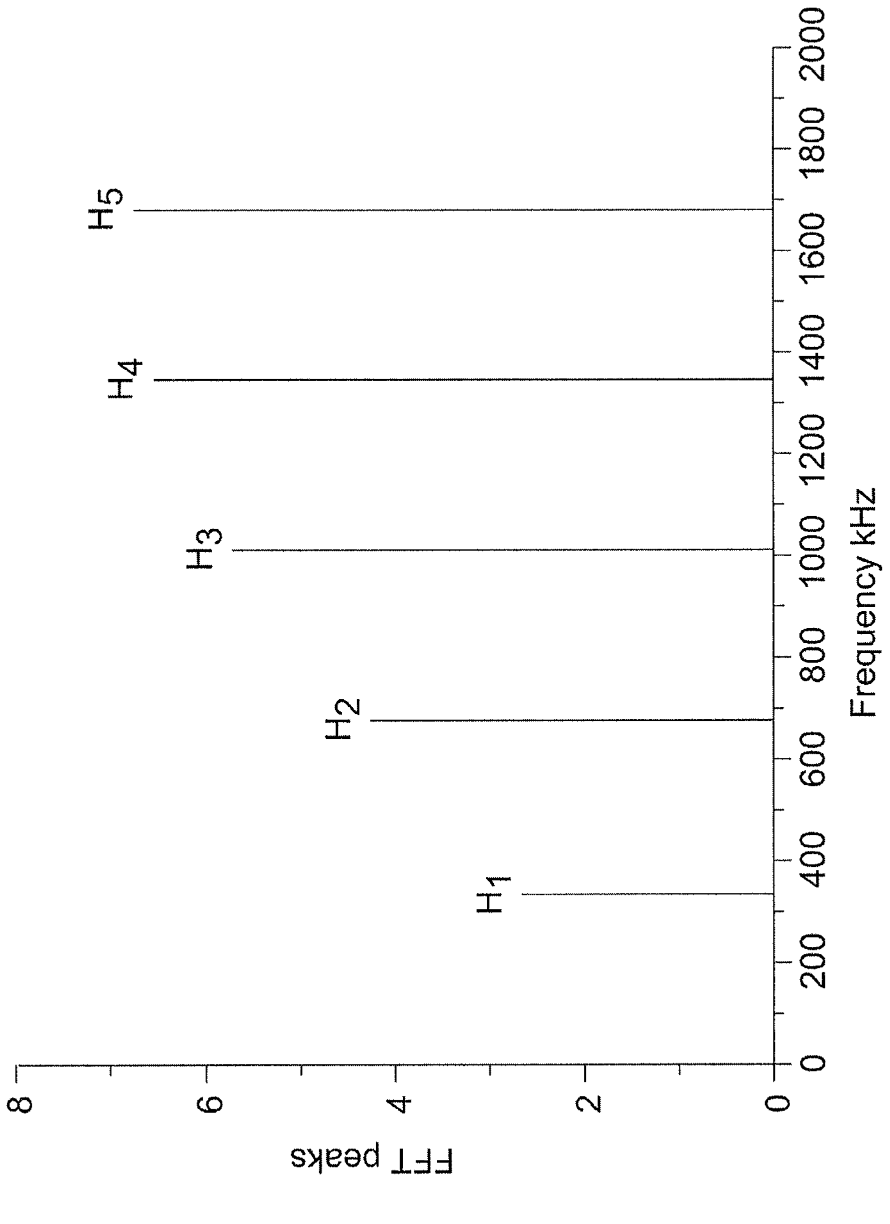
FIGS. 8*a-e* show results of simulations performed in Example 2.
Figure 8B:
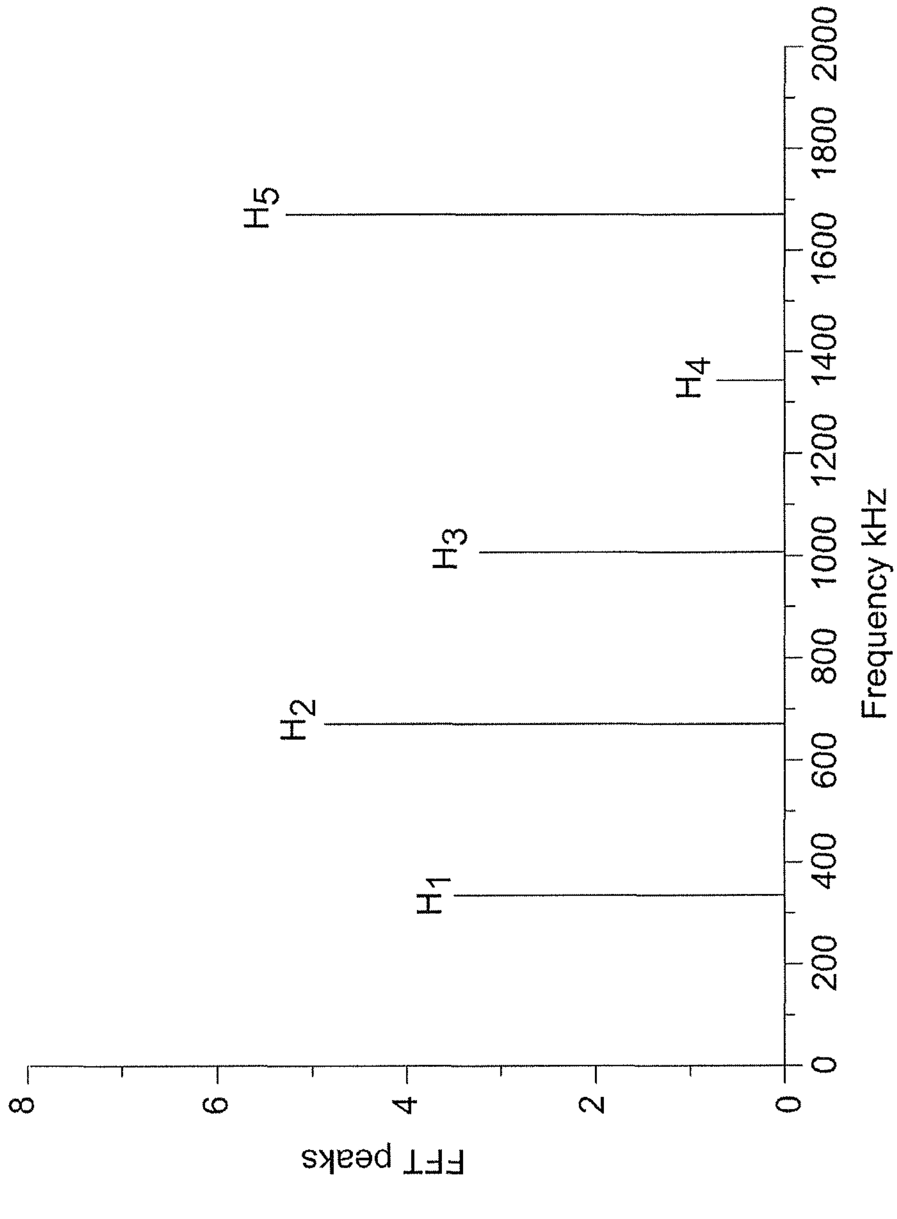
Figure 8C:
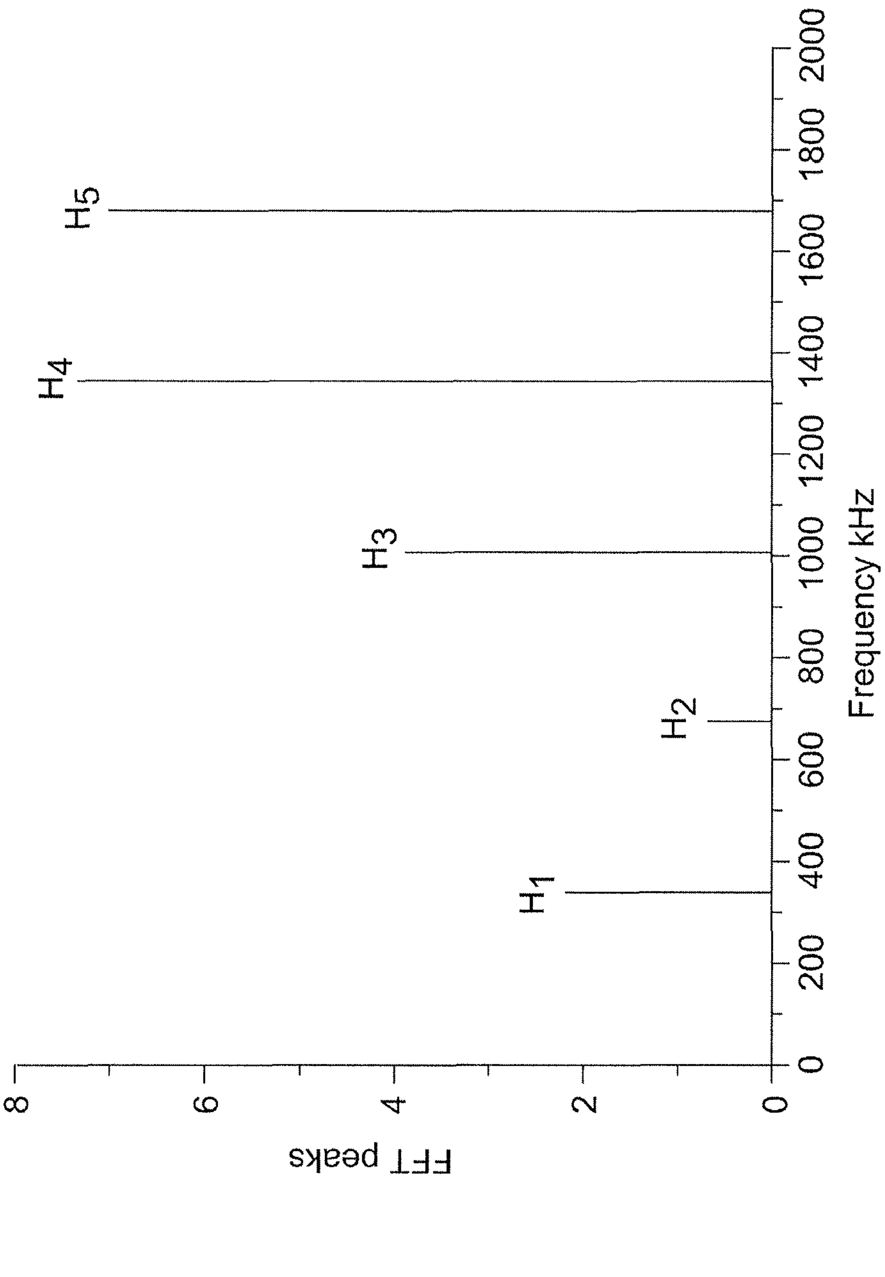
Figure 8D:
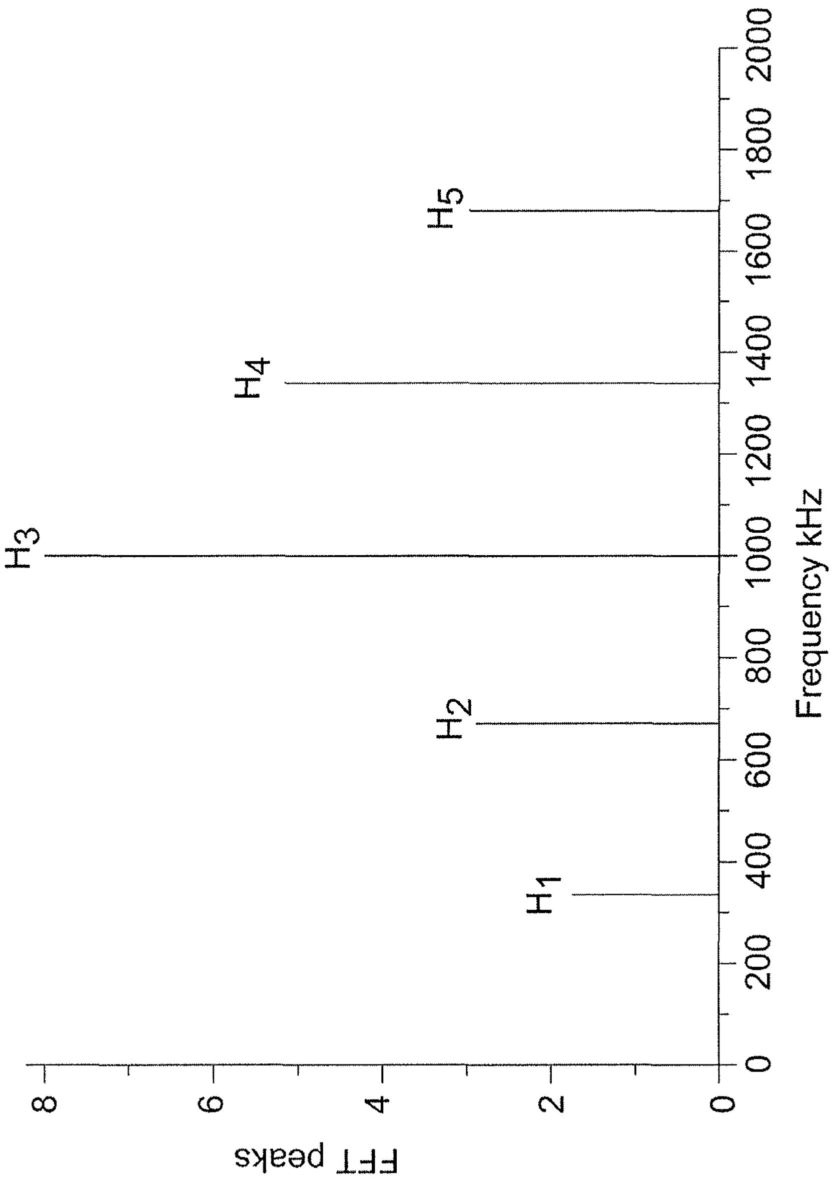
Figure 8E:
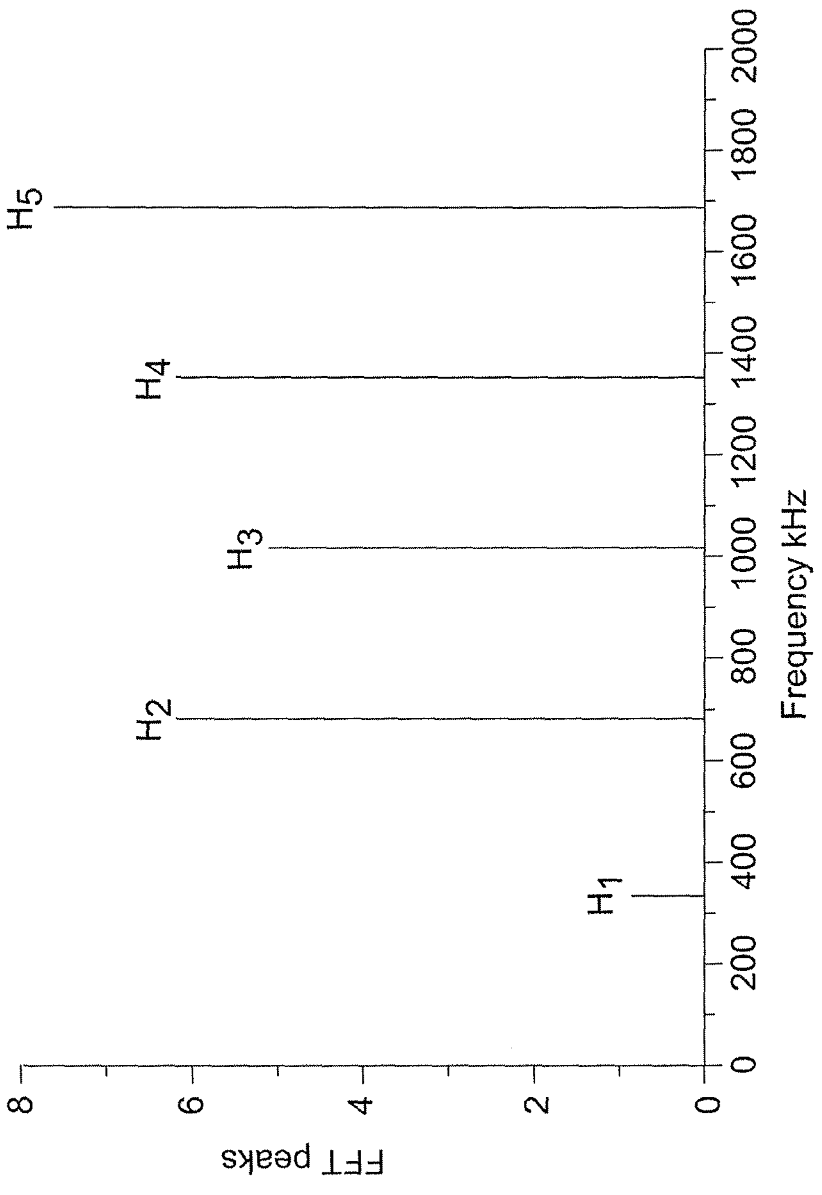

FIG. 7*e* is a zoomed-in view of FIG. 7*b*, with an expanded vertical axis, showing that very little remains of the second, third, fourth and fifth harmonic peaks (although a sixth harmonic peak for ions having mass/charge ratio of 720 Th can be seen at the far right of this plot).

Example 2

In Example 2, simulations were performed in the same way as for Example 1 although image current signals were recorded instead. Again, the mixture of mass/charge ratios was then chosen as shown in Table 2:

TABLE 2

| | Mass (Th) | | | | | |
|---|---|---|---|---|---|---|
| | 720 | 500.5 | 500 | 181 | 180 | 150 |
| Number of ions | 150 | 120 | 200 | 10 | 100 | 150 |
| Frequency For first harmonic | 153.3 | 183.5 | 183.7 | 305.2 | 306.1 | 335 |

For selecting coefficients for the linear combination, the simulation is performed using 100 ions of 150 Th as the reference ions. The elimination matrix C obtained using 100 ions was then calculated as shown in Table 3.

TABLE 3

| Elimination matrix | |
|---|---|
| C(1, 1) = | 2.25994301 − 0.36707985i |
| C(2, 1) = | 1.35692251 + 4.06690407i |
| C(3, 1) = | −5.10962582 + 2.67983103i |
| C(4, 1) = | −3.97460151 − 5.29403687i |
| C(5, 1) = | −1.31414247 − 6.72705126i |
| C(1, 2) = | 3.51686907 − 0.57124120i |
| C(2, 2) = | 1.55984724 + 4.67508602i |
| C(3, 2) = | −2.86608863 + 1.50318837i |
| C(4, 2) = | 0.43882799 + 0.58456469i |
| C(5, 2) = | 1.00981688 + 5.16895008i |
| C(1, 3) = | 1.93018293 − 0.31351796i |
| C(2, 3) = | 0.15512808 + 0.46491912i |
| C(3, 3) = | 3.40785789 − 1.78728938i |

TABLE 3-continued

| Elimination matrix | |
|---|---|
| C(4, 3) = | 4.40777826 + 5.87102985i |
| C(5, 3) = | 1.34258437 + 6.87280369i |
| C(1, 4) = | 1.75751841 − 0.28547308i |
| C(2, 4) = | −0.91862661 − 2.75330544i |
| C(3, 4) = | 7.14230776 − 3.74590302i |
| C(4, 4) = | 3.15379643 + 4.20064449i |
| C(5, 4) = | −0.57791203 − 2.95778489i |
| C(1, 5) = | 0.78230357 − 0.12707111i |
| C(2, 5) = | −1.98152840 − 5.93897867i |
| C(3, 5) = | 4.57197046 − 2.39790392i |
| C(4, 5) = | −3.70357108 − 4.93317795i |
| C(5, 5) = | −1.47447968 − 7.54830360i |

For substantial elimination of the second, third, fourth and fifth harmonic components (to leave the first, sixth and higher order harmonic components), a vector $L_1$ was defined as:

$$L_1=[1,0,0,0,0]^T$$

For substantial elimination of the first, third, fourth and fifth harmonic components (to leave the second, sixth and higher order harmonic components), a vector $L_2$ was defined as:

$$L_2=[0,1,0,0,0]^T$$

For substantial elimination of the first, second, fourth and fifth harmonic components (to leave the third, sixth and higher order harmonic components), a vector $L_3$ was defined as:

$$L_3=[0,0,1,0,0]^T$$

Respective linear combination coefficients $X_1$, $X_2$, $X_3$ are obtained by solving respective equations.

In FIGS. 8*a-e*, the absolute intensities of the five FFT profiles obtained using each of the five image charge detectors are plotted against frequency.

Figure 9A:
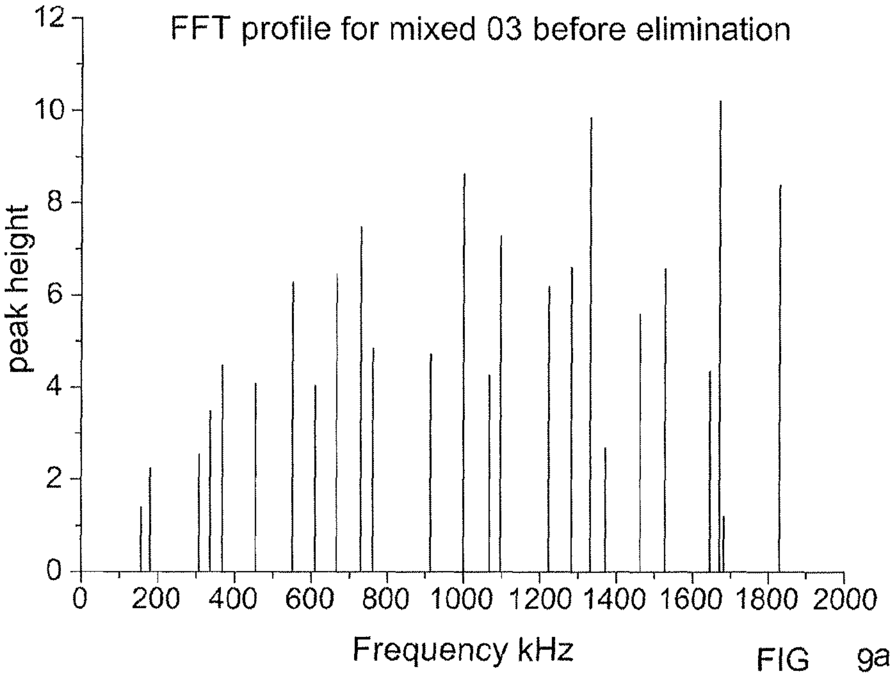
FIGS. 9*a-x* show results of simulations performed in Example 2.

FIG. 9*a* is an FFT profile obtained using one of the five image charge detectors in the simulation. The mass/charge ratio, number of ions present, and frequency of the first-sixth harmonic peaks ($H_1$-$H_6$) for each ion is shown in Table 4.

TABLE 4

| mass | ions | $H_1$ | $H_2$ | $H_3$ | $H_4$ | $H_5$ | $H_6$ |
|---|---|---|---|---|---|---|---|
| 720 | 150 | 153.3 | 306.6 | 459.9 | 613.2 | 766.5 | 919.8 |
| 500.5 | 120 | 183.5 | 367 | 550.5 | 734 | 917.5 | 1101 |
| 500 | 200 | 183.7 | 367.2 | 551.1 | 734.8 | 918.5 | 1102 |
| 181 | 10 | 305.2 | 610.4 | 915.6 | 1320.8 | 1526 | 1831 |
| 180 | 100 | 306.1 | 612.2 | 918.3 | 1324.4 | 1530.5 | 1836.5 |
| 150 | 150 | 335 | 670 | 1005 | 1340 | 1675 | 2010 |

Figure 9B:
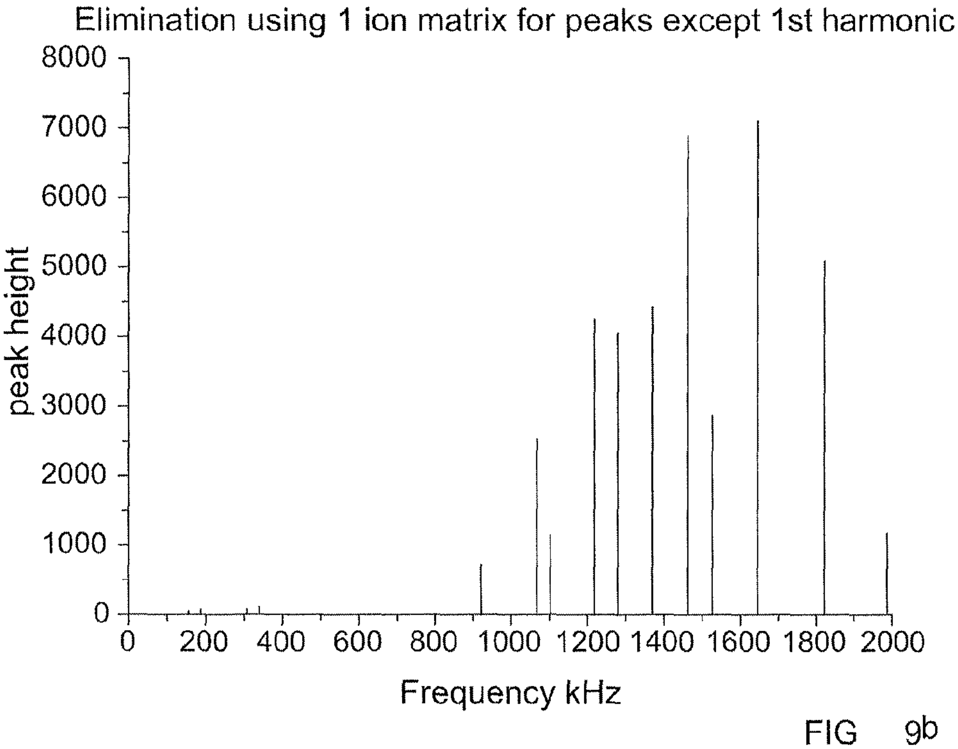
Figure 9C:
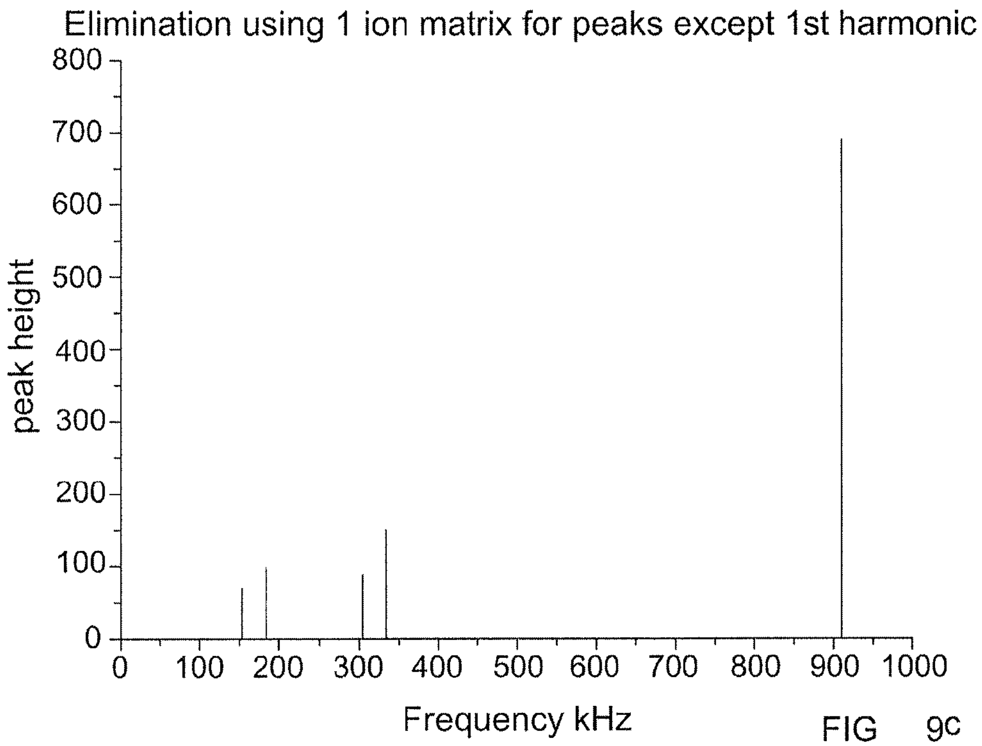
Figure 9D:
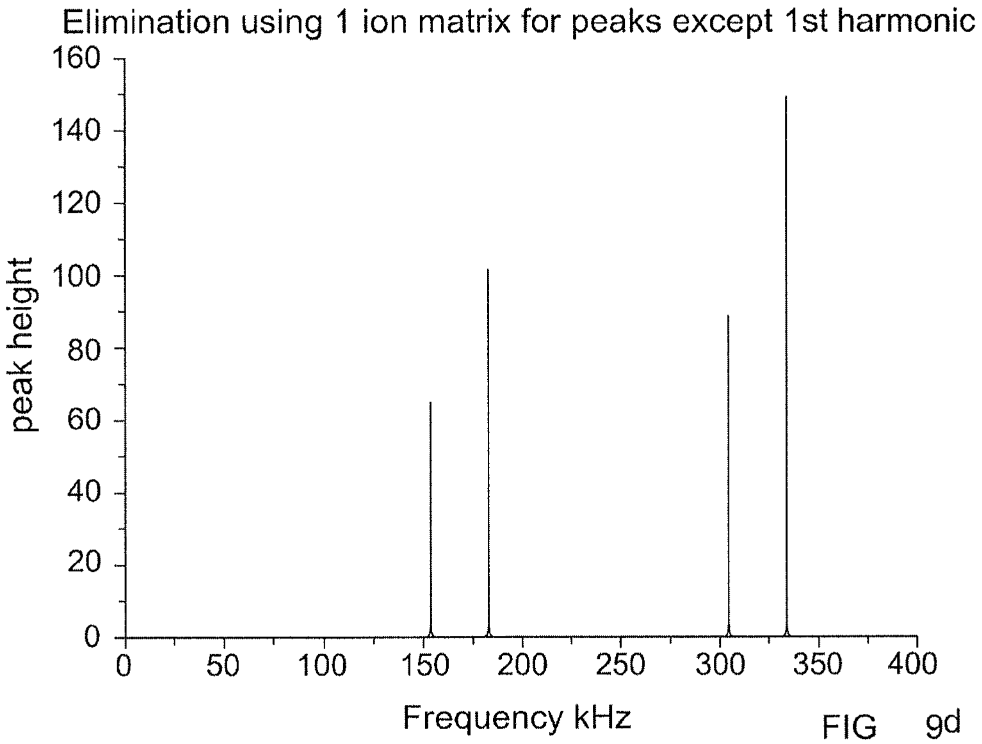

FIG. 9*b* is a linear combination of the five FFT profiles obtained using the five image charge detectors in the simulation. The linear combination used the coefficients $x_1$, $x_2$, $x_3$, $x_4$, $x_5$ from the solution vector $X_1$ such that the second, third, fourth and fifth harmonics are substantially eliminated to leave the first, sixth and higher order harmonics components.

FIGS. 9*c-g* are zoomed-in views of FIG. 9*b*.

Figure 9E:
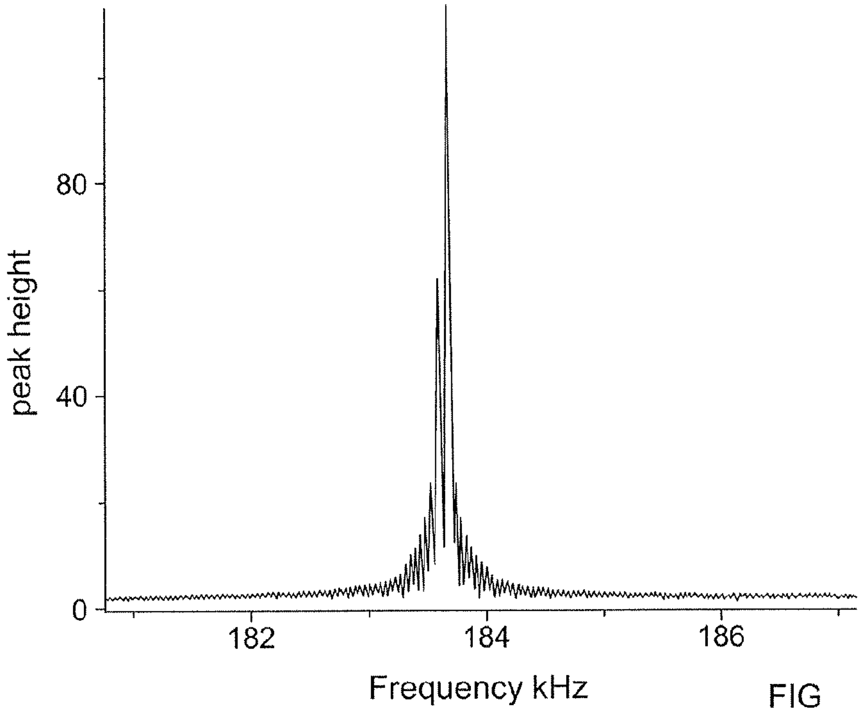
Figure 9F:
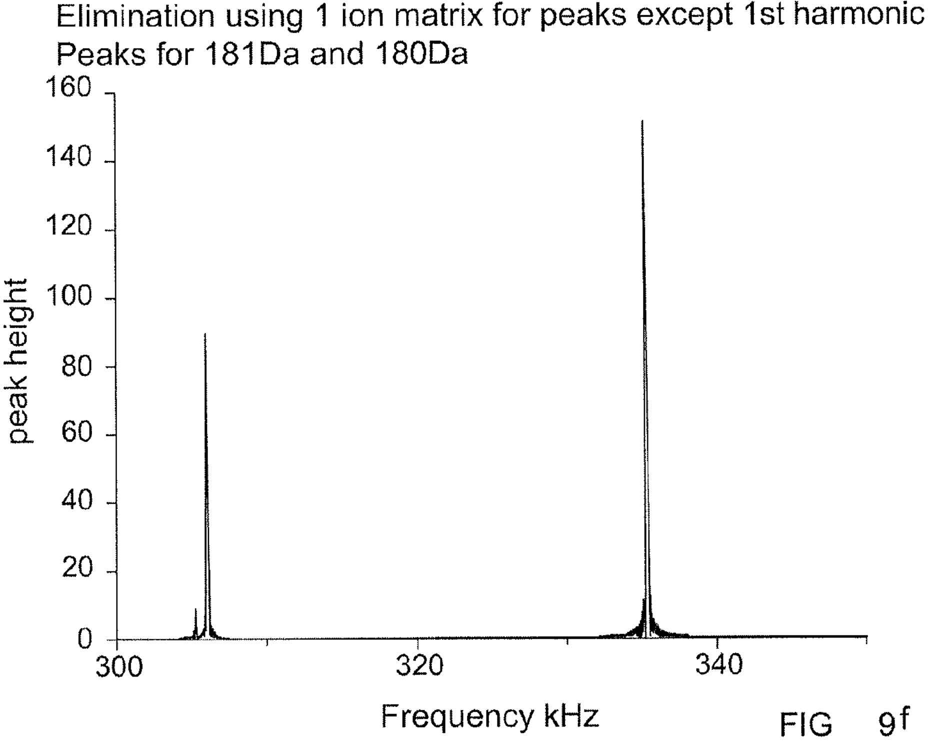
Figure 9G:
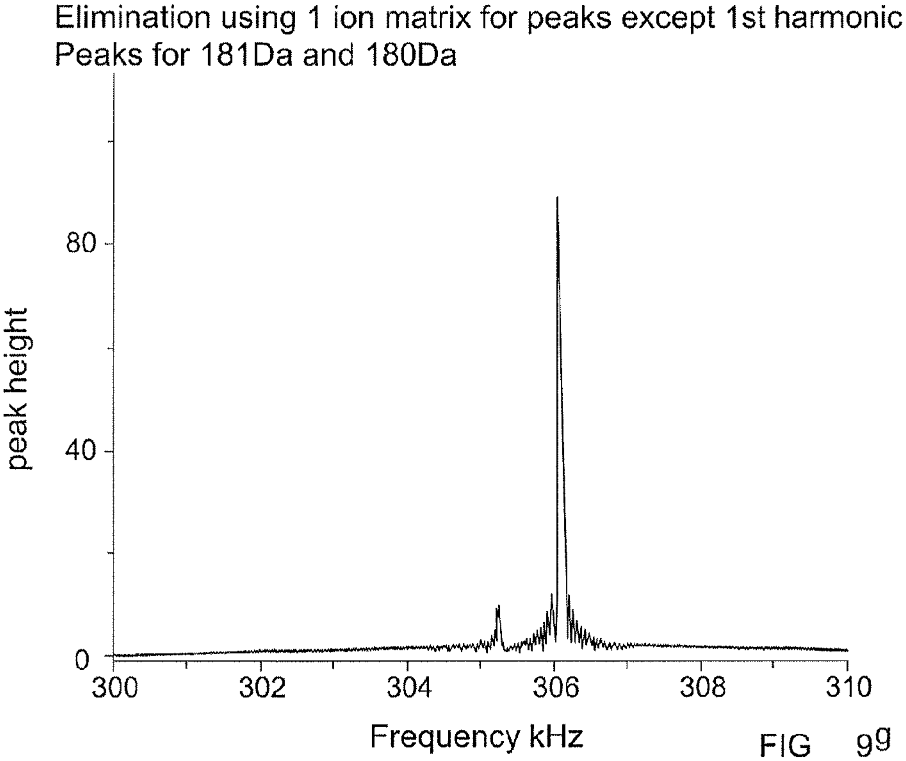
Figure 9H:
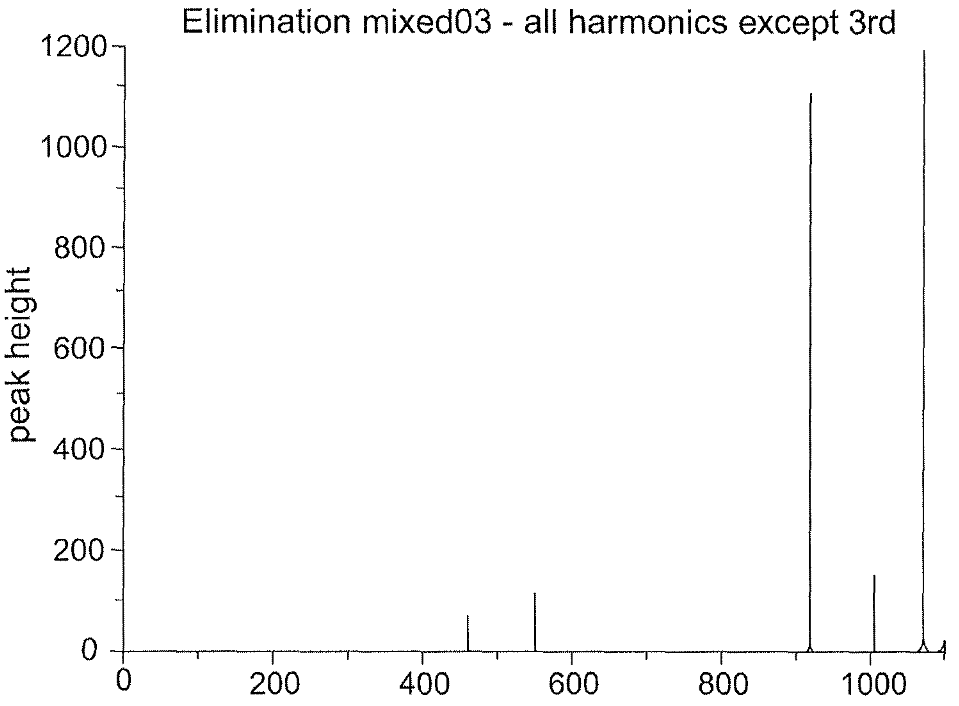
Figure 9I:
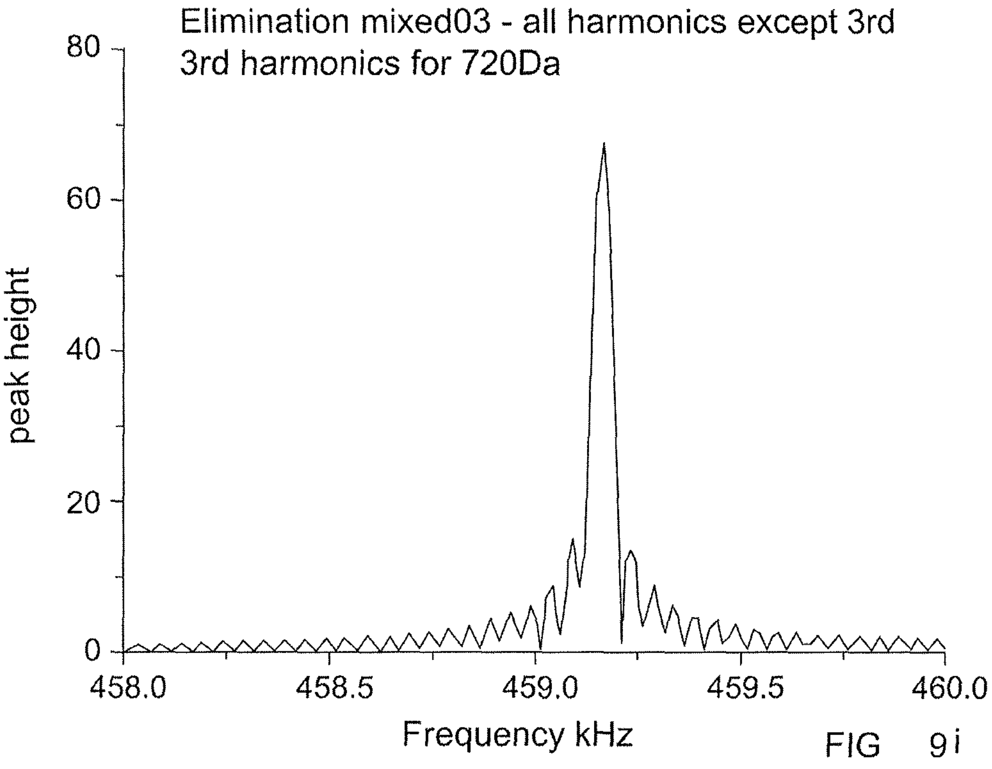

FIG. 9*h* is a linear combination of the five FFT profiles obtained using the five image charge detectors in the simulation. The linear combination used the coefficients $x_1$, $x_2$, $x_3$, $x_4$, $x_5$ from the solution vector $X_3$ such that the first, second, fourth and fifth harmonics are substantially eliminated to leave the third, sixth and higher order harmonics components.

FIGS. 9*i-m* are zoomed-in views of FIG. 9*h*.

Figure 9J:
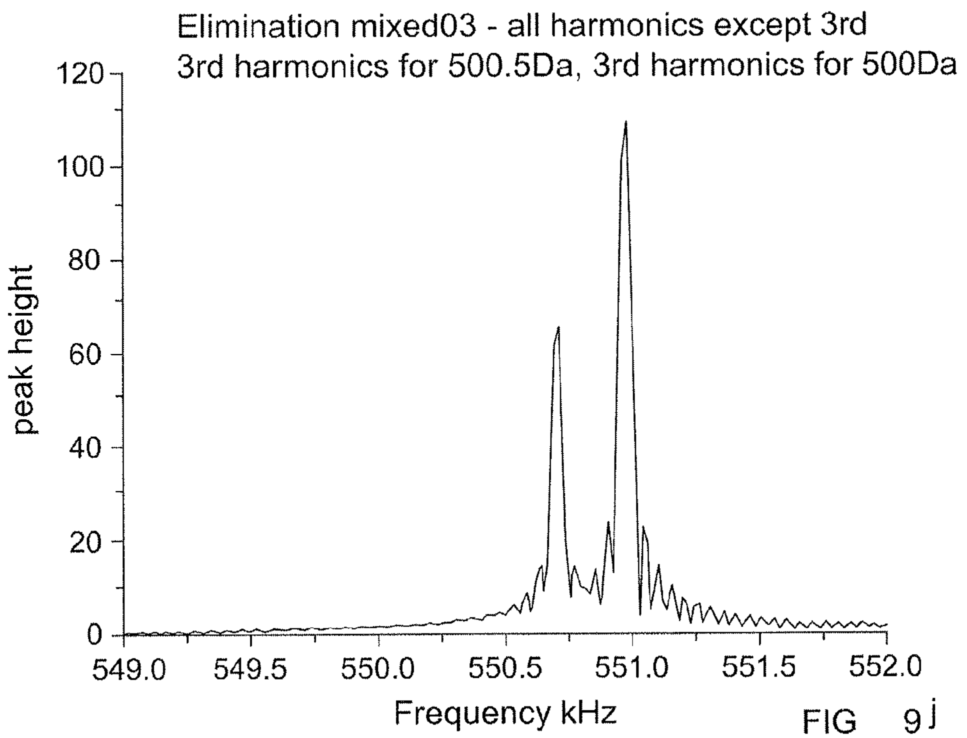
Figure 9K:
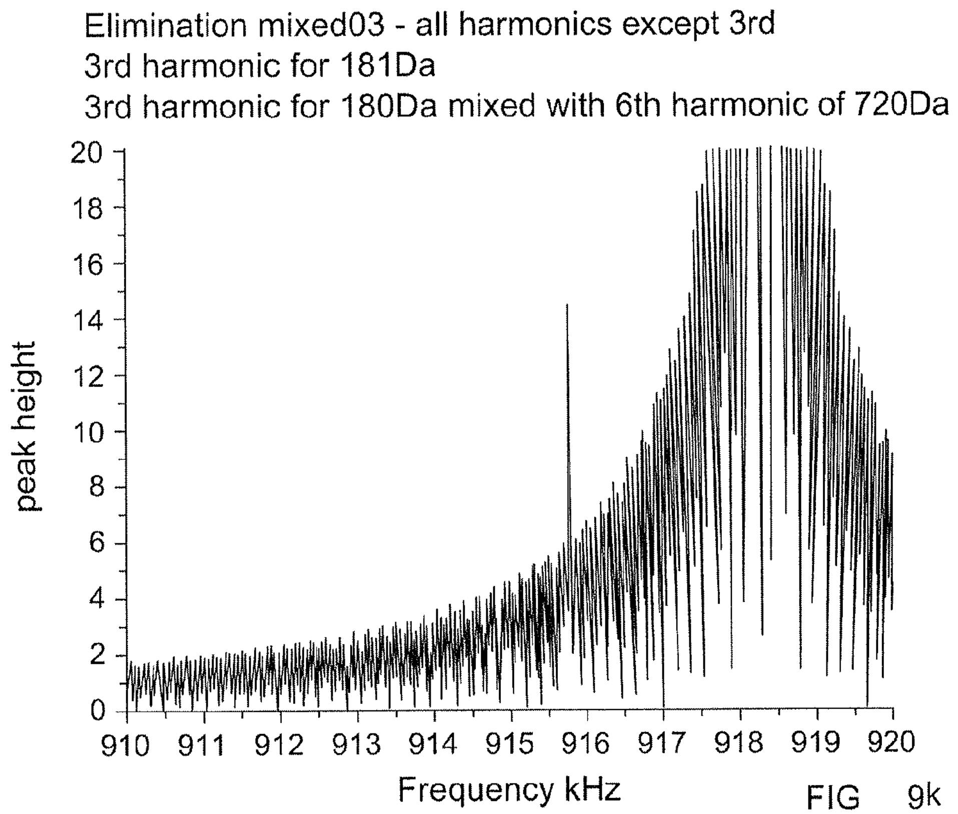
Figure 9L:
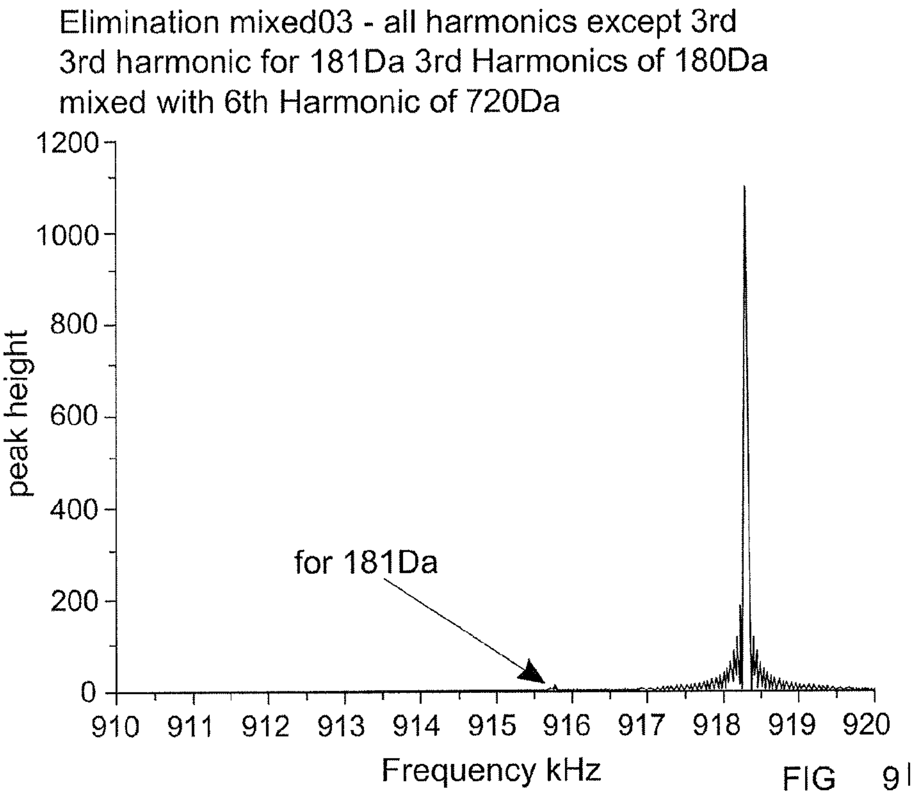
Figure 9M:
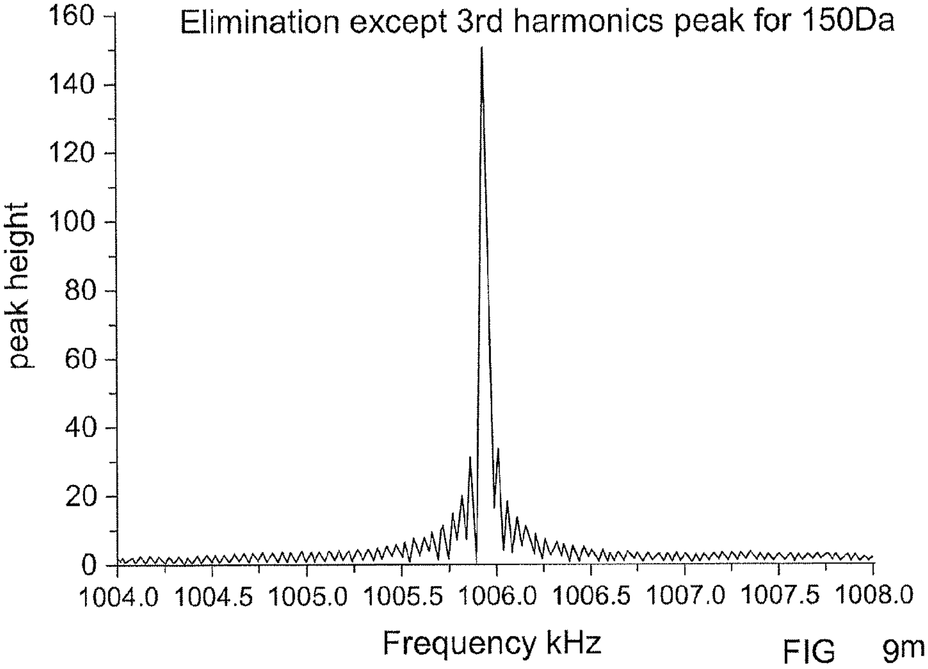
Figure 9N:
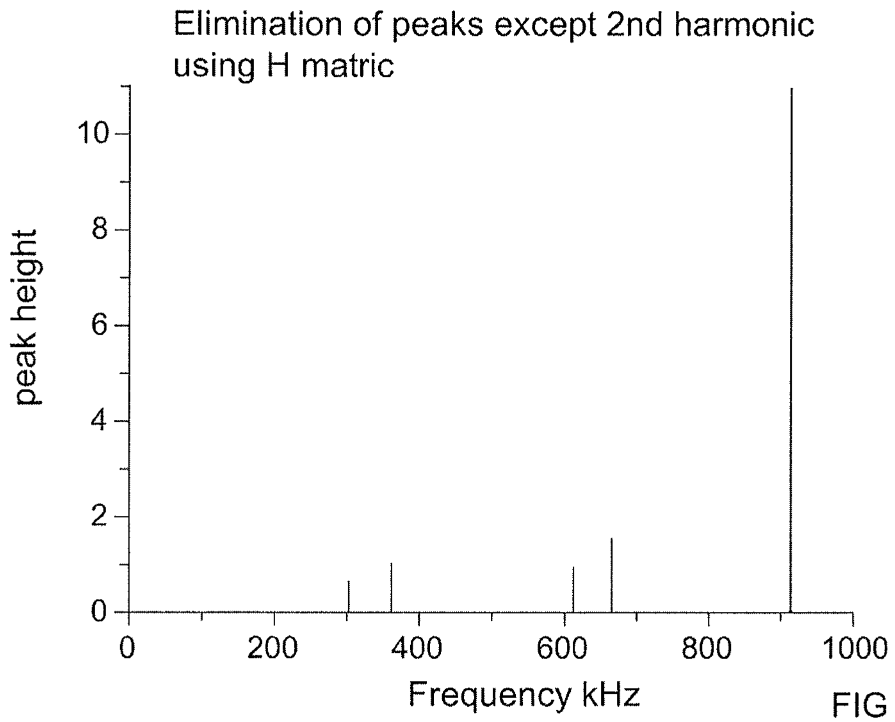
Figure 9O:
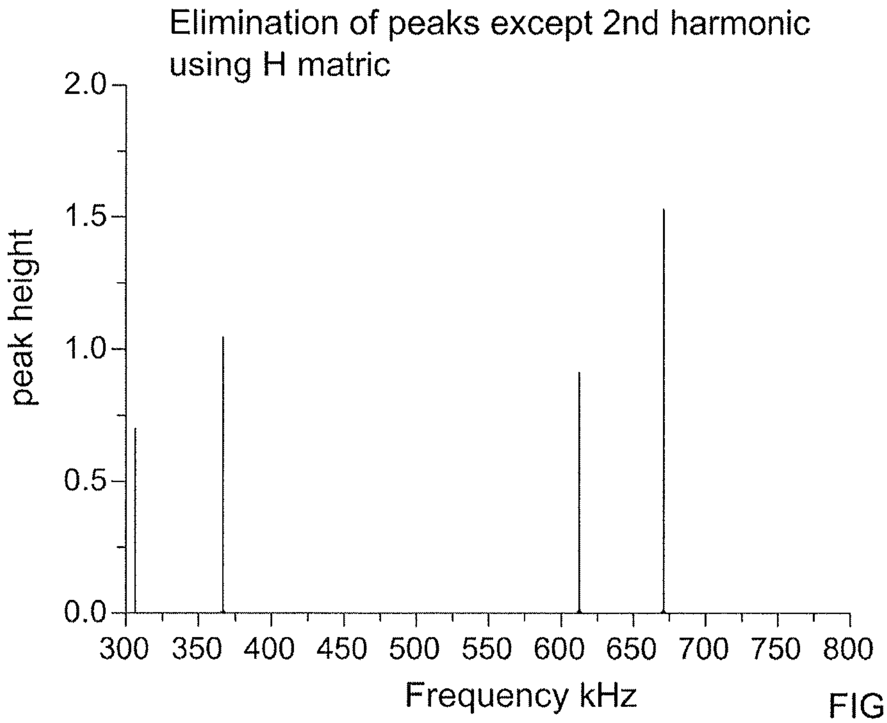
Figure 9P:
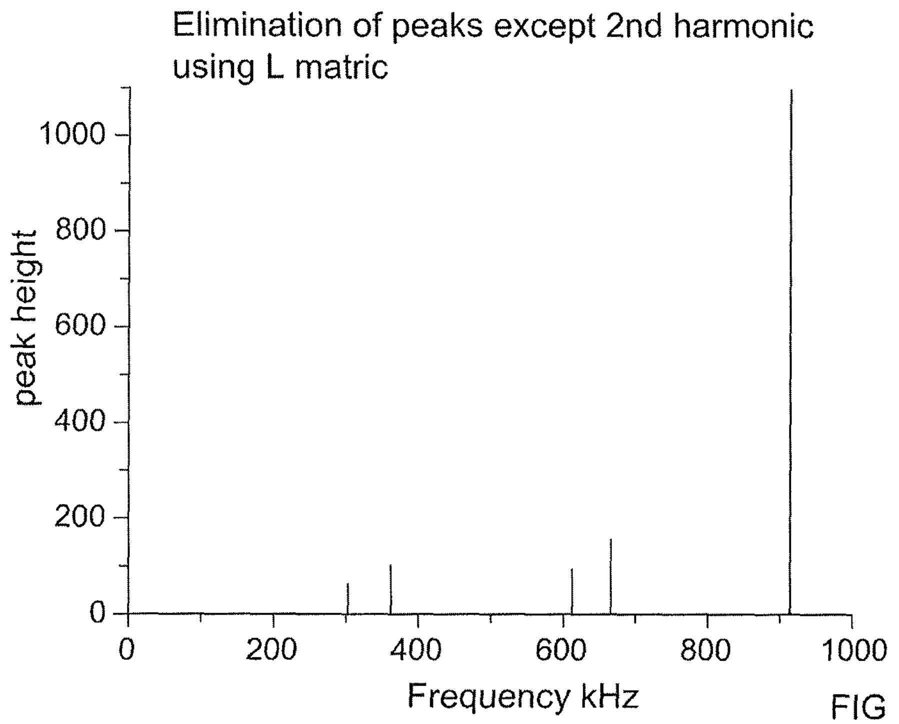
Figure 9Q:
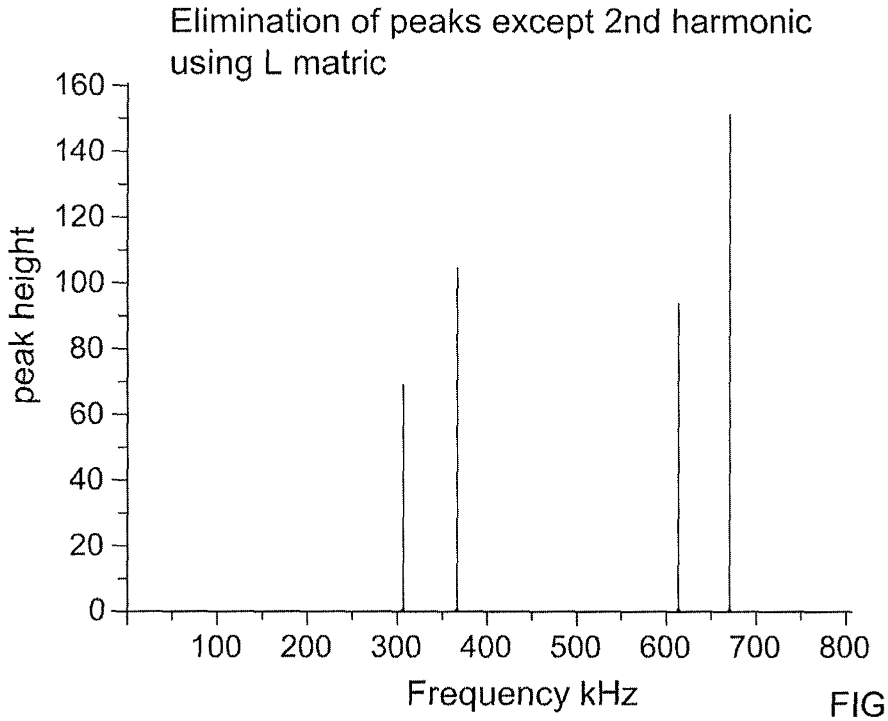
Figure 9R:
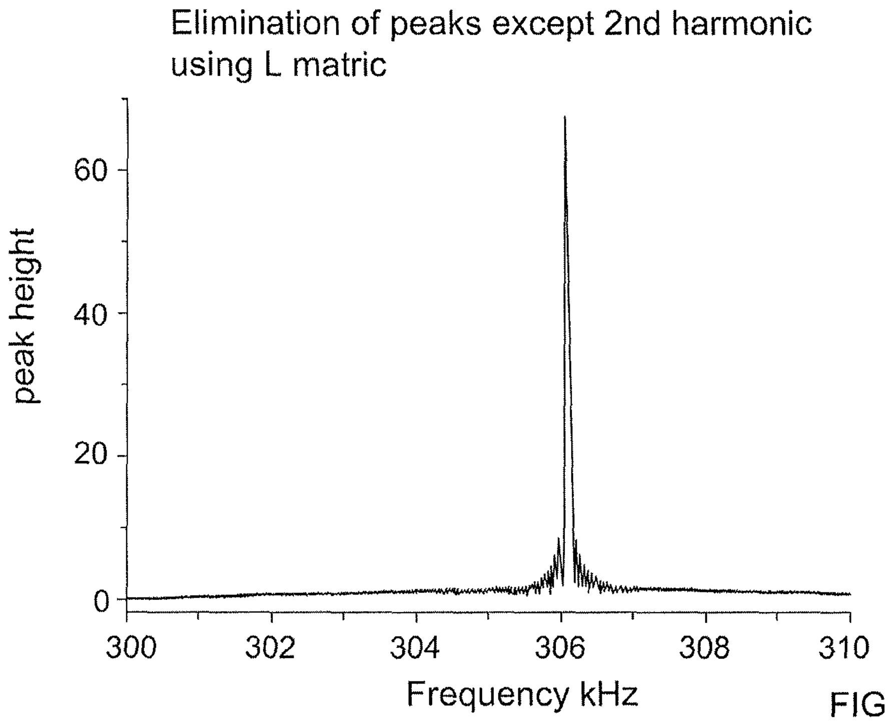

FIG. 9*n* is a linear combination of the five FFT profiles obtained using the five image charge detectors in the simulation. The linear combination used the coefficients $x_1$, $x_2$, $x_3$, $x_4$, $x_5$ from the solution vector $X_2$ such that the first, third, fourth and fifth harmonics are substantially eliminated to leave the second, sixth and higher order harmonics components.

FIGS. 9*o-x* are zoomed-in views of FIG. 9*n*.

Figure 9S:
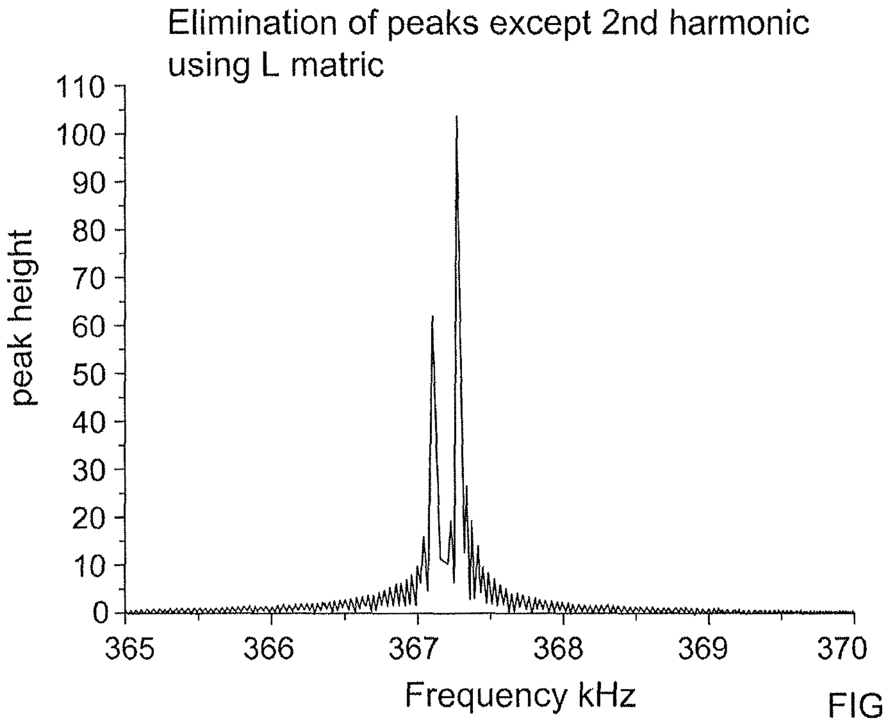
Figure 9T:
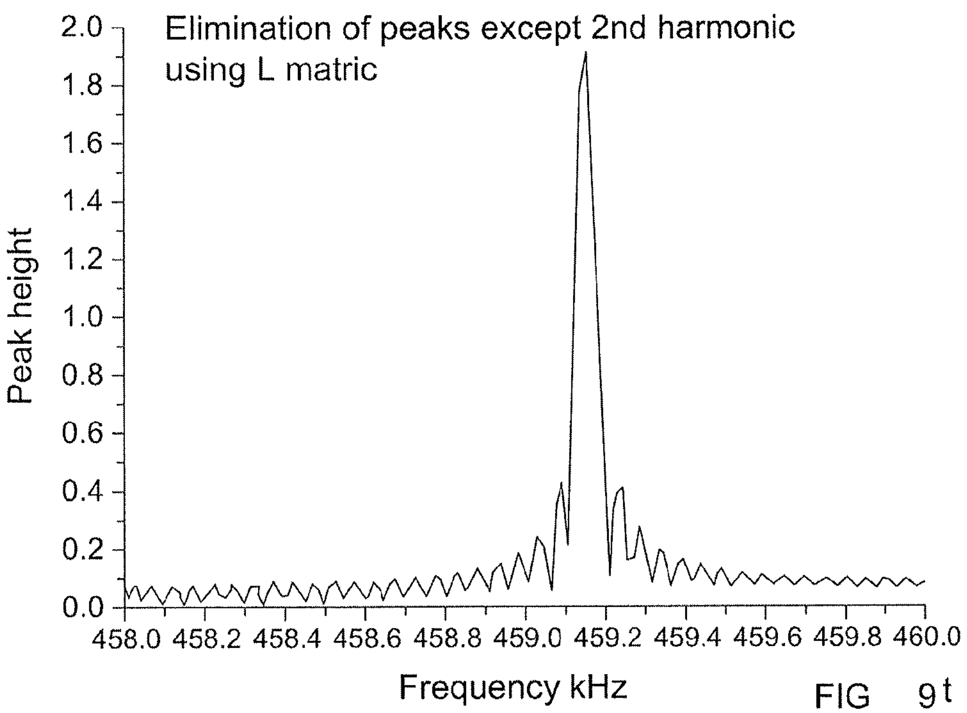
Figure 9U:
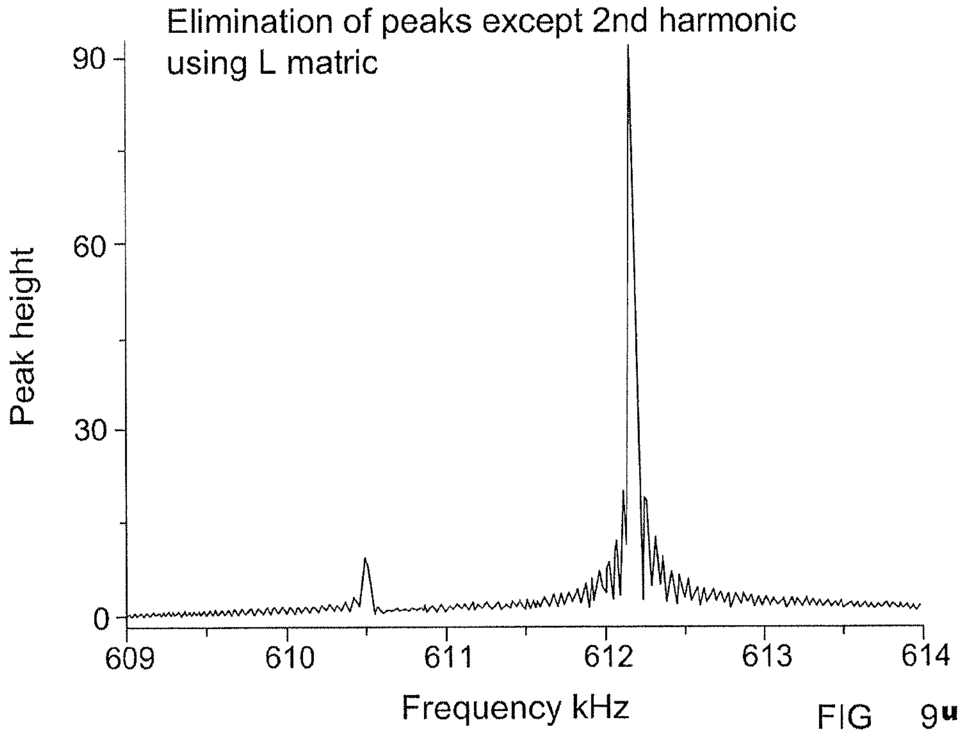
Figure 9V:
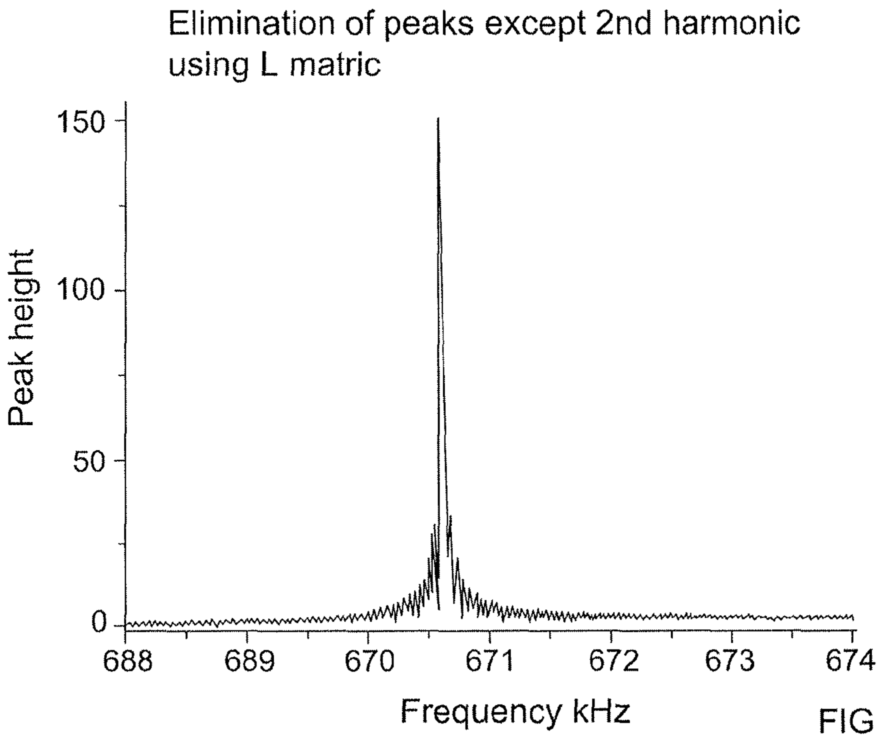
Figure 9W:
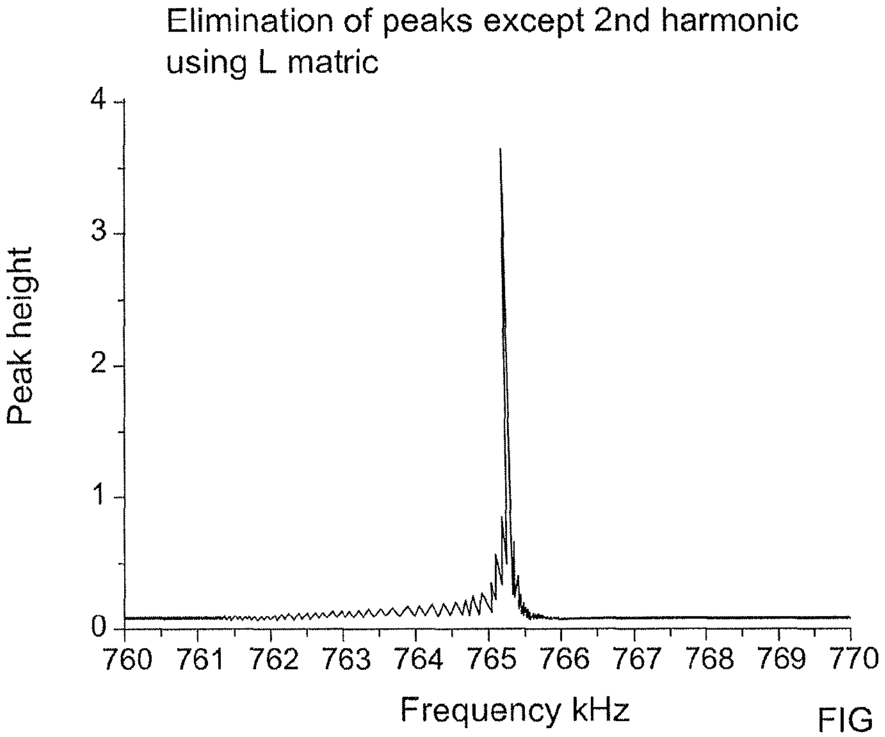
Figure 9X:
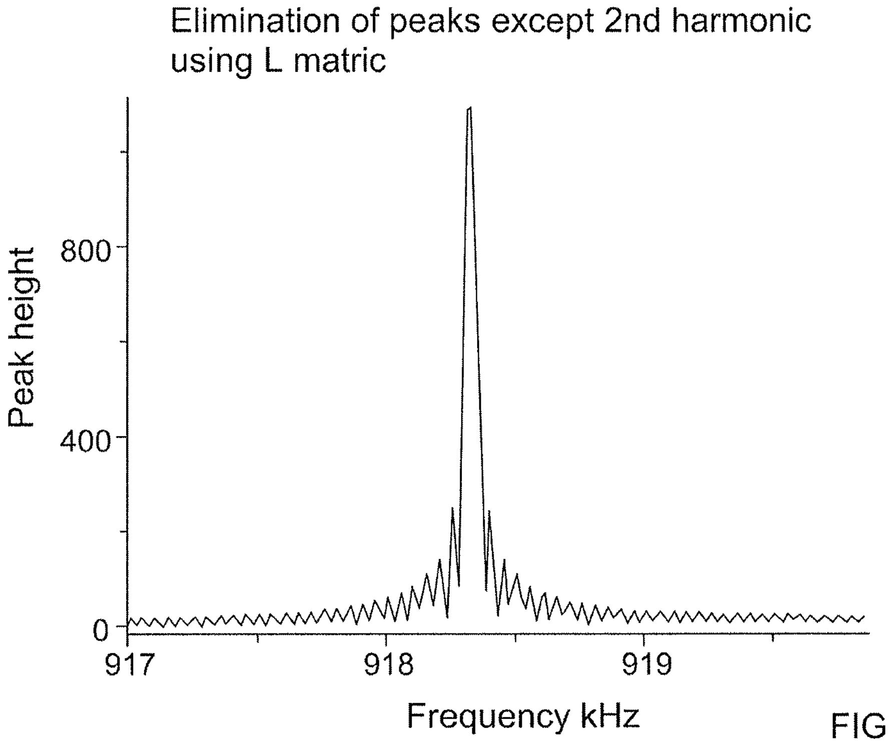

FIGS. 9*e*, 9*j* and 9*s* respectively show the first, third and second harmonic peaks for the ions having mass/charge ratios of 500 and 500.5. As can be seen by comparing these peaks, the peaks for ions having these different mass/charge ratios become more spaced, and therefore more clearly visible, for higher harmonic components. This explains why it may be desirable to suppress (more preferably substantially eliminate) n−1 of the first n harmonic components, so as to leave a harmonic component other than the first harmonic component behind.

FIG. 9*k* shows a very large sixth harmonic peak for the ion having a mass/charge ratio of 720, compared with a small third harmonic peak for the ion having a mass/charge ratio of 181 Th. A 10 times larger third harmonic peak for the ion having a mass/charge ratio of 180 is obliterated by the even larger sixth harmonic peak for the ion having a mass/charge ratio of 720, because they share the same frequency. Accordingly, in this case, it may be desirable to eliminate the sixth harmonic component. In a case where only 5 pick-up electrodes are used, eliminating the $6^{th}$ harmonic instead of the $1^{st}$ harmonic, in other words, eliminating the $2^{nd}$, $4^{th}$, $5^{th}$ and $6^{th}$ harmonics, while keeping the $1^{st}$, $3^{rd}$, $7^{th}$ higher order harmonics may be a preferred alternative.

When used in this specification and claims, the terms "comprises" and "comprising", "including" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure, without departing from the broad concepts disclosed. It is therefore intended that the scope of the patent granted hereon be limited only by the appended claims, as interpreted with reference to the description and drawings, and not by limitation of the embodiments described herein.

The following statements provide general expressions of the disclosure herein:

A. A method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

B. A method according to statement A, wherein the method includes providing the linear combination of the plurality of image charge/current signals in the frequency domain so as to provide information regarding the mass/charge ratio distribution of the trapped ions.

C. A method according to statement B, wherein the method includes providing the linear combination of the plurality of image charge/current signals in the frequency domain using a discrete Fourier transform.

D. A method according to statement B or C, wherein the plurality of image charge/current signals are initially obtained in the time domain and providing the linear combination of the plurality of image charge/current signals in the frequency domain is achieved by either:

(a) producing the linear combination of the plurality of image charge/current signals in the time domain, then converting the linear combination of the plurality of image charge/current signals from the time domain into the frequency domain; or (b) converting each of the plurality of image charge/current signals from the time domain into the frequency domain, then producing the linear combination of the plurality of image charge/current signals in the frequency domain.

E. A method according to statement D, wherein the plurality of image charge/current signals are initially obtained in the time domain and providing the linear combination of the plurality of image charge/current signals in the frequency domain is achieved by producing the linear combination of the plurality of image charge/current signals in the time domain, then converting the linear combination of the plurality of image charge/current signals from the time domain into the frequency domain.

F. A method according to any one of the previous statements, wherein the predetermined coefficients are selected to suppress at least one harmonic component of the image charge/current signals relative to another harmonic component which has been selected for use in obtaining information regarding the mass/charge ratio distribution of trapped ions.

G. A method according to any one of the previous statements, wherein the predetermined coefficients are selected so as to substantially eliminate at least one harmonic component of the plurality of image charge/current signals within the linear combination of the plurality of image charge/current signals.

H. A method according to any one of the previous statements, wherein the predetermined coefficients are selected so as to suppress or substantially eliminate n−1 of the first n harmonic components, where n is two or more.

I. A method according to any one of the previous statements, wherein the predetermined coefficients are selected so as to suppress or substantially eliminate m of the harmonic components having an order between n and n+m, where n is a positive integer and m is two or more.

J. A method according to any one of the previous statements, wherein the predetermined coefficients are complex.

K. A method according to any one of the previous statements, wherein the method includes displaying the linear combination of the plurality of image charge/current signals in the frequency domain.

L. A method according to any one of the previous statements, wherein the method includes obtaining a plurality of image charge/current signals before processing the plurality of image charge/current signals, wherein obtaining the plurality of image charge/current signals includes:

producing ions;

trapping the ions such that the trapped ions undergo oscillatory motion; and obtaining a plurality of image charge/current signals representative of the trapped ions undergoing oscillatory motion using at least one image charge/current detector.

M. A method according to statement L, wherein the plurality of image charge/current signals are obtained using a plurality of image charge/current detectors, with each image charge/current signal being obtained using a respective image charge/current detector.

N. A method according to statement L, wherein two or more of the plurality of image charge/current signals are obtained using the same image charge/current detector.

O. A method according to statement N, wherein two or more of the plurality of image charge/current signals are obtained using the same image charge/current detector, with at least one of the two or more image charge/current signals being obtained by applying at least one processing algorithm to an image charge/current signal produced by the image charge/current detector.

P. A method according to statement O, wherein the or each processing algorithm is configured to modify an image charge/current signal in the frequency domain with phase information obtained from the image charge/current signal.

Q. A method of selecting predetermined coefficients for use in a method of processing a plurality of image charge/current signals, the method including:

obtaining a plurality of image charge/current signals;

setting up equations aimed at suppressing or eliminating at least one harmonic component of the image charge/current signals; and selecting the predetermined coefficients by solving the equations.

R. A method according to statement Q, wherein the method includes:

producing ions, wherein the produced ions include ions having a reference mass/charge ratio;

trapping the ions such that the trapped ions undergo oscillatory motion;

obtaining a plurality of image charge/current signals representative of the trapped ions undergoing oscillatory motion, wherein the plurality of image charge/current signals include harmonic components caused by ions having the reference mass/charge ratio;

providing the plurality of image charge/current signals in the frequency domain;

setting up linear equations aimed at suppressing or eliminating at least one of the plurality of harmonic components of the image charge/current signals within a linear combination of the plurality of image charge/current signals, wherein setting up the linear equations includes producing a linear combination of the plurality of image charge/current signals as sampled at a plurality of frequencies using a plurality of undetermined coefficients, with each of the plurality of frequencies corresponding to a respective one of a plurality of harmonic components caused by ions having the reference mass/charge ratio; and selecting the predetermined coefficients by solving the linear equations.

S. A method according to statement Q or R, wherein setting up equations aimed at suppressing or eliminating at least one harmonic component of the image charge/current signals includes setting up linear equations, wherein at least one linear combination of the plurality of image charge/current signals as sampled at one of a plurality of harmonic frequencies using a plurality of undetermined coefficients is set equal to zero or to a value that is smaller than another linear combination of the plurality of image charge/current signals as sampled at another one of the plurality of harmonic frequencies using said undetermined coefficients.

T. A method including:

a method of selecting predetermined coefficients according to any one of statements Q to S; and a method of processing a plurality of image charge/current signals according to any one of statements A to P, wherein the method of processing a plurality of image charge/current signals uses the predetermined coefficients selected according to the method of selecting predetermined coefficients.

U. A method according to statement T, wherein:

the method of selecting predetermined coefficients includes providing the plurality of image charge/current signals in the frequency domain using a first discrete Fourier transform; and the method of processing a plurality of image charge/current signals includes providing the linear combination in the frequency domain using a second discrete Fourier transform;

wherein the first and second discrete Fourier transforms use the same frequency range and frequency step.

V. A mass spectrometry apparatus having a processing apparatus configured to perform a method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

W. A mass spectrometry apparatus according to statement V, wherein the mass spectrometry apparatus has a display configured to display the linear combination of the plurality of image charge/current signals in the frequency domain.

X. A mass spectrometry apparatus according to statement V or W, wherein the mass spectrometry apparatus has:

an ion source configured to produce ions;

a mass analyser configured to trap the ions such that the trapped ions undergo oscillatory motion in the mass analyser;

at least one image charge/current detector for use in obtaining a plurality of image charge/current signals representative of trapped ions undergoing oscillatory motion in the mass analyser; and a processing apparatus configured to perform a method of processing a plurality of image charge/current signals obtained using the at least one image charge/current detector, wherein the method includes producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

Y. A mass spectrometry apparatus according to statement X, wherein the mass analyser is an electrostatic ion trap configured to produce an electrostatic field to trap ions produced by the ion source such that the trapped ions undergo oscillatory motion in the mass analyser.

Z. A mass spectrometer according to statement Y, wherein the electrostatic ion trap is a linear or planar electrostatic ion trap or has the form of an Orbitrap configured to use a hyper-logarithmic electric field for ion trapping.

ZA. A mass spectrometer according to statement Y or Z, wherein the electrostatic ion trap has a plurality of image charge/current detectors configured to produce an image charge/current signal representative of trapped ions undergoing oscillatory motion in the mass analyser.

ZB. A mass spectrometer according to any one of statements Y to ZA, wherein the electrostatic ion trap has multiple field forming electrodes at least some of which are also used as image charge/current detectors.

ZC. A computer-readable medium having computer-executable instructions configured to cause a mass spectrometry apparatus to perform a method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

ZD. A mass spectrometry apparatus or processing apparatus substantially as any one embodiment herein described with reference to and as shown in the accompanying drawings.

The invention claimed is:

1. A method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

2. A method according to claim 1, wherein the method includes providing the linear combination of the plurality of image charge/current signals in the frequency domain so as to provide information regarding the mass/charge ratio distribution of the trapped ions.

3. A method according to claim 2, wherein the method includes providing the linear combination of the plurality of image charge/current signals in the frequency domain using a discrete Fourier transform.

4. A method according to claim 2, wherein the plurality of image charge/current signals are initially obtained in the time domain and providing the linear combination of the plurality of image charge/current signals in the frequency domain is achieved by either:

(a) producing the linear combination of the plurality of image charge/current signals in the time domain, then converting the linear combination of the plurality of image charge/current signals from the time domain into the frequency domain; or (b) converting each of the plurality of image charge/current signals from the time domain into the frequency domain, then producing the linear combination of the plurality of image charge/current signals in the frequency domain.

5. A method according to claim 4, wherein the plurality of image charge/current signals are initially obtained in the time domain and providing the linear combination of the plurality of image charge/current signals in the frequency domain is achieved by producing the linear combination of the plurality of image charge/current signals in the time domain, then converting the linear combination of the plurality of image charge/current signals from the time domain into the frequency domain.

6. A method according to claim 1, wherein the predetermined coefficients are selected to suppress at least one harmonic component of the image charge/current signals relative to another harmonic component which has been selected for use in obtaining information regarding the mass/charge ratio distribution of trapped ions.

7. A method according to claim 1, wherein the predetermined coefficients are selected so as to substantially eliminate at least one harmonic component of the plurality of image charge/current signals within the linear combination of the plurality of image charge/current signals.

8. A method according to claim 1, wherein the predetermined coefficients are selected so as to suppress or substantially eliminate n−1 of the first n harmonic components, where n is two or more.

9. A method according to claim 1, wherein the predetermined coefficients are selected so as to suppress or substantially eliminate m of the harmonic components having an order between n and n+m, where n is a positive integer and m is two or more.

10. A method according to claim 1, wherein the predetermined coefficients are complex.

11. A method according to claim 1, wherein the method includes displaying the linear combination of the plurality of image charge/current signals in the frequency domain.

12. A method according to claim 1, wherein the method includes obtaining a plurality of image charge/current signals before processing the plurality of image charge/current signals, wherein obtaining the plurality of image charge/current signals includes:

producing ions;

trapping the ions such that the trapped ions undergo oscillatory motion; and obtaining a plurality of image charge/current signals representative of the trapped ions undergoing oscillatory motion using at least one image charge/current detector.

13. A method according to claim 12, wherein the plurality of image charge/current signals are obtained using a plurality of image charge/current detectors, with each image charge/current signal being obtained using a respective image charge/current detector.

14. A method according to claim 12, wherein two or more of the plurality of image charge/current signals are obtained using the same image charge/current detector.

15. A method according to claim 14, wherein two or more of the plurality of image charge/current signals are obtained using the same image charge/current detector, with at least one of the two or more image charge/current signals being obtained by applying at least one processing algorithm to an image charge/current signal produced by the image charge/current detector.

16. A method according to claim 15, wherein the or each processing algorithm is configured to modify an image charge/current signal in the frequency domain with phase information obtained from the image charge/current signal.

17. A method of selecting predetermined coefficients for use in a method of processing a plurality of image charge/current signals, the method including:

obtaining a plurality of image charge/current signals;

setting up equations aimed at suppressing or eliminating at least one harmonic component of the image charge/current signals; and selecting the predetermined coefficients by solving the equations.

18. A method according to claim 17, wherein the method includes:

producing ions, wherein the produced ions include ions having a reference mass/charge ratio;

trapping the ions such that the trapped ions undergo oscillatory motion;

obtaining a plurality of image charge/current signals representative of the trapped ions undergoing oscillatory motion, wherein the plurality of image charge/current signals include harmonic components caused by ions having the reference mass/charge ratio;

providing the plurality of image charge/current signals in the frequency domain;

setting up linear equations aimed at suppressing or eliminating at least one of the plurality of harmonic components of the image charge/current signals within a linear combination of the plurality of image charge/current signals, wherein setting up the linear equations includes producing a linear combination of the plurality of image charge/current signals as sampled at a plurality of frequencies using a plurality of undetermined coefficients, with each of the plurality of frequencies corresponding to a respective one of a plurality of harmonic components caused by ions having the reference mass/charge ratio; and selecting the predetermined coefficients by solving the linear equations.

19. A method according to claim 17, wherein setting up equations aimed at suppressing or eliminating at least one harmonic component of the image charge/current signals includes setting up linear equations, wherein at least one linear combination of the plurality of image charge/current signals as sampled at one of a plurality of harmonic frequencies using a plurality of undetermined coefficients is set equal to zero or to a value that is smaller than another linear combination of the plurality of image charge/current signals as sampled at another one of the plurality of harmonic frequencies using said undetermined coefficients.

20. A method according to claim 17, wherein the method additionally includes:

producing a linear combination of a plurality of image charge/current signals representative of trapped ions undergoing oscillatory motion using the selected predetermined coefficients.

21. A method according to claim 20, wherein:

the method of selecting predetermined coefficients includes providing the plurality of image charge/current signals in the frequency domain using a first discrete Fourier transform; and the method additionally includes providing the linear combination in the frequency domain using a second discrete Fourier transform;

wherein the first and second discrete Fourier transforms use the same frequency range and frequency step.

22. A mass spectrometry apparatus having a processing apparatus configured to perform a method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

23. A mass spectrometry apparatus according to claim 22, wherein the mass spectrometry apparatus has a display configured to display the linear combination of the plurality of image charge/current signals in the frequency domain.

24. A mass spectrometry apparatus according to claim 22, wherein the mass spectrometry apparatus has:

an ion source configured to produce ions;

a mass analyser configured to trap the ions such that the trapped ions undergo oscillatory motion in the mass analyser;

at least one image charge/current detector for use in obtaining a plurality of image charge/current signals representative of trapped ions undergoing oscillatory motion in the mass analyser; and a processing apparatus configured to perform a method of processing a plurality of image charge/current signals obtained using the at least one image charge/current detector, wherein the method includes producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

25. A mass spectrometry apparatus according to claim 24, wherein the mass analyser is an electrostatic ion trap configured to produce an electrostatic field to trap ions produced by the ion source such that the trapped ions undergo oscillatory motion in the mass analyser.

26. A mass spectrometer according to claim 25, wherein the electrostatic ion trap is a linear or planar electrostatic ion trap or has the form of an Orbitrap configured to use a hyper-logarithmic electric field for ion trapping.

27. A mass spectrometer according to claim 25, wherein the electrostatic ion trap has a plurality of image charge/current detectors configured to produce an image charge/current signal representative of trapped ions undergoing oscillatory motion in the mass analyser.

28. A mass spectrometer according to claim 25, wherein the electrostatic ion trap has multiple field forming electrodes at least some of which are also used as image charge/current detectors.

29. A computer-readable medium having computer-executable instructions configured to cause a mass spectrometry apparatus to perform a method of processing a plurality of image charge/current signals representative of trapped ions undergoing oscillatory motion, the method including:

producing a linear combination of the plurality of image charge/current signals using a plurality of predetermined coefficients, the predetermined coefficients having been selected so as to suppress at least one harmonic component of the image charge/current signals within the linear combination of the plurality of image charge/current signals.

* * * * *